United States Patent
Smith et al.

(10) Patent No.: US 10,390,008 B2
(45) Date of Patent: Aug. 20, 2019

(54) DUAL-PITCH PARALLAX BARRIER

(71) Applicant: Sharp Kabushiki Kaisha, Osaka (JP)

(72) Inventors: Nathan James Smith, Oxford (GB);
André Filipe Marques da Silva,
Oxford (GB); Takehiro Murao, Osaka
(JP); Ryoh Kikuchi, Osaka (JP);
Takayuki Yamada, Osaka (JP);
Andrew Acreman, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 178 days.

(21) Appl. No.: 15/402,561

(22) Filed: Jan. 10, 2017

(65) Prior Publication Data

US 2018/0199030 A1    Jul. 12, 2018

(51) Int. Cl.
| | | |
|---|---|---|
| G02B 27/22 | (2018.01) | |
| H04N 13/366 | (2018.01) | |
| G02B 27/00 | (2006.01) | |
| H04N 13/31 | (2018.01) | |
| H04N 13/359 | (2018.01) | |

(Continued)

(52) U.S. Cl.
CPC ....... *H04N 13/366* (2018.05); *G02B 27/0093* (2013.01); *G02B 27/2214* (2013.01);
(Continued)

(58) Field of Classification Search
CPC .. G02B 27/2214; G02B 27/225; H04N 13/31; H04N 13/302; H04N 13/312; H04N 13/315

(Continued)

(56) References Cited

U.S. PATENT DOCUMENTS 5,969,850 A    10/1999   Harrold et al.
6,094,216 A *   7/2000   Taniguchi .............. G09G 3/003
                                                             348/51

(Continued)

FOREIGN PATENT DOCUMENTS

WO   WO 2014092172 A1   6/2014
WO   WO 2014136610 A1   9/2014

OTHER PUBLICATIONS

D. Suzuki et al., 73-2 "A Wide View Glass-less 3D Display with Head-Tracking System for Horizontal and Vertical Directions" p. 990, SID 2016 Digest.

*Primary Examiner* — Audrey Y Chang
(74) *Attorney, Agent, or Firm* — Renner, Otto, Boisselle & Sklar, LLP

(57) ABSTRACT

A reconfigurable parallax barrier panel, for use in a display system with a 3D mode, includes a first substrate, a second substrate, and an electro-optic material positioned between the first and second substrates. The first and second substrates each respectively has a plurality of first and second electrodes, the electrodes being independently addressable from one another and comprising a plurality of electrode portions extending along a first direction and laterally spaced from one another along a second direction different from the first direction. The electrode portions of the first electrodes are arranged in a cyclic arrangement having a first pitch, and the electrode portions of the second electrodes are arranged in a cyclic arrangement having a second pitch that is different to the first pitch. The first and second electrodes are driven to generate different reconfigurable parallax barrier arrays corresponding to different viewing distances in a 3D mode of operation.

24 Claims, 24 Drawing Sheets

(51) Int. Cl.
*H04N 13/398* (2018.01)
*H04N 13/373* (2018.01)

(52) U.S. Cl.
CPC .......... *H04N 13/31* (2018.05); *H04N 13/359* (2018.05); *H04N 13/373* (2018.05); *H04N 13/398* (2018.05); *H04N 2213/001* (2013.01)

(58) Field of Classification Search
USPC .............................. 359/464; 348/54; 349/15
See application file for complete search history.

(56) References Cited

U.S. PATENT DOCUMENTS

| | | |
|---|---|---|
| 7,359,105 B2 * | 4/2008 | Jacobs .................. G02F 1/1323 359/245 |
| 7,813,042 B2 | 10/2010 | Mather et al. |
| 8,331,023 B2 | 12/2012 | Wu et al. |
| 8,629,945 B2 | 1/2014 | Lo |
| 2005/0190443 A1 * | 9/2005 | Nam .................. G02B 27/2214 359/464 |
| 2010/0110316 A1 * | 5/2010 | Huang .............. G02F 1/134309 349/15 |
| 2011/0157171 A1 | 6/2011 | Lin |
| 2012/0200680 A1 | 8/2012 | So et al. |
| 2012/0320171 A1 * | 12/2012 | Lee .................... G02B 27/2214 348/54 |
| 2013/0050596 A1 | 2/2013 | Chen et al. |
| 2013/0187961 A1 | 7/2013 | Hunt |
| 2013/0342586 A1 | 12/2013 | Kim et al. |
| 2014/0002758 A1 | 1/2014 | Huang et al. |
| 2014/0078268 A1 | 3/2014 | Watanabe et al. |
| 2016/0070111 A1 | 3/2016 | Takama et al. |

* cited by examiner

Figure 7 (prior art)

| Slit Position Number | Electrode | | | | | | | | | | | |
|---|---|---|---|---|---|---|---|---|---|---|---|---|
| | E1 | E2 | E3 | E4 | E5 | E6 | E7 | E8 | E9 | E10 | E11 | E12 |
| 1 | 0 | 0 | 0 | 0 | 0 | 0 | 0 | 0 | 1 | 1 | 1 | 0 |
| 2 | 0 | 0 | 1 | 1 | 1 | 0 | 0 | 0 | 0 | 0 | 0 | 0 |
| 3 | 0 | 0 | 0 | 0 | 0 | 0 | 0 | 0 | 0 | 1 | 1 | 1 |
| 4 | 0 | 0 | 0 | 1 | 1 | 1 | 0 | 0 | 0 | 0 | 0 | 0 |
| 5 | 0 | 0 | 0 | 0 | 0 | 0 | 1 | 0 | 0 | 0 | 1 | 1 |
| 6 | 1 | 0 | 0 | 0 | 1 | 1 | 0 | 0 | 0 | 0 | 0 | 0 |
| 7 | 0 | 0 | 0 | 0 | 0 | 0 | 1 | 1 | 0 | 0 | 0 | 1 |
| 8 | 1 | 1 | 0 | 0 | 0 | 1 | 0 | 0 | 0 | 0 | 0 | 0 |
| 9 | 0 | 0 | 0 | 0 | 0 | 0 | 1 | 1 | 1 | 0 | 0 | 0 |
| 10 | 1 | 1 | 1 | 0 | 0 | 0 | 0 | 0 | 0 | 0 | 0 | 0 |
| 11 | 0 | 0 | 0 | 0 | 0 | 0 | 0 | 1 | 1 | 1 | 0 | 0 |
| 12 | 0 | 1 | 1 | 1 | 0 | 0 | 0 | 0 | 0 | 0 | 0 | 0 |

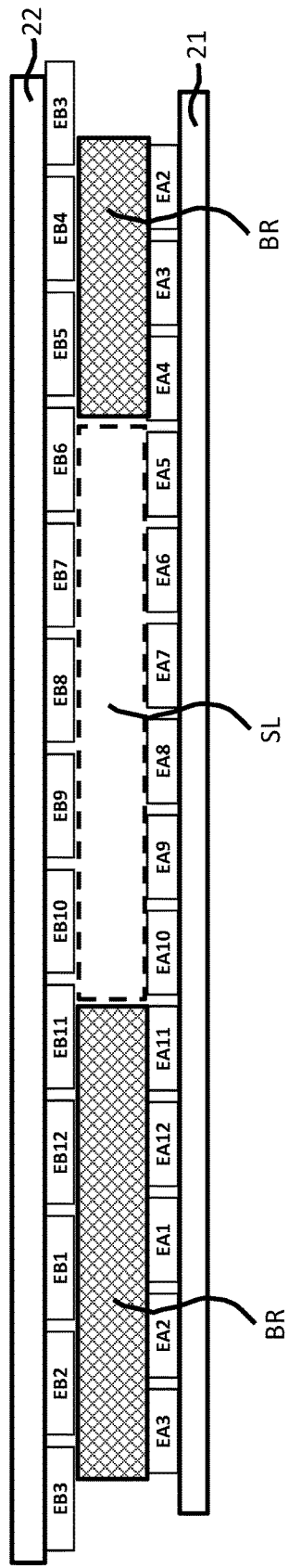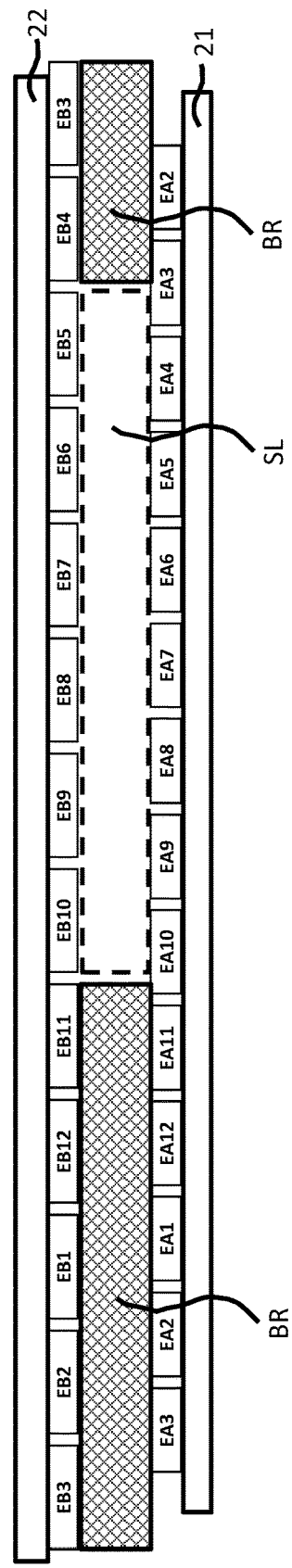

Figure 14

| Slit Position Number | Electrode | | | | | | | | | | | | |
|---|---|---|---|---|---|---|---|---|---|---|---|---|---|
| | EA1 | EA2 | EA3 | EA4 | EA5 | EA6 | EA7 | EA8 | EA9 | EA10 | EA11 | EA12 | EB1 to EB12 |
| 1A | 1 | 0 | 0 | 0 | 0 | 0 | 0 | 1 | 1 | 1 | 1 | 1 | 0 |
| 2A | 1 | 1 | 0 | 0 | 0 | 0 | 0 | 0 | 1 | 1 | 1 | 1 | 0 |
| 3A | 1 | 1 | 1 | 0 | 0 | 0 | 0 | 0 | 0 | 1 | 1 | 1 | 0 |
| 4A | 1 | 1 | 1 | 1 | 0 | 0 | 0 | 0 | 0 | 0 | 1 | 1 | 0 |
| 5A | 1 | 1 | 1 | 1 | 1 | 0 | 0 | 0 | 0 | 0 | 0 | 1 | 0 |
| 6A | 1 | 1 | 1 | 1 | 1 | 1 | 0 | 0 | 0 | 0 | 0 | 0 | 0 |
| 7A | 0 | 1 | 1 | 1 | 1 | 1 | 1 | 0 | 0 | 0 | 0 | 0 | 0 |
| 8A | 0 | 0 | 1 | 1 | 1 | 1 | 1 | 1 | 0 | 0 | 0 | 0 | 0 |
| 9A | 0 | 0 | 0 | 1 | 1 | 1 | 1 | 1 | 1 | 0 | 0 | 0 | 0 |
| 10A | 0 | 0 | 0 | 0 | 1 | 1 | 1 | 1 | 1 | 1 | 0 | 0 | 0 |
| 11A | 0 | 0 | 0 | 0 | 0 | 1 | 1 | 1 | 1 | 1 | 1 | 0 | 0 |
| 12A | 0 | 0 | 0 | 0 | 0 | 0 | 1 | 1 | 1 | 1 | 1 | 1 | 0 |

Figure 15

| Slit Position Number | Electrode | | | | | | | | | | | | |
|---|---|---|---|---|---|---|---|---|---|---|---|---|---|
| | EB1 | EB2 | EB3 | EB4 | EB5 | EB6 | EB7 | EB8 | EB9 | EB10 | EB11 | EB12 | EA1 to EA12 |
| 1B | 1 | 0 | 0 | 0 | 0 | 0 | 0 | 1 | 1 | 1 | 1 | 1 | 0 |
| 2B | 1 | 1 | 0 | 0 | 0 | 0 | 0 | 0 | 1 | 1 | 1 | 1 | 0 |
| 3B | 1 | 1 | 1 | 0 | 0 | 0 | 0 | 0 | 0 | 1 | 1 | 1 | 0 |
| 4B | 1 | 1 | 1 | 1 | 0 | 0 | 0 | 0 | 0 | 0 | 1 | 1 | 0 |
| 5B | 1 | 1 | 1 | 1 | 1 | 0 | 0 | 0 | 0 | 0 | 0 | 1 | 0 |
| 6B | 1 | 1 | 1 | 1 | 1 | 1 | 0 | 0 | 0 | 0 | 0 | 0 | 0 |
| 7B | 0 | 1 | 1 | 1 | 1 | 1 | 1 | 0 | 0 | 0 | 0 | 0 | 0 |
| 8B | 0 | 0 | 1 | 1 | 1 | 1 | 1 | 1 | 0 | 0 | 0 | 0 | 0 |
| 9B | 0 | 0 | 0 | 1 | 1 | 1 | 1 | 1 | 1 | 0 | 0 | 0 | 0 |
| 10B | 0 | 0 | 0 | 0 | 1 | 1 | 1 | 1 | 1 | 1 | 0 | 0 | 0 |
| 11B | 0 | 0 | 0 | 0 | 0 | 1 | 1 | 1 | 1 | 1 | 1 | 0 | 0 |
| 12B | 0 | 0 | 0 | 0 | 0 | 0 | 1 | 1 | 1 | 1 | 1 | 1 | 0 |

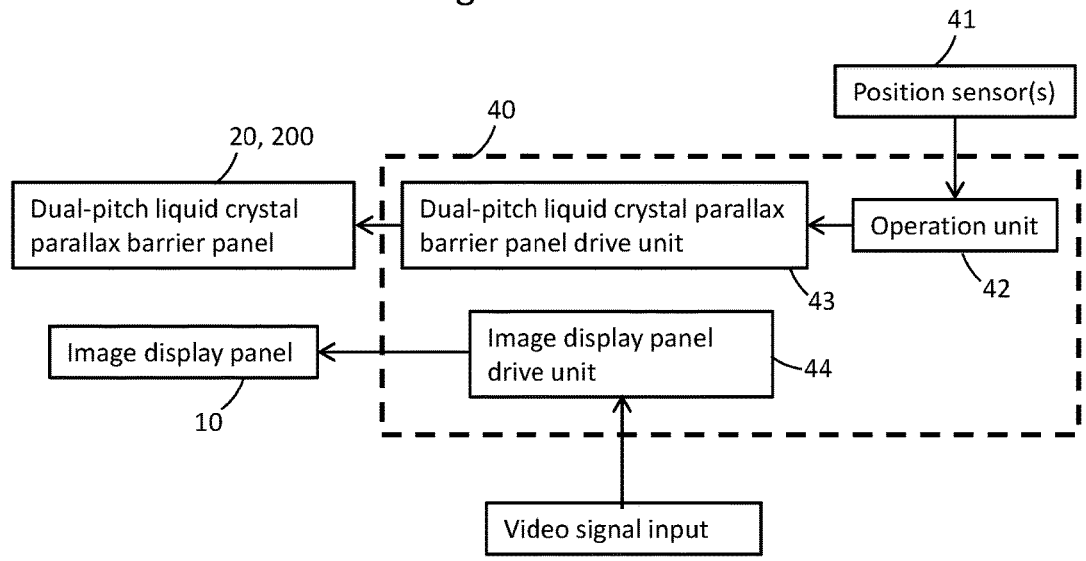
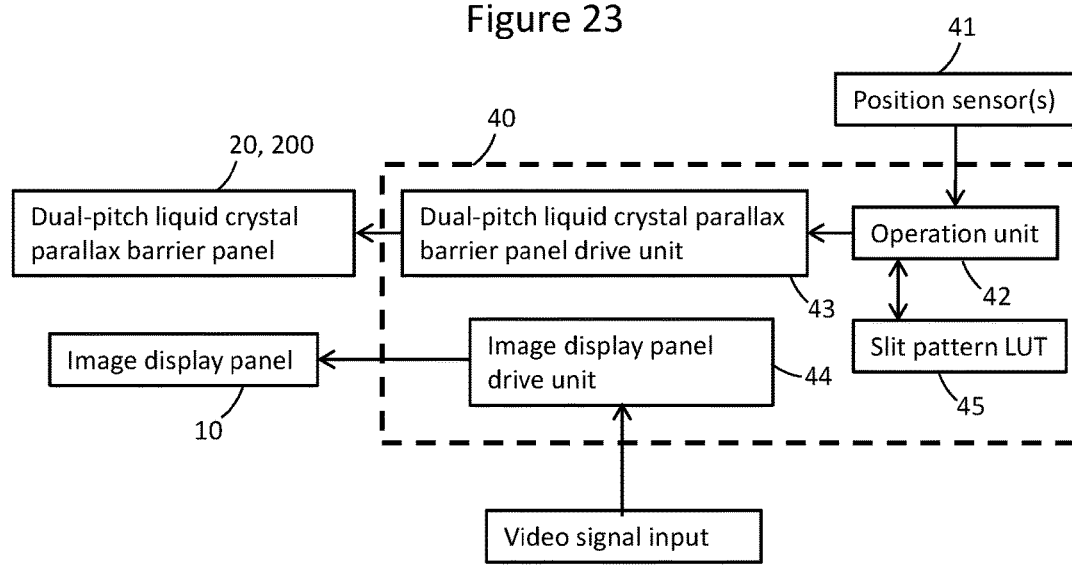

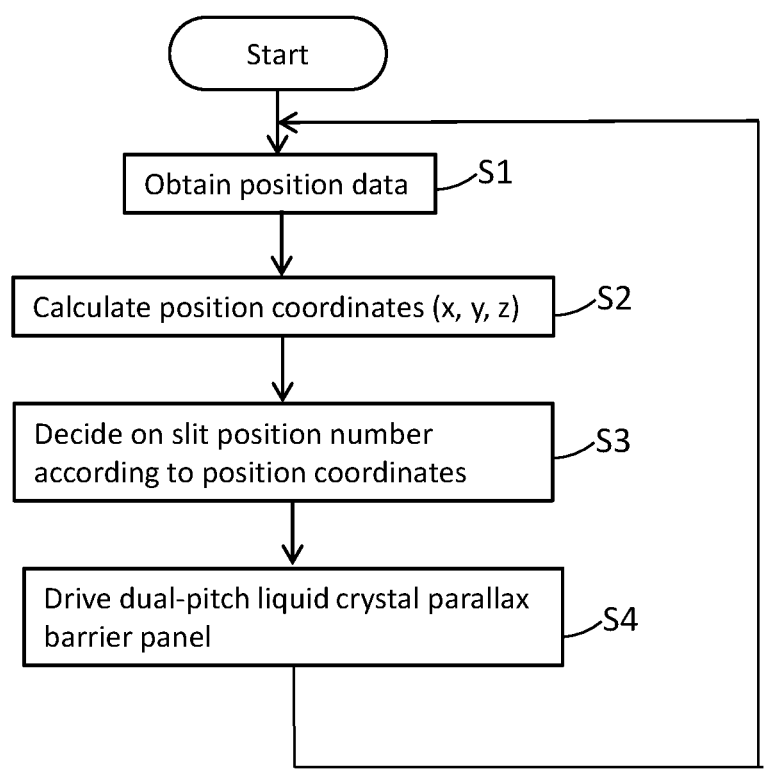

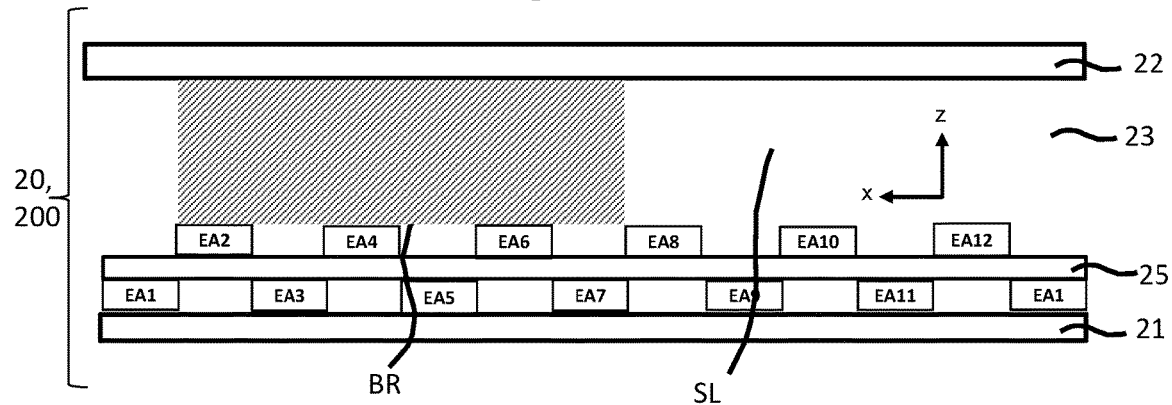
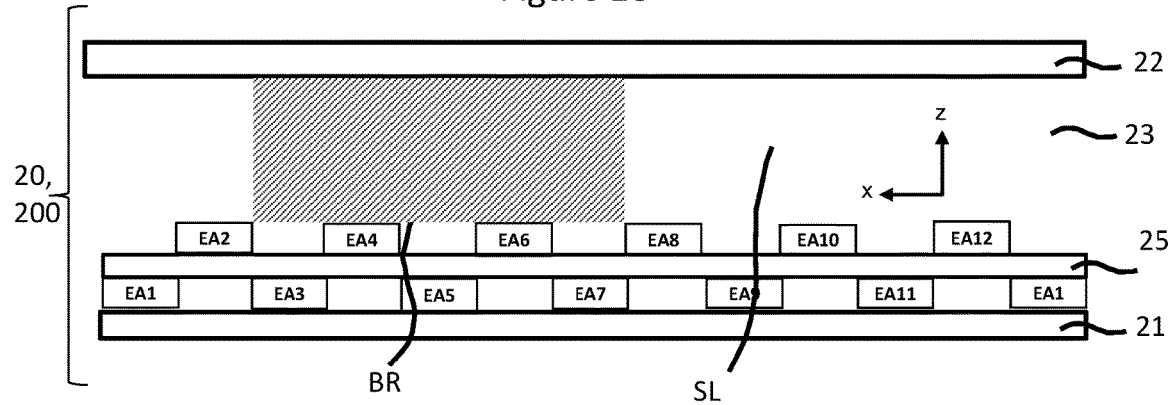
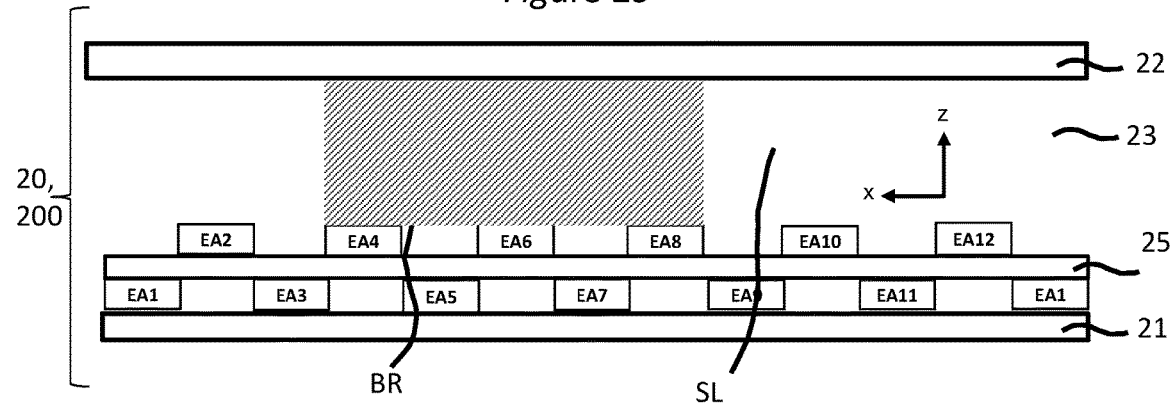

BR, WIDE    SL, NARROW

BR, NARROW    SL, WIDE

DUAL-PITCH PARALLAX BARRIER

TECHNICAL FIELD

This invention relates to switchable imaging optics for use in 3D autostereoscopic (no glasses) devices.

BACKGROUND ART

For many years people have been trying to create better autostereoscopic three dimensional (3D) displays, and this invention provides a further advance in this field. An autostereoscopic display is a display that gives stereoscopic depth without the user needing to wear special glasses. This is accomplished by projecting a different image to each eye. An autostereoscopic 3D display can be realised by using parallax optic technology such as a parallax barrier or lenticular lenses.

Many applications exist whereby a display is also required to operate in a high quality 2D mode and a high quality 3D mode. For the image display to show an image with 100% native resolution in the 2D mode, the parallax barrier must be switchable between a first mode that provides substantially no imaging function (2D mode) to a second mode of operation that provides an imaging function (3D mode). An example of a liquid crystal switchable parallax barrier technology is disclosed in U.S. Pat. No. 7,813,042B2 (Mather et al., issued Oct. 12, 2010).

The use of a parallax barrier to direct a different image directly to each eye to create a stereoscopic image for a static, non-moving user is well known. However, the user must remain fixed in space in order to view a high quality 3D image. Movement of the user's head from side to side (lateral movement of the head relative to the display device) causes the left eye image to be viewed with the right eye and vice versa. Viewing the left eye image with the right eye causes severe discomfort to the viewer. In order to solve this problem, a liquid crystal parallax barrier comprising multiple independently addressable electrodes may be used in conjunction with a head tracking system so that for a given viewing distance, the left eye image is always directed to the left eye and the right eye image is always directed to the right eye. The head tracking system determines the lateral position of the user's eyes and switches the appropriate electrodes on the liquid crystal parallax barrier to enable viewing of a stereoscopic image. Examples of such laterally tracking liquid crystal parallax barriers comprising multiple independently addressable electrodes and head tracking systems are disclosed in U.S. Pat. No. 5,969,850A1 (Harrold et al. issued Oct. 19, 1999), US20100110316A1 (Huang et al., published May 6, 2010), US20110157171A1 (Lin, published Jun. 30, 2011) US20130342586A1 (Kim et al., published, Dec. 26, 2013), US20120200680A1 (So et al., published Aug. 8, 2012), WO2014136610A1 (Murao et al., published Sep. 12, 2014), and US20160070111A1 (Takama et al., published Mar. 10, 2016).

For some applications, particularly on some small displays, a laterally tracked liquid crystal parallax barrier enables sufficient backwards and forwards (longitudinal) movement of the head relative to the display device to enable high quality 3D viewing. However, for other applications, laterally tracking liquid crystal parallax barriers have the disadvantage that movement of the user's head backwards and forwards (longitudinal movement) relative to the display device causes the left eye image to be viewed with the right eye and vice versa i.e., poor quality 3D viewing. WO2014092172A1 (Smith et al., published Jun. 19, 2014), U.S. Pat. No. 8,629,945B2 (Lo, issued Jan. 14, 2014), US20130187961A1 Hunt, published Jul. 25, 2013), US20140078268A1 (Watanabe et al., published Mar. 20, 2014), and applicant's commonly assigned application GB1512307.8 disclose that a liquid crystal parallax barrier comprised of multiple electrodes can enable lateral and longitudinal head tracking while maintaining good quality 3D viewing. U.S. Pat. No. 8,331,023B2 (Wu et al., issued Dec. 11, 2011) and US20130050596A1 (Chen et al., published Feb. 28, 2013) disclose the use of multiple stacked parallax barriers to enable lateral and longitudinal head movement while maintaining good quality 3D viewing. US 20140002758 (Huang et al., published Jan. 2, 2014) discloses the use of a liquid crystal lens array that can switch between a first pitch and a second pitch for improving 3D viewing distance. An active matrix parallax barrier to enable lateral and longitudinal head movement while maintaining good quality 3D viewing is described by D. Suzuki et al in the paper 73-2 "A Wide View Glass-less 3D Display with Head-Tracking System for Horizontal and Vertical Directions" page 990, SID 2016 DIGEST.

SUMMARY OF THE INVENTION

One aspect of the present invention provides an autostereoscopic (no glasses) display device 1 that enables viewing of high quality 3D images for a large range of lateral (left and right) head movements and a large range of longitudinal (forwards and backwards) head movements. The autostereoscopic (no glasses) display device includes an image display panel for displaying images and a dual-pitch liquid crystal parallax barrier panel. The dual-pitch liquid crystal parallax barrier panel may be switched off to enable viewing of 2D images or switched on to enable viewing of autostereoscopic (no glasses) 3D images.

The dual-pitch liquid crystal parallax barrier panel includes a first substrate with a first set of independently addressable electrodes that is repeated more than once, a second substrate with a second set of independently addressable electrodes that is repeated more than once, and a Liquid Crystal material between the first and second substrates. The said first set of electrodes has a first pitch. The said second set of electrodes has a second pitch.

In general, each set contains $n_i$ independently addressable electrodes, and said set of independently addressable electrodes is repeated $m_i$ times to extend across the width of the $i^{th}$ substrate of the dual-pitch liquid crystal parallax barrier, where n and m are positive integers and i is a positive integer between 1 and 2 corresponding, respectively, to the first and second substrates.

The electrode pitch EP may be constant in each substrate. The electrode pitch EP may vary in each substrate. Each substrate may have a unique electrode pitch.

The independently addressable electrodes may be deposited in a single layer configuration.

The independently addressable electrodes may be deposited in a dual layer configuration.

The autostereoscopic display device further includes a control circuit 40 and a position sensor(s). Control circuit includes an operation unit and a dual-pitch liquid crystal parallax barrier panel drive unit and an image display panel driver and may include a slit pattern look-up table (LUT). The image display panel driver drives the image display panel 10 based on input video signals and displays an image on the image display panel. The position sensor(s) and the operation unit determine the head/face/eye position of the autostereoscopic display device user. The parallax barrier panel drive unit drives the dual-pitch liquid crystal parallax barrier panel based on the head/face/eye position of the user to enable viewing of high quality 3D imaging (low 3D crosstalk).

A first aspect of the present invention provides a reconfigurable parallax barrier panel comprising a first substrate, a second substrate, an electro-optic material between first and second substrates and a drive unit for addressing the electro-optic material; wherein the first substrate of the panel has a first set of electrodes, the electrodes in the first set of electrodes being independently addressable from one another and comprising two or more electrode portions extending along a first direction and laterally spaced from one another along a second direction different from the first direction, the electrode portions in the first set of electrodes being arranged in a cyclic arrangement; wherein the second substrate of the panel has a second set of electrodes, the electrodes in the second set of electrodes being independently addressable from one another and independently addressable from the electrodes in the first set of electrodes, the second set of electrodes comprising two or more electrode portions extending along the first direction and laterally spaced from one another along the second direction, the electrode portions in the second set of electrodes being arranged in a cyclic arrangement. The parallax barrier panel is configured in a first mode to address, in use, the first and second set of electrodes on the basis of at least one received drive signal such that: the first set of electrodes define, in the panel, a first parallax barrier array with a first pitch selected from a plurality of predetermined parallax barrier arrays with a first pitch; or the second set of electrodes define, in the panel, a second parallax barrier array with a second pitch selected from the plurality of predetermined parallax barrier arrays with a second pitch.

The term "addressing" as used herein refers to applying voltages to one or more electrodes to define regions of desired transmissivity (in general either maximally transmissive or maximally absorbing) in the electro-optic material. In some cases the desired transmissivity may be obtained by applying a zero voltage to one or more electrodes. As used herein, the act of applying a voltage to an electrode in order to obtain a region of desired transmissivity in the electro-optic material is to be regarded as "addressing" the electrode, even if the applied voltage should be zero.

The present invention thus provides a reconfigurable parallax barrier panel that can provide one parallax barrier array with a first pitch and a second parallax barrier array with a second pitch, different from the first pitch. When the parallax barrier panel is used in a display, this allows improved control of the position (laterally with respect to the centre of the panel, and/or perpendicular to the plane of the panel) of the autostereoscopic viewing region of the display. To obtain a good autostereoscopic 3-D viewing zone the pitch of a parallax barrier would ideally vary as a function of viewing distance. The present invention provides an LC parallax barrier with two different selectable barrier pitches, and this effectively mimics a pitch that varies as a function of viewing distance.

It should follow naturally for those skilled in the art that n (where n is an integer greater than 1) reconfigurable parallax barrier panels provided in the present invention may be stacked together; each of the stacked reconfigurable parallax barrier panels having a first pitch and a second pitch that may be different from all the first pitches and second pitches of the remaining n−1 stacked reconfigurable parallax barrier panels. These stacked reconfigurable parallax barrier panels provide n*2 different selectable barrier pitches, and this effectively mimics a pitch that varies as a function of viewing distance.

The parallax barrier panel may be configured to, in a second mode, address the first and second set of electrodes on the basis of at least one received second drive signal such that the panel provides substantially no imaging function. When a panel of this embodiment is incorporated in a display, this allows the display to be operated in a conventional 2D display mode. In the second mode, the first and second set of electrodes may be addressed to define a substantially uniform, non-zero transmissivity over the entire addressable area of the panel, and for example such that the panel has maximal transmissivity over the entire addressable area of the panel.

Each set of electrodes may be arranged in a dual layer structure, with each electrode portion comprising a first part belonging to the first layer and a second part belonging to the second layer, the first and second parts of the electrode portion being offset from one another in the second direction by a distance substantially equal to the electrode gap, and the first and second layers being offset from one another in the thickness direction of the panel.

Each set of electrodes may be arranged in a dual layer structure, with at least some electrodes belonging to a first layer and the remaining electrodes belonging to a second layer, the distance between electrodes of the first layer in the second direction being substantially equal to the electrode width, the distance between electrodes of the second layer in the second direction being substantially equal to the electrode width, the first and second layer being offset from one another in the thickness direction of the panel and the first and second layer being offset in the second direction by a distance substantially equal to the electrode width.

Each set of electrodes may be arranged in a dual layer structure, with half of the electrodes belonging to a first layer and the remaining electrodes belonging to a second layer, the distance between electrodes of the first layer in the second direction being substantially equal to the electrode width, the distance between electrodes of the second layer in the second direction being substantially equal to the electrode width, the first and second layer being offset from one another in the thickness direction of the panel and the first and second layer being offset in the second direction by a distance substantially equal to the electrode width.

The first set of electrodes may be arranged in the same type of structure as the second set of electrodes. The first set of electrodes may be arranged in a type of structure different from the second set of electrodes.

A second aspect of the invention provides an arrangement comprising a parallax barrier panel of the first aspect and a control circuit for supplying one or more drive signals to the parallax barrier panel. The control circuit may be provided on the parallax barrier panel, or it may be separate from, but electrically connected to, the parallax barrier panel.

A third aspect of the invention provides a display comprising an image display panel; a parallax barrier panel of the first aspect disposed in an optical path through the image display panel; and a control circuit for supplying at least one drive signal to the parallax barrier panel.

In the second and third aspects, the control circuit may be constituted by individual, distributed control circuits that, for example, each drive electrodes of one substrate of the parallax barrier panel, or the control circuit may be constituted by a single control circuit that drives electrodes of both substrates of the parallax barrier panel.

The image display panel may comprise a transmissive panel, and the display may further comprise a backlight. The parallax barrier panel may be disposed behind the image display panel (to give a "rear barrier" arrangement), or the parallax barrier panel may be disposed in front of the image display panel (that is between the image display panel and an observer), to give a "front barrier" arrangement.

Alternatively, the image display panel may comprise an emissive panel. In this embodiment the parallax barrier panel is disposed in front of the image display panel.

The display may further comprise one or more position sensors for determining the position of an observer. The term "position" as used herein denotes the observer's position in the x- and/or z-directions, where the z-direction is perpendicular to the display face of the display, and the x-direction is a horizontal direction that is perpendicular to the z-direction.

The drive unit may be adapted to address the first and second set of electrodes in dependence on a determined position of the observer. This can provide improved 3-D viewing characteristics.

The control circuit may further comprise an operation processor for determining at least one drive signal for the first and second set of electrodes based on a determined position of the observer.

Alternatively, the control circuit may further comprise: a memory storing a plurality of drive signals for the first and second electrodes; and an operation processor for retrieving at least one of the drive signals stored in the memory based on a determined position of the observer.

In a display of the invention, the first set of electrodes may comprise 12 individual first electrodes; and the second set of electrodes may comprise 12 individual second electrodes, the electrodes in the first set of electrodes being independently addressable of one another, the electrodes in the second set of electrodes being independently addressable of one another and the electrodes in the first set of electrodes being independently addressable from the electrodes in the second set of electrodes.

BRIEF DESCRIPTION OF THE DRAWINGS

FIG. 7: Relationship between Slit Position Number and the voltage on each electrode (prior art)
FIG. 10: A liquid crystal parallax barrier
FIG. 11: Another liquid crystal parallax barrier
FIG. 14: Relationship between Slit Position Number and the voltage on each electrode
FIG. 15: Relationship between Slit Position Number and the voltage on each electrode
FIG. 22: Block diagram showing a functional configuration of an autostereoscopic display device
FIG. 23: Block diagram showing another functional configuration of an autostereoscopic display device
FIG. 24: Flowchart of a process performed by the autostereoscopic display device
FIG. 27: Sectional view of yet another dual layer electrode structure
FIG. 28: Sectional view of yet another dual layer electrode structure
FIG. 29: Sectional view of yet another dual layer electrode structure

DETAILED DESCRIPTION OF THE INVENTION

Figure 1:
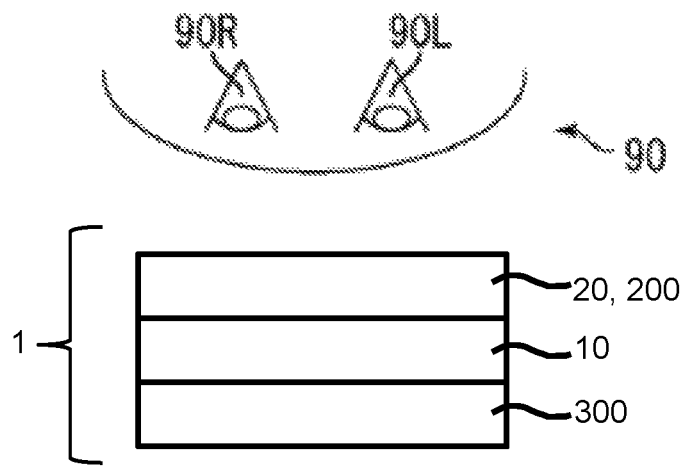
FIG. 1: Front barrier autostereoscopic display device

Below with reference to the accompanying drawings, will be described in detail, embodiments of the present invention. The same reference numerals are given to the same or corresponding portions in the drawings, and the description of a component that is used in multiple embodiments will not be repeated for each embodiment. In order to simplify the explanation, in the drawings referred to below, an illustrated configuration may be simplified or a portion of the component may be shown as schematic or omitted. The dimensional ratios between the components shown in the figures are not necessarily related to the actual dimensions ratio.

FIG. 1 shows an autostereoscopic display device 1 which includes an image display panel 10 and a switchable liquid crystal parallax barrier panel 20. The image display panel 10 may be a liquid crystal display (LCD) or an Organic Light Emitting Display (OLED), or other suitable display technology. If the image display panel 10 is a liquid crystal display (LCD) then a backlight unit 300 is used. The liquid crystal parallax barrier panel 20 may be disposed on the viewing side 90 of the autostereoscopic display device 1, also referred to as a front barrier system. The switchable liquid crystal parallax barrier panel 20 may be switched to perform a parallax barrier function which directs a first image from the image display panel 10 to the left eye 90L and directs a second image from the image display panel 10 to the right eye 90R to enable the viewing of an autostereoscopic 3D image. The switchable liquid crystal parallax barrier panel 20 may be switched to perform no parallax barrier function which does not direct light so that the same 2D image is simultaneously visible to both the left eye 90L and the right eye 90R. In the 2D mode, the switchable liquid crystal parallax barrier panel 20 is substantially transparent (i.e. has a transparency of >75% and preferably >90% for correctly polarised light).

Figure 2:
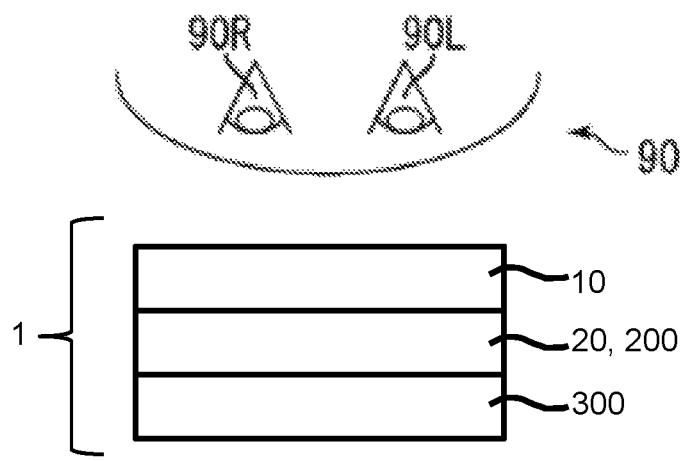
FIG. 2: Rear barrier autostereoscopic display device

FIG. 2 shows an autostereoscopic display device 1 which includes an image display panel 10 and a switchable liquid crystal parallax barrier panel 20. The image display panel 10 may be a liquid crystal display (LCD) or an Organic Light Emitting Display (OLED), or other suitable display technology. If the image display panel 10 is a liquid crystal display (LCD) then a backlight unit 300 is used. The image display panel 10 may be disposed on the viewing side 90 of the autostereoscopic display device 1, also referred to as a rear barrier system. The switchable liquid crystal parallax barrier panel 20 may be switched to perform a parallax barrier function which directs a first image from the image display panel 10 to the left eye 90L and directs a second image from the image display panel 10 to the right eye 90R to enable the viewing of an autostereoscopic image. The switchable liquid crystal parallax barrier panel 20 may be switched to perform no parallax barrier function which does not direct light so that the same 2D image is simultaneously visible to both the left eye 90L and the right eye 90R. In the 2D mode, the switchable liquid crystal parallax barrier panel 20 is substantially transparent (i.e. has a transparency of >75% and preferably >90% for correctly polarised light).

Unless stated otherwise, all subsequent embodiments are written in relation to FIG. 1 where the liquid crystal parallax barrier panel 20 is disposed on the viewing side 90 of the autostereoscopic display device 1, but it will be appreciated that the image display panel 20 may alternatively be disposed on the viewing side 90 of the autostereoscopic display device as shown in FIG. 2, and thus unless where otherwise stated, the principles of the present invention may be applied comparably in a rear barrier system as in a front barrier system. Unless stated otherwise, for all subsequent embodiments the image display panel 10 is a liquid crystal display panel, but in principle any suitable emissive or transmissive display panel may be used (with a transmissive display panel requiring a backlight).

Figure 3:
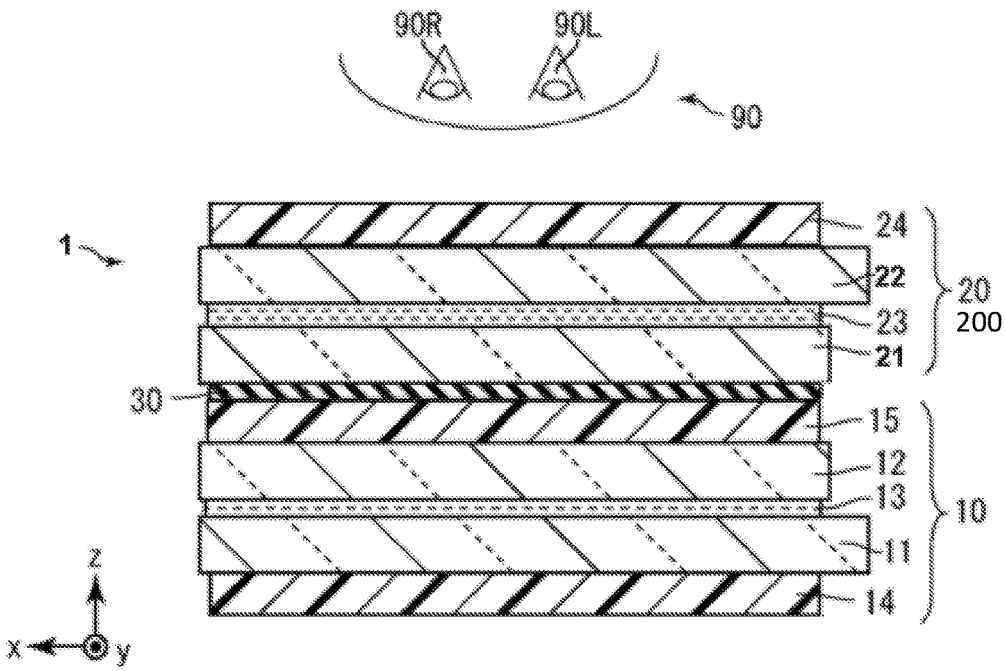
FIG. 3: Sectional view of an autostereoscopic display device (prior art)

FIG. 3 is a schematic sectional view showing a conventional autostereoscopic display device 1. Autostereoscopic display device 1 may include an image display panel 10, a switchable liquid crystal parallax barrier panel 20 and a bonding resin 30. The image display panel 10 and the switchable liquid crystal parallax barrier panel 20 are arranged to overlap, and the switchable liquid crystal parallax barrier panel 20 is on the observer 90 side. The image display panel 10 and the switchable liquid crystal parallax barrier panel 20 are bonded by an adhesive resin 30. The image display panel 10 may include a TFT (Thin Film Transistor) substrate 11, a CF (Colour Filter) substrate 12, a liquid crystal layer 13, and polarising plates 14 and 15. Image display panel 10 controls the TFT substrate 11 and the CF substrate 12, to manipulate the orientation of the liquid crystal molecules of the liquid crystal layer 13 in order to yield an image by adjusting the amount of light transmitted through each pixel. The backlight unit 300 is not shown in FIG. 3 for simplicity. The switchable liquid crystal parallax barrier panel 20 includes a first substrate 21, a second substrate 22, a liquid crystal layer 23, and a polarizing plate 24. Liquid crystal layer 23 is sandwiched between the first substrate 21 and the second substrate 22.

FIG. 4, FIG. 5, FIG. 6 and FIG. 7 will be used as reference material to describe a conventional (no dual-pitch) liquid crystal parallax barrier so as to provide contrast to the present invention.

Figure 4:
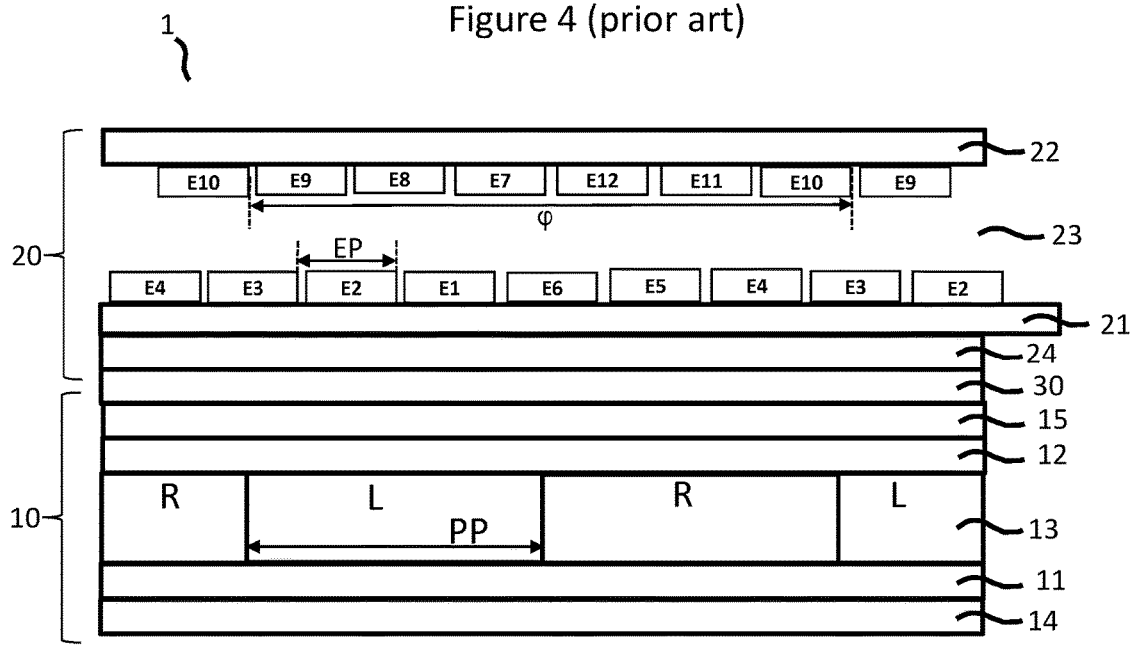
FIG. 4: Sectional view of an autostereoscopic display device (prior art)

FIG. 4 is a further sectional view showing an autostereoscopic device 1 containing a conventional liquid crystal parallax barrier 20. The first substrate 21 and the second substrate 22 include a plurality of independently addressable electrodes, labelled E1, E2, E3, E4, E5, E6, E7, E8, E9, E10, E11 and E12. The first substrate 21 includes a single layer of independently addressable electrodes, labelled E1, E2, E3, E4, E5 and E6 arranged in a cyclic arrangement (i.e. electrode E1 is adjacent to electrodes E2 and E6). The second substrate 22 includes a single layer of independently addressable electrodes, labelled E7, E8, E9, E10, E11 and E12 arranged in a cyclic arrangement (i.e. electrode E7 is adjacent to electrodes E8 and E12). In other words, a different voltage may be applied to (addressed to) each of the electrodes labelled E1 to E12, meaning each electrode labelled E1 to E12 may be independently controlled. The electrode pitch EP is shown in FIG. 4. The electrodes set pitch, φ, is shown in FIG. 4. The size of the pixel pitch PP for a pixel of the image display panel 10 is also shown in FIG. 4. In the autostereoscopic 3D mode, alternate pixels may be addressed with a left eye image (L) and a right eye image (R). The electrodes set pitch φ may be approximately equal to 6 times electrode pitch (2*EP). The electrodes set pitch φ may be approximately equal to two times pixel pitch (2*PP).

Figure 5:
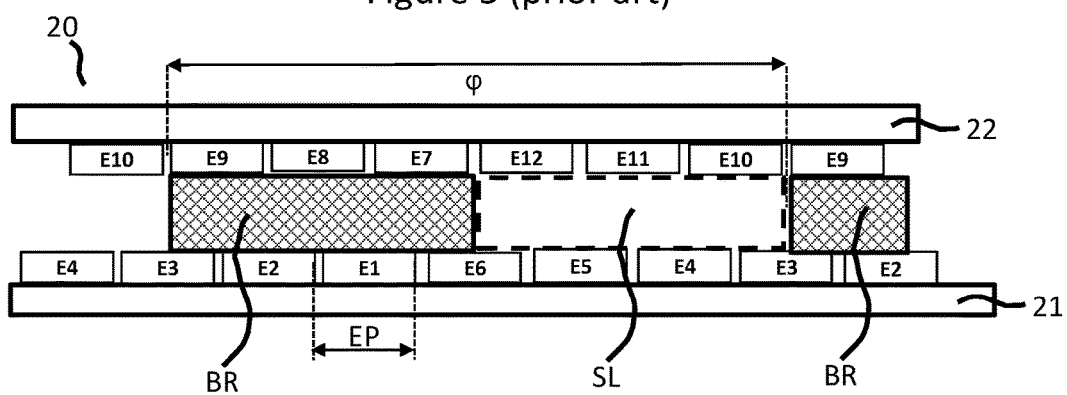
FIG. 5: A liquid crystal parallax barrier (prior art)
Figure 6:
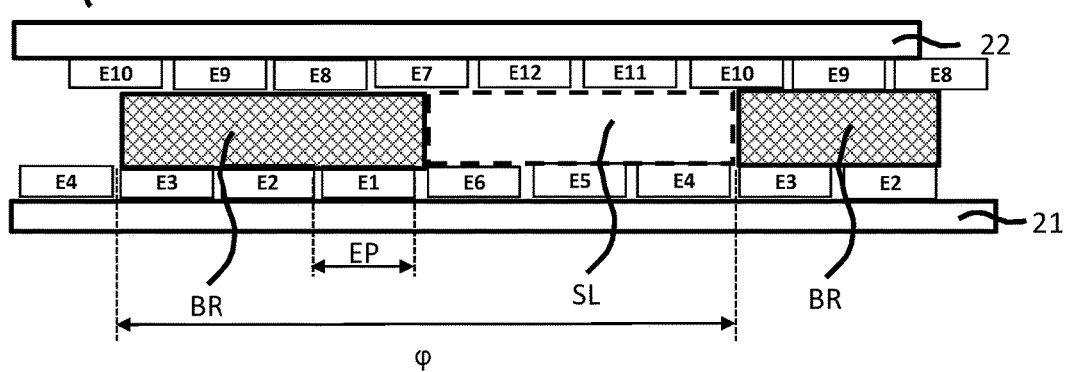
FIG. 6: A liquid crystal parallax barrier (prior art)

FIG. 5 and FIG. 6 are drawn in relation to FIG. 4. With reference to FIG. 5 and FIG. 6, a parallax barrier may be formed in the switchable liquid crystal parallax barrier panel 20 by application of voltages to the independently addressable electrodes (E1 to E12). The parallax barrier includes a non-transmissive area, henceforth referred to as the barrier, BR, and a transmissive area, henceforth referred to as the slit, SL. In practice the non-transmissive area or "barrier" may not be completely opaque and the transmissive area or "slit" may not be completely transmissive, and these areas should more properly be referred to as "minimally transmissive" and "maximally transmissive" areas. However, the terms "non-transmissive" and "transmissive" typically are used for convenience by those of ordinary skill in the art.

In one example the barrier BR may be formed via the application of a potential difference between the electrodes on the first substrate 21 and the electrodes on the second substrate 22 in combination with the polarisers 14 and 24 (not shown in FIGS. 5 and 6, but shown in FIG. 4). In other words, in this example the switchable liquid crystal parallax barrier panel 20 is a normally white mode. Alternatively, the slit SL may be formed via the application of a potential difference between the electrodes on the first substrate 21 and the electrodes on the second substrate 22 in combination with the polarisers 14 and 24 (again not shown). In other words, in this alternative example the switchable liquid crystal parallax barrier panel 20 is a normally black mode. Unless stated otherwise, for all subsequent embodiments it is assumed that the switchable liquid crystal parallax barrier panel 20 is a normally white mode.

FIG. 5 shows that a first voltage is applied to, or addressed to, the electrodes E7, E8 and E9, and a second voltage is applied to the remaining electrodes E1, E2, E3, E4, E5, E6, E10, E11 and E12. The potential difference between the first voltage and the second voltage in combination with the polarisers 14 and 24 (not shown) is sufficient to make a barrier (non-transmissive area). FIG. 5 shows the barrier (BR) width may be approximately equal to the slit (SL) width, which is approximately equal to half the electrodes set pitch φ.

FIG. 6 shows a first voltage applied to, or addressed to, the electrodes E1, E2 and E3 and a second voltage is applied to, or addressed to, the remaining electrodes E4, E5, E6, E7, E8, E9, E10, E11, and E12. FIG. 6 shows that the position of the barrier (BR) area and the position of the slit (SL) area have moved by a distance approximately equal to EP/2 relative to the position of the barrier (BR) area and the position of the slit (SL) area shown in FIG. 5.

For the electrode arrangement of FIG. 5 and FIG. 6, the slit (SL) position has 12 unique locations. Each slit position has an associated slit position number. With reference to FIG. 5, the slit position number is defined as equal to 9. With reference to FIG. 6, the slit position number is defined as equal to 10. The full relationship between Slit Position Number and Electrode value is shown in FIG. 7. With reference to FIG. 7, a "0" denotes the second voltage and takes the value of 0V (i.e. the electrode is turned off). With reference to FIG. 7 a "1" denotes the first voltage and takes the value of V volts which may be in the range 2.5V to 9V (i.e. the electrode is turned on). With reference to FIG. 7, the slit position numbers are cyclical and therefore the slit position associated with slit position number 1 is adjacent to the slit positions described by the slit position numbers 2 and 12.

With reference to FIG. 4, FIG. 5 and FIG. 6, since each electrode is created via a photolithographic process, the electrode pitch (EP) and the set pitch ($\varphi$) cannot be changed dynamically. In other words, the distances EP and $\varphi$ are fixed according to a particular design, and said distances may not be actively controlled.

FIG. 8, FIG. 9, FIG. 10, FIG. 11, FIG. 12, FIG. 13, FIG. 14 and FIG. 15 will be used to describe a novel type of liquid crystal parallax barrier 20, the dual-pitch liquid crystal parallax barrier 200, in accordance with embodiments of the present invention.

Figure 8:
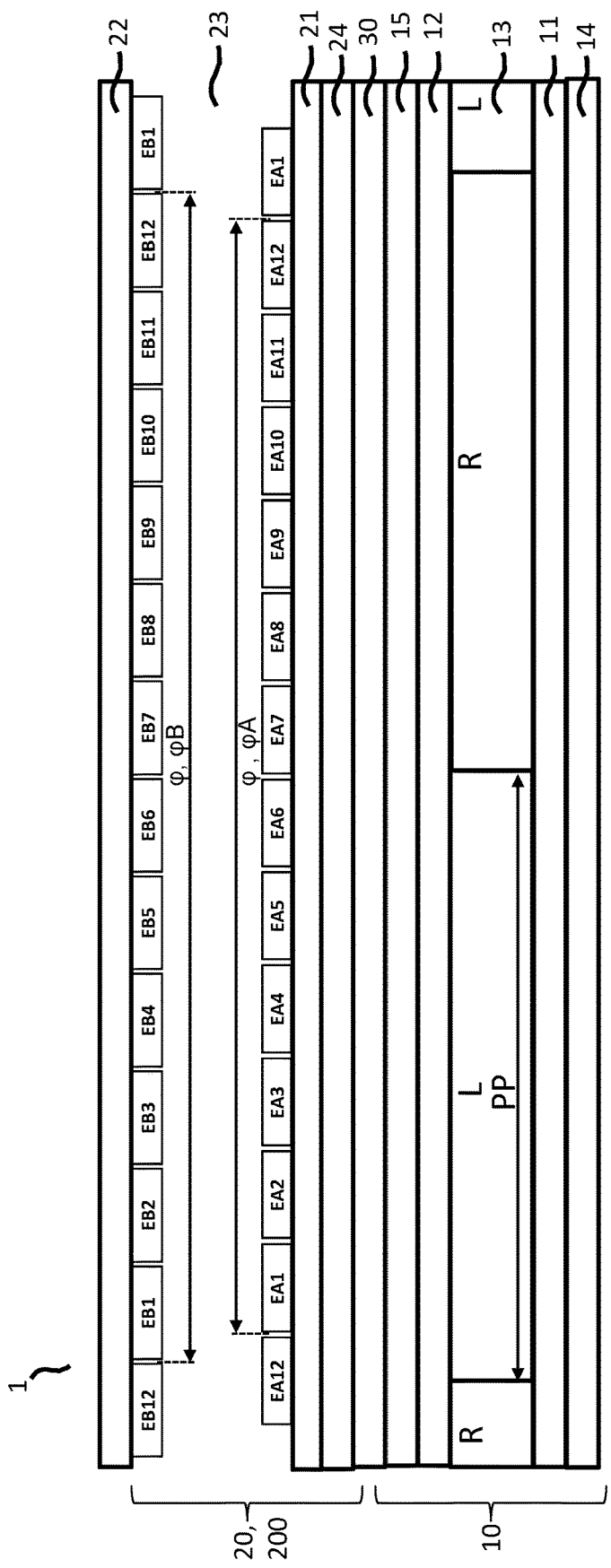
FIG. 8: Sectional view of an autostereoscopic display device

FIG. 8 is a sectional view showing an autostereoscopic display device 1 containing a new type of liquid crystal parallax barrier panel 20, configured as a novel dual-pitch liquid crystal parallax barrier 20, 200. The first substrate 21 includes a plurality of independently addressable electrodes, labelled EA1, EA2, EA3, EA4, EA5, EA6, EA7, EA8, EA9, EA10, EA11 and EA12. The second substrate 22 includes a plurality of independently addressable electrodes, labelled EB1, EB2, EB3, EB4, EB5, EB6, EB7, EB8, EB9, EB10, EB11 and EB12. The first substrate 21 includes a single layer of independently addressable electrodes, labelled EA1, EA2, EA3, EA4, EA5, EA6, EA7, EA8, EA9, EA10, EA11 and EA12 in a cyclic arrangement (i.e. electrode EA1 is adjacent to electrode EA2 and EA12). The second substrate 22 includes a single layer of independently addressable electrodes, labelled EB1, EB2, EB3, EB4, EB5, EB6, EB7, EB8, EB9, EB10, EB11 and EB12 in a cyclic arrangement (i.e. electrode EB1 is adjacent to electrode EB2 and EB12). In other words, a different voltage may be applied to (addressed to) each of the electrodes labelled EA1 to EA12 and EB1 to EB12, i.e. each electrode labelled EA1 to EA12 and EB1 to EB12 may be independently controlled. Electrodes labelled EA1 to EA12 are a first set of electrodes. The first set of electrodes may be repeated in a cyclic arrangement to extend across the width of the image display 10. Electrodes labelled EB1 to EB12 are a second set of electrodes. The second set of electrodes may be repeated in a cyclic arrangement to extend across the width of the image display 10. There may be more than 12 electrodes in a set, which may enable better head tracking accuracy. There may be fewer than 12 electrodes in a set, which may enable simpler drive electronics. The number of electrodes in the first set pertaining to the first substrate may be the same as, or different from, the number of electrodes in the second set pertaining to the second substrate. The use of 12 electrodes in a set has been found to be a good balance between head tracking accuracy and drive electronics complexity. Unless stated otherwise, for all subsequent embodiments, it is assumed that there are 12 electrodes both in the first and second set of electrodes. The electrodes EA1 to EA12 may be evenly spaced apart. The electrodes EB1 to EB12 may be evenly spaced apart.

Figure 25:
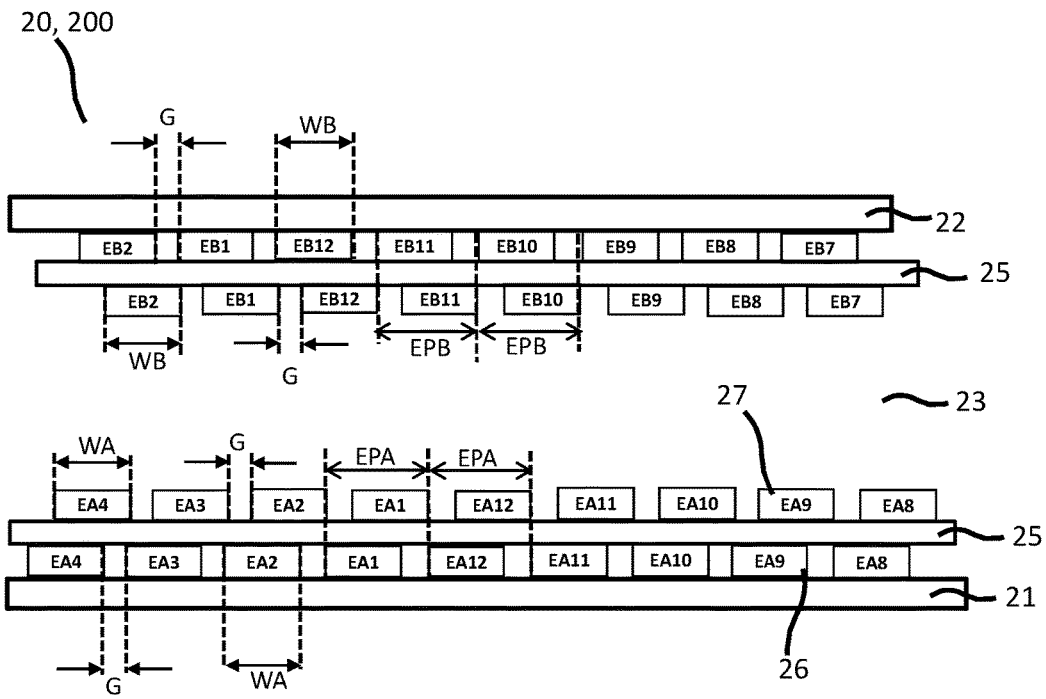
FIG. 25: Sectional view of a dual layer electrode structure

Unless stated otherwise, for all subsequent electrode descriptions it is assumed the electrodes are configured according to either FIG. 8 or FIG. 25, with electrodes EA1, EA2, EA3, EA4, EA5, EA6, EA7, EA9, EA9, EA10, EA11 and EA12 deposited on the first substrate 21 in a cyclic arrangement, and electrodes EB1, EB2, EB3, EB4, EB5, EB6, EB7, EB9, EB9, EB10, EB11 and EB12 deposited on the second substrate 22 in a cyclic arrangement. The first set pitch, $\varphi A$, of the first set of independently addressable electrodes and the second set pitch, $\varphi B$, of the second set of independently addressable electrodes are shown in FIG. 8. The size of the pixel pitch PP for a pixel of the image display panel 10 is also shown in FIG. 8. In the autostereoscopic 3D mode, alternate pixels may be addressed with a left eye image (L) and a right eye image (R). The first set pitch $\varphi A$ and the second set pitch $\varphi B$ may be approximately ($\pm 5\%$) equal to two times pixel pitch ($2*PP$). The first set pitch $\varphi A$ and the second set pitch $\varphi B$ may be substantially ($\pm 1\%$) equal to two times pixel pitch ($2*PP$). The first set pitch $\varphi A$ may be greater than the second set pitch $\varphi B$. The first set pitch $\varphi A$ may be smaller than the second set pitch $\varphi B$. Unless stated otherwise, the first set pitch $\varphi A$ is smaller than the second set pitch $\varphi B$ for all subsequent embodiments.

More precisely, for a front barrier autostereoscopic display device 1, the first set pitch $\varphi A$ may be defined as $$\varphi A = \frac{2*PP*Vd*n}{n*Vd+s}$$

where PP is the pixel pitch of the image panel 10 in the direction of parallax (x-direction), Vd is the desired viewing distance, s is the separation from the image display panel layer 13 to the switchable liquid crystal parallax barrier layer 23 and n is the average refractive index between the image display panel layer 13 to the switchable liquid crystal parallax barrier layer 23. The second set pitch $\varphi B$ may be similar to first set pitch $\varphi A$ but different enough to create a second 3D viewing zone 70B (see FIG. 19) such that, when used together with a first 3D viewing zone 70A (see FIG. 19) created by the first set pitch $\varphi A$, the configuration enables viewing of high quality 3D images for a large range of lateral head movements and a large range of longitudinal head movements (further explanations on how this can be achieved are described below). Second set pitch $\varphi B$ may be determined more precisely by optical ray tracing simulation software (for example ray tracing software). Alternatively, for a front barrier autostereoscopic display device 1, the second set pitch $\varphi B$ may be defined as $$\varphi B = \frac{2*PP*Vd*n}{n*Vd+s}$$

where PP is the pixel pitch of the image panel 10 in the direction of parallax (x-direction), Vd is the desired viewing distance, s is the separation from the image display panel layer 13 to the switchable liquid crystal parallax barrier layer 23 and n is the average refractive index between the image display panel layer 13 to the switchable liquid crystal parallax barrier layer 23. The first set pitch φA may be similar to second set pitch φB but different enough to create a first 3D viewing zone 70A (see FIG. 19) such that, when used together with a second 3D viewing zone 70B (see FIG. 19) created by the second set pitch φB, the configuration enables viewing of high quality 3D images for a large range of lateral head movements and a large range of longitudinal head movements (further explanations on how can this be achieved described below). First set pitch φA may be determined more precisely by optical ray tracing simulation software (for example ray tracing software). Alternatively, for a front barrier autostereoscopic display device 1, the first set pitch φA or the second φB may be determined by the formula $$\frac{2PP}{1+\left(\frac{PP}{e}\right)}$$

where PP is the pixel pitch of the image panel 10 in the direction of parallax (x-direction) and e is the eye separation (typically ~62 mm), while the remainder of either the first set pitch φA or the second φB is determined by optical ray tracing simulation software. Alternatively, for a front (or rear) barrier autostereoscopic display device 1, the first set pitch φA and the second φB may be determined by optical ray tracking simulation software.

With Reference to

Figure 9:
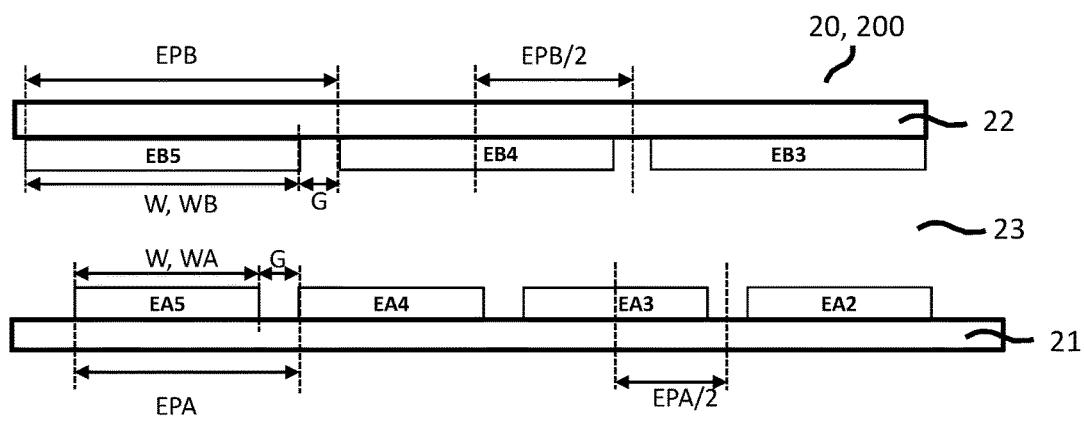
FIG. 9: Relationship between electrode positions according to present invention

FIG. 9, the width, WA, of each electrode (i.e. the width of each electrode portion) of the first set of electrodes may be the same for each electrode or alternatively may vary from one electrode to another depending upon the position relative to the image display 10. The width, WB, of each electrode (i.e. the width of each electrode portion) of the second set of electrodes may be the same for each electrode or alternatively may vary from one electrode to another depending upon the position relative to the image display 10. The widths WA and WB may be different from one another or alternatively may be substantially equal to one another. Unless stated otherwise, the width, WA, of each electrode in the first set of electrodes is assumed to be the same for each electrode in the first set of electrodes in all subsequent embodiments. Unless stated otherwise, the width, WB, of each electrode in the second set of electrodes is assumed to be the same for each electrode in the second set of electrodes in all subsequent embodiments. Unless stated otherwise, the widths, WA and WB, are assumed to be different from one another in all subsequent embodiments. Note that for simplicity, not all electrodes are shown in FIG. 9.

With Reference to

FIG. 9, the gap, G, between two adjacent electrodes may be the same for each pair of adjacent electrodes, or alternatively may vary from one electrode pair to another depending upon the position relative to the image display 10. The gap, G, pertaining to the first substrate 21 may be the same as, or different from, the gap, G, pertaining to the second substrate 22. Unless stated otherwise, the gap, G, is assumed to be the same for each pair of adjacent electrodes in all subsequent embodiments. Unless stated otherwise, the gap, G, is assumed to be the same on the first substrate 21 and the second substrate 22 in all subsequent embodiments.

With Reference to

FIG. 9, the first electrode pitch, EPA is equal to G+WA and may be the same for each electrode in the first set of electrodes or alternatively may vary from one electrode to another depending upon the position relative to the image display 10. The second electrode pitch, EPB is equal to G+WB and may be the same for each electrode in the second set of electrodes or alternatively may vary from one electrode to another depending upon the position relative to the image display 10. The first and second electrode pitches, EPA and EPB, may be different from one another or alternatively may be substantially equal to one another. Unless stated otherwise, the first electrode pitch, EPA, is assumed to be the same for each electrode in the first set of electrodes in all subsequent embodiments. Unless stated otherwise, the second electrode pitch, EPB, is assumed to be the same for each electrode in the second set of electrodes in all subsequent embodiments. Unless stated otherwise, the first and second electrode pitches, EPA and EPB, are assumed to be different from one another.

With reference to FIG. 8,

FIG. 9 and FIG. 25 the first set pitch, φA, is equal to 12*EPA. The first set pitch, φA, may be the same for each first set of electrodes or may vary from one first set of electrodes to another first set of electrodes depending upon the position relative to the image display 10. Unless stated otherwise, the first set pitch, φA, is assumed to be the same for each first set of electrodes in all subsequent embodiments. With reference to FIG. 8, FIG. 9 and FIG. 25 the second set pitch, φB, is equal to 12*EPB The second set pitch, φB, may be the same for each second set of electrodes or may vary from one second set of electrodes to another second set of electrodes depending upon the position relative to the image display 10. Unless stated otherwise, the second set pitch, φB, is assumed to be the same for each second set of electrodes in all subsequent embodiments. Since the width of each electrode (WA and WB) and the gap (G) between each electrode is defined via a photolithographic process, the width of each electrode (WA and WB) and the gap (G) between each electrode and the electrode pitches (EPA and EPB) and the set pitches (φA and φB) cannot be changed dynamically. In other words, the distances WA, WB, G, EPA, EPB, φA and φB are fixed according to a particular design and said distances may not be actively controlled.

The electrode configuration shown in FIG. 8 and

FIG. 9 is just one example of an electrode configuration compatible with the invention. Alternative to FIG. 8 and FIG. 9, dual layer of electrodes may be used for the dual-pitch liquid crystal parallax barrier panel 20, 200. An example of dual layer electrodes is shown in FIG. 25. With reference to FIG. 25, the first substrate 21 has a dual layer electrode structure and the second substrate 22 has a dual layer electrode structure. The first substrate 21 includes a first layer of independently addressable electrodes (EA1 to EA12) deposited upon the first substrate 21 in a cyclic arrangement, an insulating layer 25 deposited upon the first layer of independently addressable electrodes, and a second layer of independently addressable electrodes (EA1 to EA12) deposited upon the insulating layer 25 in a cyclic arrangement. Note that electrodes EA5 to EA7 are not shown in FIG. 25 for simplicity. An example of the independently addressable electrode EA9 pertaining to the first layer of the first substrate 21 is shown by reference 26 in FIG. 25. An example of the independently addressable electrode EA9 pertaining to the second layer of the first substrate is shown by reference 27 in FIG. 25. The first layer electrodes of the first substrate 21 may be offset from the second layer of electrodes of the first substrate 21 by an amount equal to, or substantially equal to (i.e. within 6 μm and preferably within 4 μm), G, the electrode gap. The first layer electrodes of the second substrate 22 may be offset from the second layer of electrodes of the second substrate 22 by an amount equal to, or substantially equal to (i.e. within 6 μm and preferably within 4 μm), G, the electrode gap.

Still with reference to FIG. 25, the second substrate 22 includes a first layer of independently addressable electrodes (EB1 to EB12) deposited upon the second substrate 22 in a cyclic arrangement, an insulating layer 25 deposited upon the first layer of independently addressable electrodes, and a second layer of independently addressable electrodes (EB1 to EB12) deposited upon the insulating layer 25 in a cyclic arrangement. Note that electrodes EB3 to EB6 are not shown in FIG. 25 for simplicity. The first layer electrodes of the second substrate 22 may be offset from the second layer of electrodes of the second substrate 22 by an amount equal to, or substantially equal to (i.e. within 6 μm and preferably within 4 μm), G, the electrode gap. The insulating layer 25 (located between the first layer of independently addressable electrodes and the second layer of independently addressable electrodes) prevents electrical contact between the first layer of independently addressable electrodes and the second layer of independently addressable electrodes in the image display area (i.e. the area of the autostereoscopic display device 1 that displays an image). The insulating layer 25 may be, for example, Silicon Nitride (SiNx) and may have a thickness in the range 150 nm to 300 nm.

With reference to FIG. 25, the first layer of electrodes may be electrically connected to the second layer of electrodes in a predetermined fashion. The electrical connection of the first layer of electrodes with the second layer of electrodes occurs outside of the image display area. The electrical connection of the first layer of electrodes with the second layer of electrodes is not shown in FIG. 25. In general, electrode Exn pertaining to the first layer may be electrically connected to the same numbered electrode Exn pertaining to the second layer, where n is an integer 1 to 12 and x is equal to A or B. For example, electrode EA8 of the first layer may be electrically connected to a corresponding electrode EA8 of the second layer outside of the image display area. Electrode Exn may be an independently addressable electrode that exists on both the first layer and the second layer simultaneously. Electrode EAn has a width WA and gap G between neighbouring electrodes of the same layer. Electrode EBn has a width WB and gap G between neighbouring electrodes of the same layer.

With reference to FIG. 25, the width WA of each independently addressable electrode pertaining to the first layer of the first substrate 21 may be the same as, or may be different from, the width WA of other independently addressable electrodes pertaining to the first layer of the first substrate 21. The gap G between an adjacent pair of independently addressable electrodes (for example, EA3 and EA4) pertaining to the first layer of the first substrate 21 may be the same as, or may be different from, the gap G between other adjacent pairs of independently addressable electrodes pertaining to the first layer of the first substrate 21. The width WA of each independently addressable electrode pertaining to the second layer of the first substrate 21 may be the same as, or may be different from, the width WA of other independently addressable electrodes pertaining to the second layer of the first substrate 21. The gap G between an adjacent pair of independently addressable electrodes (for example, EA3 and EA4) pertaining to the second layer of the first substrate 21 may be the same as, or may be different from, the gap G between other adjacent pairs of independently addressable electrodes pertaining to the second layer of the first substrate 21. The width WA of each independently addressable electrode pertaining to the first layer of the first substrate 21 may be the same as, or may be different from, the width WA of other independently addressable electrodes pertaining to the second layer of the first substrate 21. The gap G between an adjacent pair of independently addressable electrodes (for example, EA9 and EA10) pertaining to the first layer of the first substrate 21 may be the same as, or may be different from, the gap G between other adjacent pairs of independently addressable electrodes pertaining to the second layer of the first substrate (for example EA8 and EA9).

Still with reference to FIG. 25, the width WB of each independently addressable electrode pertaining to the first layer of the second substrate 22 may be the same as, or may be different from, the width WB of other independently addressable electrodes pertaining to the first layer of the second substrate 22. The gap G between an adjacent pair of independently addressable electrodes (for example, EB3 and EB4) pertaining to the first layer of the second substrate 22 may be the same as, or may be different from, the gap G between other adjacent pairs of independently addressable electrodes pertaining to the first layer of the second substrate 22. The width WB of each independently addressable electrode pertaining to the second layer of the second substrate 22 may be the same as, or may be different from, the width WB of other independently addressable electrodes pertaining to the second layer of the second substrate 22. The gap G between an adjacent pair of independently addressable electrodes (for example, EB3 and EB4) pertaining to the second layer of the second substrate 22 may be the same as, or may be different from, the gap G between other adjacent pairs of independently addressable electrodes pertaining to the second layer of the second substrate 22. The width WB of each independently addressable electrode pertaining to the first layer of the second substrate 22 may be the same as, or may be different from, the width WB of other independently addressable electrodes pertaining to the second layer of the second substrate 22. The gap G between an adjacent pair of independently addressable electrodes (for example, EB9 and EB10) pertaining to the first layer of the second substrate 22 may be the same as, or may be different from, the gap G between other adjacent pairs of independently addressable electrodes pertaining to the second layer of the second substrate (for example EB8 and EB9). The width, WA, of each independently addressable electrode of the first set of electrodes may be the same for each electrode or alternatively may vary from one electrode to another depending upon the position relative to the image display 10. The width, WB, of each independently addressable electrode of the second set of electrodes may be the same for each electrode or alternatively may vary from one electrode to another depending upon the position relative to the image display 10. The widths WA and WB may be different from one another or alternatively may be substantially equal to one another.

With reference to FIG. 25, the first layer of independently addressable electrodes may be offset from the second layer of independently addressable electrodes in order to effectively remove the gap G between electrodes that exists for a non-dual layer electrode configuration. In other words, the first layer of independently addressable electrodes may be offset from the second layer of independently addressable electrodes by an amount G to effectively remove the gap G.

With reference to FIG. 25, the left most edge of electrode EA12 pertaining to the first layer is laterally coincident with the right most edge of electrode EA1 pertaining to the second layer. With reference to FIG. 25, the right most edge of electrode EA12 pertaining to the second layer is laterally coincident with the left most edge of electrode EA11 pertaining to the first layer. If electrode EA12 of the first layer is electrically connected to electrode EA12 of the second layer, then EA12 may be considered as a single electrode of width EPA. In other words, the electrode pitch effectively contains no gaps between the independently addressable electrodes. For example and with reference to FIG. 25, there is effectively no gap between electrode EA12 and electrode EA1. With reference to FIG. 25, the left most edge of electrode EB12 pertaining to the first layer is laterally coincident with the right most edge of electrode EB1 pertaining to the second layer. With reference to FIG. 25, the right most edge of electrode EB12 pertaining to the second layer is laterally coincident with the left most edge of electrode EB11 pertaining to the first layer. If electrode EB12 of the first layer is electrically connected to electrode EB12 of the second layer, then EB12 may be considered as a single electrode of width EPB. In other words, the electrode pitch effectively contains no gaps between the independently addressable electrodes. For example and with reference to FIG. 25, there is effectively no gap between electrode EB12 and electrode EB1.

With reference to FIG. 25, a dual layer electrode configuration may be used on the first substrate only and a single layer electrode configuration used on the second substrate. A dual layer electrode configuration may be used on the second substrate only and a single layer electrode configuration used on the first substrate. A dual layer electrode configuration may be used on both the first and second substrates as shown in FIG. 25.

An advantage of the dual layer electrode configuration (FIG. 25) is that it may enable higher quality 3D (lower optical 3D crosstalk) than a single layer electrode configuration (FIG. 8). The dual layer electrode configuration of electrodes effectively eliminates the gap, G, between the independently addressable electrodes to enable higher quality 3D (lower optical 3D crosstalk). This is explained with reference to FIG. 10, FIG. 11, FIG. 12 and FIG. 13.

In FIG. 10, FIG. 11, FIG. 12 and FIG. 13, the barrier BR appears continuous until a slit SL is reached, but FIG. 10, FIG. 11, FIG. 12 and FIG. 13 do not show accurately the impact of a finite gap G on the barrier BR. More accurately and, not shown in FIG. 10, FIG. 11, FIG. 12 and FIG. 13, the barrier BR may have very small slit SL areas that occur at the gap G between adjacent independently addressable electrodes. These unwanted very small slit SL areas (not shown) that puncture the barrier area BR give rise to unwanted optical 3D crosstalk. These very small transmissive slit areas in the barrier area may be eliminated if the dual layer electrode configuration of FIG. 25 is used, owing to the offset between the first layer of independently addressable electrodes and the second layer of independently addressable electrodes. A disadvantage of the dual electrode layer configuration of electrodes is that it may be more expensive to fabricate than a single electrode layer configuration.

FIG. 8 and FIG. 25 both show a dual-pitch liquid crystal parallax barrier panel 200. Although the details of the electrode configuration shown in FIG. 25 is different from the electrode configuration shown in FIG. 8, for all subsequent embodiments the dual-pitch liquid crystal parallax barrier panel 20,200 pertaining to FIG. 8 and FIG. 25 are effectively interchangeable.

With reference to FIG. 10, FIG. 11, FIG. 12 and FIG. 13, a parallax barrier may be formed in the switchable dual-pitch liquid crystal parallax barrier panel 20,200 by application of voltages to the independently addressable electrodes (EA1 to EA12 and EB1 to EB12). FIG. 10, FIG. 11, FIG. 12 and FIG. 13 are drawn in relation to FIG. 8 but are also applicable to FIG. 25. The parallax barrier includes a non-transmissive area, henceforth referred to as the barrier, BR, and a transmissive area, henceforth referred to as the slit, SL. As referenced above, in practice the non-transmissive area or "barrier" will not be completely opaque, and the transmissive area or "slit" will not be completely transmissive, and these areas should more properly be referred to as "minimally transmissive" and "maximally transmissive" areas. However, the terms "non-transmissive" and "transmissive" are used for convenience by those of ordinary skill in the art. In one example the barrier BR may be formed via the application of a potential difference between the electrodes on the first substrate 21 and the electrodes on the second substrate 22 in combination with the polarisers 14 and 24 (not shown, but shown in FIG. 4). In other words, in this example the switchable dual-pitch liquid crystal parallax barrier panel 20,200 is a normally white mode. Alternatively, the slit SL may be formed via the application of a potential difference between the electrodes on the first substrate 21 and the electrodes on the second substrate 22 in combination with the polarisers 14 and 24 (not shown). In other words, in this alternative example the switchable dual-pitch liquid crystal parallax barrier panel 20, 200 is a normally black mode. Unless stated otherwise, for all subsequent embodiments it is assumed that the switchable dual-pitch liquid crystal parallax barrier panel 20, 200 is a normally white mode.

FIG. 10 shows that a first voltage is applied to the electrodes EA1, EA2, EA3, EA4, EA11 and EA12, and a second voltage is applied to the remaining electrodes EA5, EA6, EA7, EA8, EA9, EA10 and EB1 to EB12. The potential difference between the first voltage and the second voltage in combination with the polarisers 14 and 24 (not shown) is sufficient to make a barrier (non-transmissive area). The switchable dual-pitch liquid crystal parallax barrier panel 20, 200 may be a 90° Twisted Nematic mode. The potential difference between the first voltage and the second voltage may be in the range 2.5V to 9V. The potential difference between the first voltage and the second voltage may be in the range 4V to 6V. Unless stated otherwise, for all subsequent embodiments it is assumed that the second voltage is grounded, i.e. 0V.

FIG. 10 shows the barrier (BR) width is approximately equal to the slit (SL) width which is approximately equal to the width of 6*EPA. Alternatively, the barrier width may be made approximately equal to 7*EPA for example by applying the first voltage to the electrodes EA1, EA2, EA3, EA4, EA10, EA11 and EA12, and applying a second voltage to the remaining electrodes EA5, EA6, EA7, EA8, EA9, and EB1 to EB12. Alternatively, the barrier width may be made approximately equal to 5*EPA for example by applying the first voltage to the electrodes EA1, EA2, EA3, EA4 and EA12, and applying a second voltage to the remaining electrodes EA5, EA6, EA7, EA8, EA9, EA10, EA11 and EB1 to EB12. Alternatively, similar logic can be used to make the barrier width equal to n*EPA, where n is an integer number between 1 and 11. Unless stated otherwise, for all subsequent embodiments it is assumed that the barrier (BR) width is approximately equal to the slit (SL) width which is approximately equal to the width of 6*EPA, as shown in FIG. 10.

FIG. 11 shows that a first voltage is applied to the electrodes EB1, EB2, EB3, EB4, EB11 and EB12, and a second voltage is applied to the remaining electrodes EB5, EB6, EB7, EB8, EB9, EB10 and EA1 to EA12. The potential difference between the first voltage and the second voltage in combination with the polarisers 14 and 24 (not shown) is sufficient to make a barrier (non-transmissive area). The switchable dual-pitch liquid crystal parallax barrier panel 20, 200 may be a 90° Twisted Nematic mode. The potential difference between the first voltage and the second voltage may be in the range 2.5V to 9V. The potential difference between the first voltage and the second voltage may be in the range 4V to 6V. Unless stated otherwise, for all subsequent embodiments it is assumed that the second voltage is grounded, i.e. 0V.

FIG. 11 shows the barrier (BR) width is approximately equal to the slit (SL) width which is approximately equal to the width of 6*EPB. Alternatively, the barrier width may be made approximately equal to 7*EPB for example by applying the first voltage to the electrodes EB1, EB2, EB3, EB4, EB10, EB11 and EB12 and applying a second voltage to the remaining electrodes EB5, EB6, EB7, EB8, EB9, and EA1 to EA12. Alternatively, the barrier width may be made approximately equal to 5*EPB for example by applying the first voltage to the electrodes EB1, EB2, EB3, EB4 and EB12 and applying a second voltage to the remaining electrodes EB5, EB6, EB7, EB8, EB9, EB10 and EA1 to EA12. Alternatively, similar logic can be used to make the barrier width equal to n*EPB, where n is an integer number between 1 and 11. Unless stated otherwise, for all subsequent embodiments it is assumed that the barrier (BR) width is approximately equal to the slit (SL) width which is approximately equal to the width of 6*EPB, as shown in FIG. 11.

Figure 12:
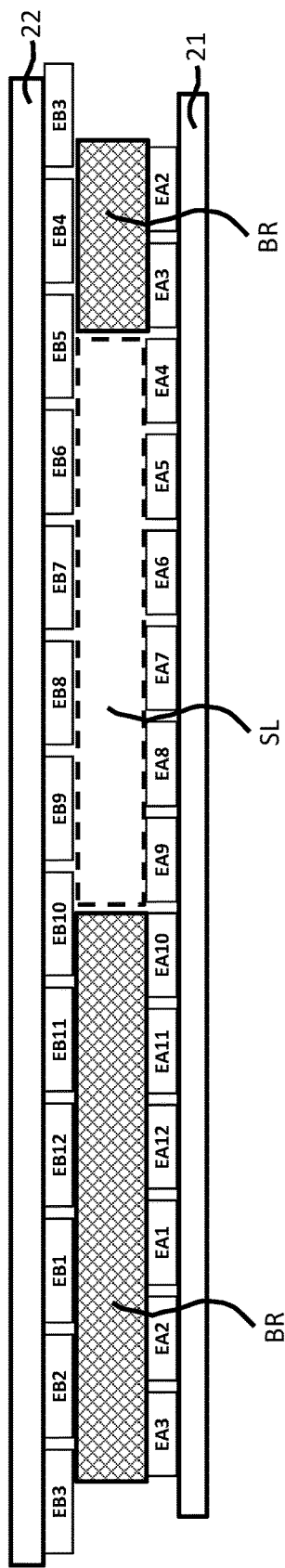
FIG. 12: Yet another liquid crystal parallax barrier

FIG. 10 shows a first voltage applied to, or addressed to, the electrodes EA1, EA2, EA3, EA4, EA11 and EA12 and a second voltage is applied to, or addressed to, the remaining electrodes EA5, EA6, EA7, EA8, EA9, EA10 and EB1 to EB12. FIG. 10 is drawn in relation to FIG. 8 but is also applicable to FIG. 25. The potential difference between the first voltage and the second voltage in combination with the polarisers 14 and 24 (not shown) is sufficient to make a barrier BR (non-transmissive area). FIG. 12 shows a first voltage applied to, or addressed to, the electrodes EA1, EA2, EA3, EA10, EA11 and EA12, and a second voltage is applied to, or addressed to, the remaining electrodes EA4, EA5, EA6, EA7, EA8, EA9, and EB1 to EB12. FIG. 12 shows that the position of the barrier (BR) area and the position of the slit (SL) area have moved by a distance approximately equal to EPA relative to the position of the barrier (BR) area and the position of the slit (SL) area shown in FIG. 10.

For the electrode arrangement of FIG. 10 and FIG. 12, the slit (SL) position has 12 unique locations. Each slit position has an associated slit position number. With reference to FIG. 10, the slit position number is defined as equal to 4A. With reference to FIG. 12 the slit position number is defined as equal to 3A. The full relationship between Slit Position Number and Electrode value is shown in FIG. 14.

With reference to FIG. 14, a "0" denotes the second voltage and takes the value of 0V (i.e. the electrode is turned off). With reference to FIG. 14 a "1" denotes the first voltage and takes the value of V volts which may be in the range 2.5V to 9V (i.e. the electrode is turned on). With reference to FIG. 14, the slit position numbers are cyclical and therefore the slit position associated with slit position number 1A is adjacent to the slit positions described by the slit position numbers 2A and 12A.

Figure 13:
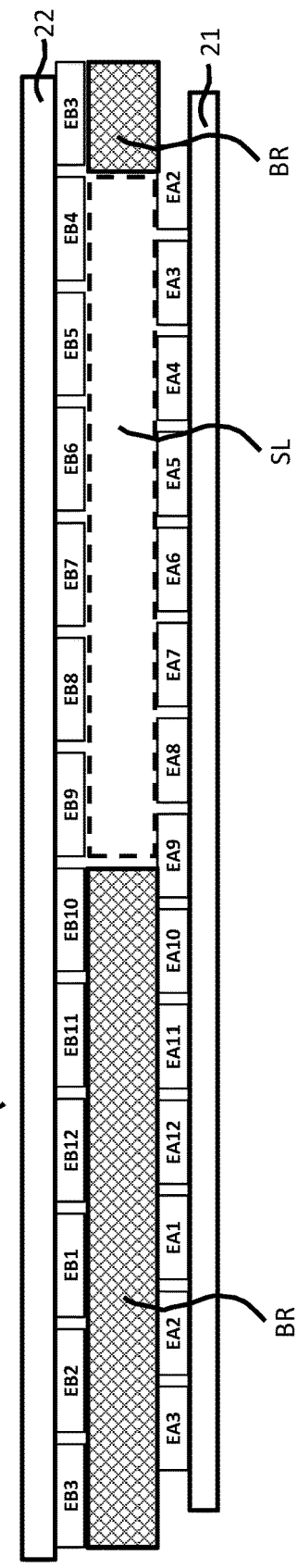
FIG. 13: Yet another liquid crystal parallax barrier

FIG. 11 shows a first voltage applied to, or addressed to, the electrodes EB1, EB2, EB3, EB4, EB11 and EB12, and a second voltage is applied to, or addressed to, the remaining electrodes EB5, EB6, EB7, EB8, EB9, EB10 and EA1 to EA12. FIG. 11 is drawn in relation to FIG. 8 but is also applicable to FIG. 25. The potential difference between the first voltage and the second voltage in combination with the polarisers 14 and 24 (not shown) is sufficient to make a barrier BR (non-transmissive area). FIG. 13 shows a first voltage applied to, or addressed to, the electrodes EB1, EB2, EB3, EB10, EB11 and EB12 and a second voltage is applied to, or addressed to, the remaining electrodes EB4, EB5, EB6, EB7, EB8, EB9, and EA1 to EA12. FIG. 13 shows that the position of the barrier (BR) area and the position of the slit (SL) area have moved by a distance approximately equal to EPB relative to the position of the barrier (BR) area and the position of the slit (SL) area shown in FIG. 11.

For the electrode arrangement of FIG. 11 and FIG. 13, the slit (SL) position has 12 unique locations. Each slit position has an associated slit position number. With reference to FIG. 11, the slit position number is defined as equal to 4B. With reference to FIG. 13 the slit position number is defined as equal to 3B. The full relationship between Slit Position Number and Electrode value is shown in FIG. 15. With reference to FIG. 15, a "0" denotes the second voltage and takes the value of 0V (i.e. the electrode is turned off). With reference to FIG. 15 a "1" denotes the first voltage and takes the value of V volts which may be in the range 2.5V to 9V (i.e. the electrode is turned on). With reference to FIG. 15, the slit position numbers are cyclical and therefore the slit position associated with slit position number 1B is adjacent to the slit positions described by the slit position numbers 2B and 12B.

With reference to FIG. 4, FIG. 5, FIG. 6 and FIG. 7, and the other prior art cited in the background section (especially WO 2014136610 A1), a conventional switchable liquid crystal parallax barrier panel 20 may be used in conjunction with an image display panel 10, a camera, face/head/eye tracking software and a control unit to steer a left image to the left eye 90L and right image to the right eye 90R to enable viewing of high quality 3D images for a large range of lateral head movements. In essence, as the user moves left or right, the face/head/eye tracking software recognizes the change in the user's lateral position and sends information to the control unit which switches on the appropriate electrodes to enable viewing of high quality 3D images.

Figure 16:
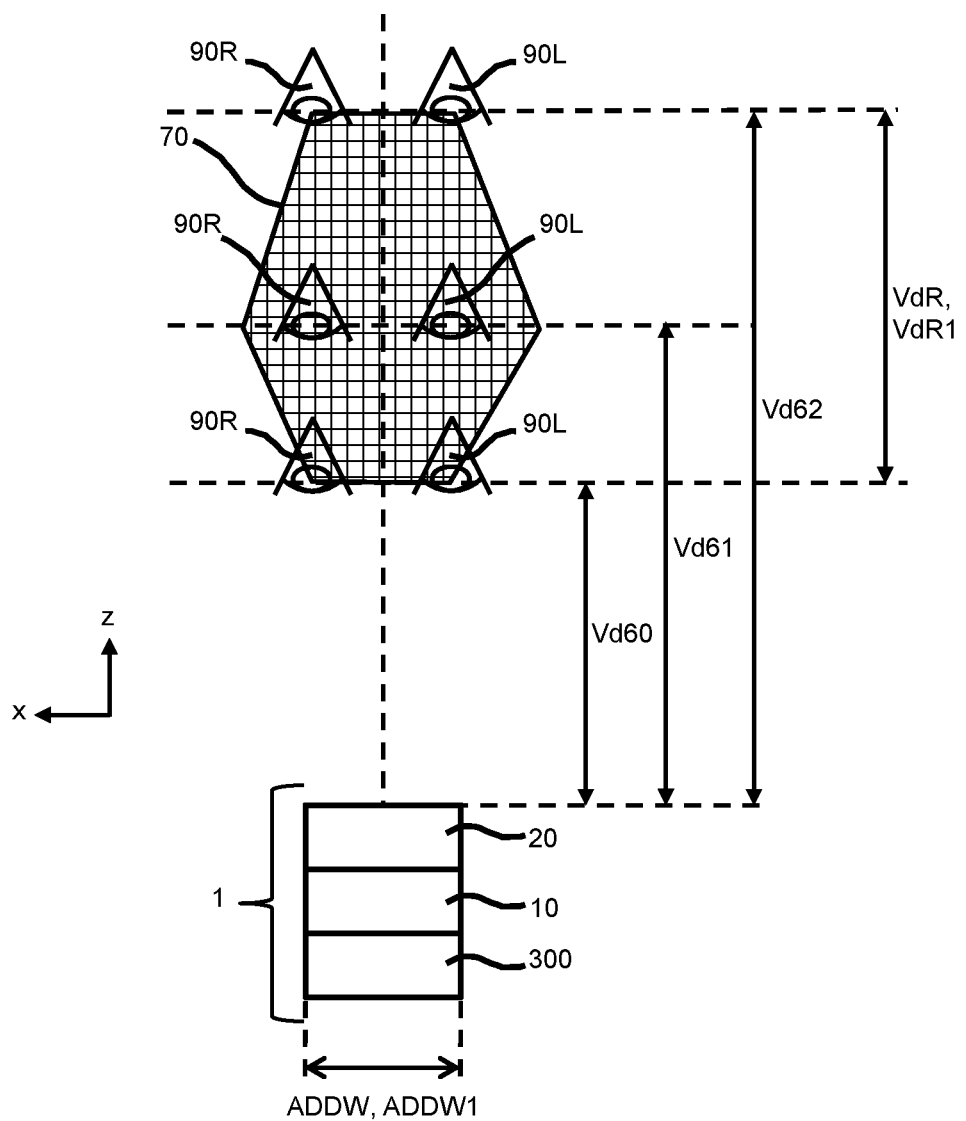
FIG. 16: Illustration of a 3D viewing zone

FIG. 16 shows a representation of the 3D viewing zone 70 for an on-axis viewer of the autostereoscopic display device 1 as configured in the prior art configurations (i.e. the viewer's head position is positioned in the middle of the autostereoscopic display device 1 as shown by the dashed line that bisects the eyes 90R and 90L). The extent of the 3D viewing zone 70 (the shaded area) may be calculated exactly via optical modelling software, for example, using ray tracing software. The lateral and longitudinal extent of the 3D viewing zone 70 shown in FIG. 16 is drawn for illustrative purposes only in order to teach the reader about the invention. When both the user's eyes (90R and 90L) are located within the 3D viewing zone 70, the user may view high quality 3D images. The right eye image shown on the image display panel 10 is directed to the right eye 90R of the viewer with the conventional switchable liquid crystal parallax barrier panel 20. The left eye image shown on the image display panel 10 is directed to the left eye 90L of the viewer with the conventional switchable liquid crystal parallax barrier panel 20. With reference to FIG. 7, the 3D viewing zone 70 for a single slit position number is illustrated in FIG. 16. If the viewer moves left or right (lateral movement) so that at least one eye is outside the 3D viewing zone 70, then low quality 3D images will be perceived since left eye image will be perceived by the right eye 90R and vice versa. To prevent this, if the viewer moves left or right (lateral movement), the slit position number (and hence the electrode voltages) may be changed so that the 3D viewing zone 70 always encompasses both eyes and high quality 3D viewing is maintained (i.e. a head/face/eye tracking system is used). In general, the lateral width of the autostereoscopic display device 1 is represented by ADDW, and specific to FIG. 16 the lateral width of the autostereoscopic display device 1 is represented by ADDW1. The electrode group pitch (φ) may be chosen to provide an optimal 3D viewing distance as shown by Vd61 using the equation $$\varphi = \frac{2*PP*Vd*n}{n*Vd+s}.$$

FIG. 16 shows that with the viewer at viewing distance Vd61, some lateral head movement can be tolerated for the same slit position number while maintaining high quality 3D image. FIG. 16 shows that with the viewer at viewing distance Vd60 or Vd62, no lateral head movement can be tolerated for the same slit position number while maintaining high quality 3D image. FIG. 16 illustrates that there is a minimum viewing distance Vd60 and a maximum viewing distance Vd62. For practical purposes, the minimum viewing distance Vd60 may be slightly closer to the optimum viewing distance Vd61 than illustrated by FIG. 16. For practical purposes, the maximum viewing distance Vd62 may be slightly closer to the optimum viewing distance Vd61 than illustrated by FIG. 16. For simplicity, it will be assumed that Vd60 is the minimum viewing distance and Vd62 is the maximum viewing distance. In general, the difference between the maximum viewing distance Vd62 and the minimum viewing distance Vd60 is the longitudinal viewing distance range VdR (i.e. VdR=Vd62-Vd60) and specific to FIG. 16 the longitudinal viewing distance range is VdR1. The size of the longitudinal viewing distance range VdR is a function of the many parameters. Two of the parameters that determine the size of VdR are the autostereoscopic display device width ADDW (lateral width) and the optimum viewing distance Vd61. As illustrated by FIG. 16, a viewing distance range VdR1 may be achieved for a given optimum viewing distance Vd61 and a given autostereoscopic display device width ADDW1.

Figure 17:
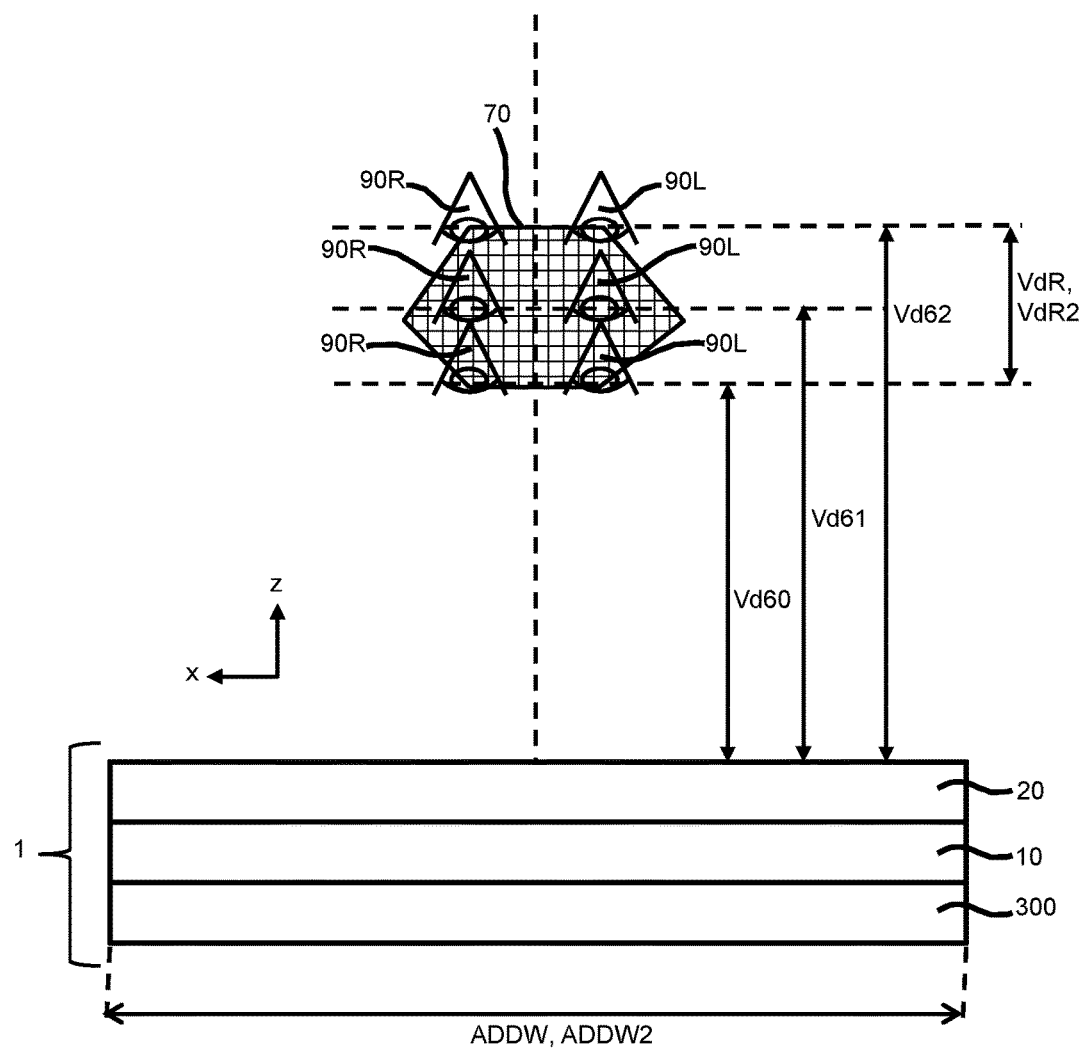
FIG. 17: Illustration of another 3D viewing zone

FIG. 17 shows a representation of the 3D viewing zone 70 for an on-axis viewer of an autostereoscopic display device 1 and is essentially the same as that described in FIG. 16. The optimum viewing distance Vd61 shown in FIG. 17 is the same as the optimum viewing distance Vd61 shown in FIG. 16. The autostereoscopic display device width ADDW2 in FIG. 17 is larger than the autostereoscopic display device width ADDW1 in FIG. 16. The effect of increasing the width of the autostereoscopic display device from ADDW1 to ADDW2 decreases the longitudinal viewing distance range VdR (i.e. the maximum viewing distance Vd62 minus the minimum viewing distance Vd60 has decreased).

Figure 18:
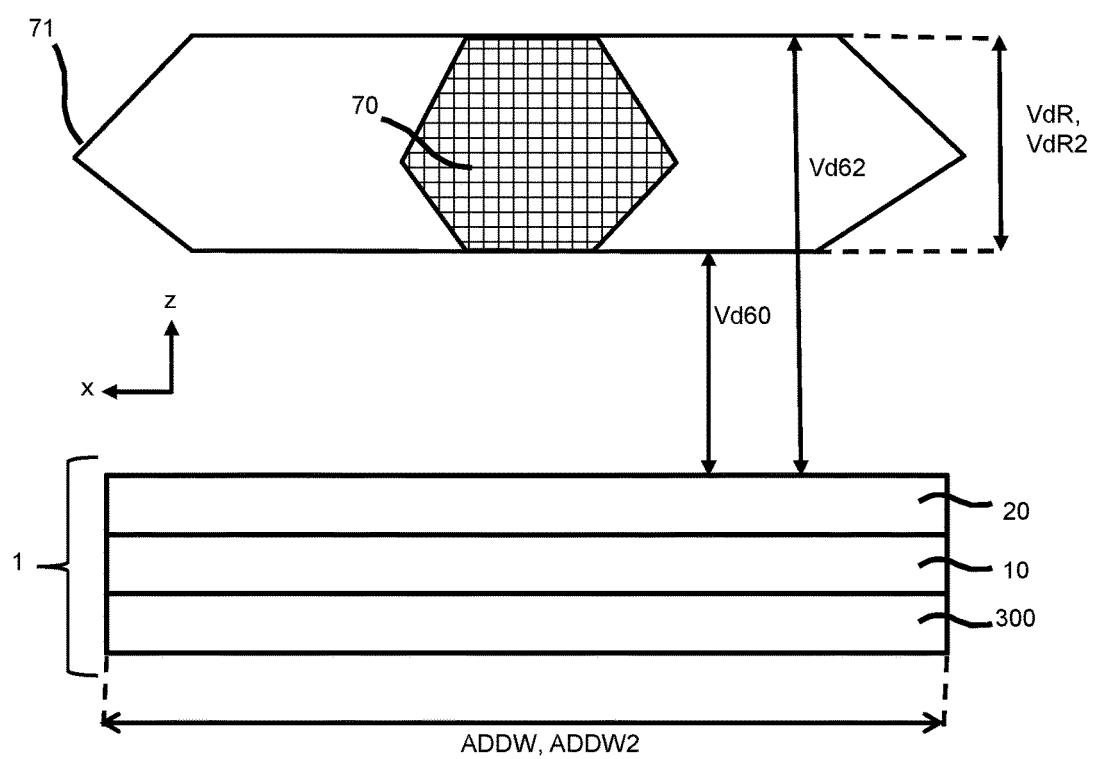
FIG. 18: Illustration of an effective 3D viewing zone

FIG. 18 is drawn with reference to FIG. 17. With reference to FIG. 7, FIG. 17 and FIG. 18, by controlling the switchable liquid crystal parallax barrier panel 20 and selecting different Slit position numbers, the 3D viewing zone 70 can be moved in the lateral (left and right) direction leading to an effective 3D viewing zone 71. The effective 3D viewing zone 71 represents the zone in space where, the viewer's eyes (90R and 90L) may be located and, the user may still observe high quality 3D images.

As illustrated by FIG. 17 and FIG. 18, a second viewing distance range VdR2 may be achieved for a given optimum viewing distance Vd61 and a given autostereoscopic display device width ADDW2. For many applications, the desired optimum viewing distance Vd61 and the desired autostereoscopic display device width ADDW conspire to yield a longitudinal viewing distance range VdR that is insufficiently small.

It has been reported in the prior art that the effective longitudinal viewing distance range VdR may be increased by actively controlling the electrode group pitch (φ) of the switchable liquid crystal parallax barrier panel 20 by actively controlling the pitch of each electrode (EP) so that for a given head position, a high quality 3D image is observed. With reference to the equation $$\varphi = \frac{2*PP*Vd*n}{n*Vd+s},$$

it is clear that actively controlling the electrode group pitch (φ) enables control over the optimum viewing distance Vd (i.e. Vd61). However, since the electrodes, and consequently the electrode group pitch φ, are defined by photolithographic processes according to a particular design, the optimum viewing distance Vd cannot be actively adjusted using conventional art.

A surprising experimental result was found that has enabled the effective longitudinal viewing distance range VdR to be increased significantly using a parallax barrier design and method that does not actively control the electrode group pitch (φ). This surprising experimental result has enabled the design of a new type of switchable liquid crystal parallax barrier panel 20, which utilizes the configuration of the parallax barrier 200 of the present invention. The new type of switchable liquid crystal parallax barrier panel 200 enables a larger longitudinal viewing distance range VdR to be realised, and thus high quality 3D images may be viewed for a wide variety of head positions. The new type of liquid crystal parallax barrier panel 200 is the dual-pitch liquid crystal parallax barrier panel as described previously with reference to FIG. 8, FIG. 9, FIG. 10, FIG. 11, FIG. 12, FIG. 13, FIG. 14 and FIG. 15.

Figure 19:
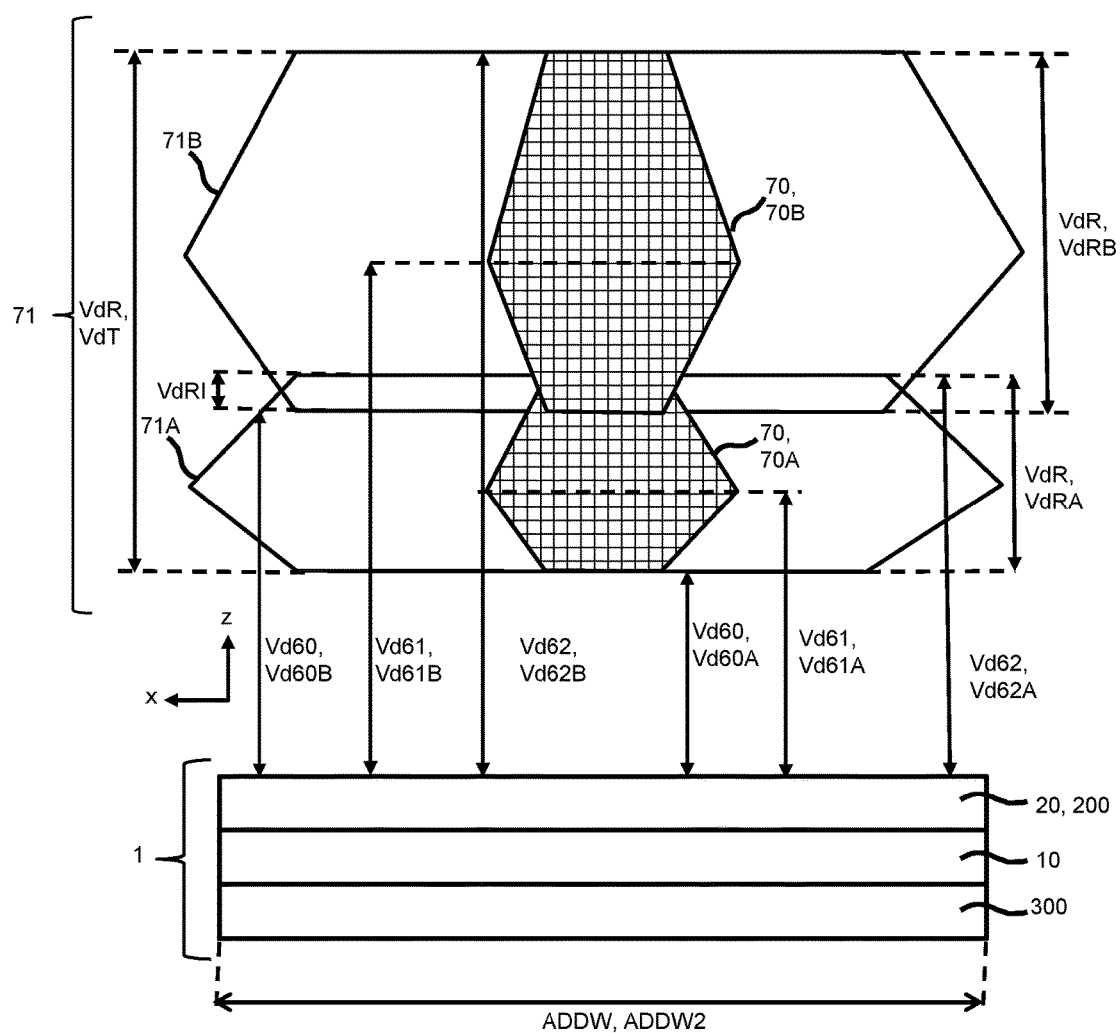
FIG. 19: Illustration of two effective 3D viewing zones

With reference to FIG. 19, the dual-pitch liquid crystal parallax barrier panel 200 enables a first 3D viewing zone 70A and a second 3D viewing zone 70B. The 3D viewing zones 70A and 70B may be located in space at different positions in the longitudinal (backwards and forwards) direction. By selecting different Slit Position numbers, the dual-pitch liquid crystal parallax barrier enables the 3D viewing zones 70A and 70B to be moved in a lateral (left and right) direction enabling a first effective 3D viewing zone 71A and a second effective 3D viewing zone 71B, respectively. The two effective 3D viewing zones 71A and 71B together enable a large effective 3D viewing zone 71 in both the lateral and longitudinal directions. The shapes of the effective 3D viewing zones 71A, 71B and 71 shown in FIG. 19 are for illustrative purposes only. One of the 3D viewing zones 70A and 70B may be enabled depending on the viewer's head position. For any given head position, the enabled 3D viewing zone 70A or 70B may be relatively small but the ability of the dual-pitch liquid crystal parallax barrier panel 200 to enable the 3D viewing zone 70A or 70B and to move the 3D viewing zones 70A and 70B left and right, creates a large effective 3D viewing zone 71.

In contrast to a dual-pitch liquid crystal parallax barrier panel 200 of the invention, a conventional liquid crystal parallax barrier panel with multiple independent electrodes has a single 3D viewing zone 70 and enables the 3D viewing zone 70 to be moved in a lateral (left and right) direction only, and consequently a large effective 3D viewing zone 71 may be realised in the lateral direction but not in the longitudinal direction. The dual-pitch liquid crystal parallax barrier panel 200 is advantageous over a conventional liquid crystal parallax barrier panel because it enables a larger effective 3D viewing zone 71 in the longitudinal direction.

With reference to FIG. 19, the first 3D viewing zone 70A has a first optimum viewing distance Vd61A, a first minimum viewing distance Vd60A, a first maximum viewing distance Vd62A and a first longitudinal viewing distance range VdRA (i.e. VdRA=Vd62A−Vd60A). The second 3D viewing zone 70B has a second optimum viewing distance Vd61B, a second minimum viewing distance Vd60B, a second maximum viewing distance Vd62B and a second longitudinal viewing distance range VdRB (i.e. VdRB=Vd62B−Vd60B). The first optimum viewing distance Vd61A may be smaller than the second optimum viewing distance Vd61B. If the first optimum viewing distance Vd61A is smaller than the second optimum viewing distance Vd61B, the viewing distance ranges intersection VdRI is the difference between the first maximum viewing distance Vd62A and the second minimum viewing distance Vd60B (i.e. VdRI=Vd62A−Vd60B); and the total longitudinal viewing distance range VdT is the difference between the second maximum viewing distance Vd62B and first minimum viewing distance Vd60A (i.e., VdT=Vd62B−Vd60A). Alternatively, the first optimum viewing distance Vd61A may be greater than the second optimum viewing distance Vd61B. If the first optimum viewing distance Vd61A is greater than the second optimum viewing distance Vd61B, the viewing distance ranges intersection VdRI is given by the difference between the second maximum viewing distance Vd62B and the first minimum viewing distance Vd60A (i.e. VdRI=Vd62B−Vd60A); and the total longitudinal viewing distance range VdT is the difference between the first maximum viewing distance Vd62A and second minimum viewing distance Vd60B (i.e., VdT=Vd62A−Vd60B).

With reference to FIG. 8,

FIG. 9, FIG. 25 and FIG. 19, the first set pitch φA may be chosen to provide a first optimal 3D viewing distance as shown by Vd61, Vd61A using the equation $$\varphi A = \frac{2*PP*Vd*n}{n*Vd+s},$$

and the second set pitch φB may be chosen (using, for example, ray tracing simulation software) to provide a second optimal 3D viewing distance Vd61B that is greater than the first optimal 3D viewing distance Vd61A and a viewing distance ranges intersection VdRI of a chosen value. Alternatively, the first set pitch φA may be chosen to provide a first optimal 3D viewing distance as shown by Vd61, Vd61A using the equation $$\varphi A = \frac{2*PP*Vd*n}{n*Vd+s},$$

and the second set pitch φB may be chosen (using, for example, ray tracing simulation software) to provide a second optimal 3D viewing distance Vd61B that is smaller than the first optimal 3D viewing distance Vd61A and a viewing distance ranges intersection VdRI of a chosen value. Alternatively, the second set pitch φB may be chosen to provide a second optimal 3D viewing distance as shown by Vd61, Vd61B using the equation $$\varphi B = \frac{2*PP*Vd*n}{n*Vd+s}$$

and the first set pitch φA may be chosen (using, for example, ray tracing simulation software) to provide a first optimal 3D viewing distance Vd61A that is greater than the second optimal 3D viewing distance Vd61B and a viewing distance ranges intersection VdRI of a chosen value. Alternatively, the second set pitch φB may be chosen to provide a second optimal 3D viewing distance as shown by Vd61, Vd61B using the equation $$\varphi B = \frac{2*PP*Vd*n}{n*Vd+s}$$

and the first set pitch φA may be chosen (using, for example, ray tracing simulation software) to provide a first optimal 3D viewing distance Vd61A that is smaller than the second optimal 3D viewing distance Vd61B and a viewing distance ranges intersection VdRI of a chosen value. Alternatively, both the first set pitch φA and the second set pitch φB may be chosen using, for example, ray tracing simulation software to provide a first optimal 3D viewing distance Vd61A that is greater than the second optimal 3D viewing distance Vd61B and a viewing distance ranges intersection VdRI of a chosen value. Alternatively, both the first set pitch φA and the second set pitch φB may be chosen using, for example, ray tracing simulation software to provide a first optimal 3D viewing distance Vd61A that is less than the second optimal 3D viewing distance Vd61B and a viewing distance ranges intersection VdRI of a chosen value.

Choosing a smaller viewing distance ranges intersection VdRI has the advantage of enabling a greater total longitudinal viewing distance range VdT, but has the disadvantage of providing a smaller area in space where both first 3D viewing zone 70A and second 3D viewing zone 70B enable viewing of high quality 3D images (as a consequence the switching between enabling first 3D viewing zone 70 and second 3D viewing zone 70B based on the viewer's eyes, 90R and 90L, position shall be relatively more accurate). Choosing a larger viewing distance ranges intersection VdRI has the disadvantage of enabling a smaller total longitudinal viewing distance range VdT, and has the advantage of providing a larger area in space where both first 3D viewing zone 70A and second 3D viewing zone 70B enable viewing of high quality 3D images (as a consequence the switching between enabling first 3D viewing zone 70 and second 3D viewing zone 70B based on the viewer's eyes, 90R and 90L, position may be relatively less accurate). A viewing distance ranges intersection VdRI between 0.3 cm and 4 cm (ideally between 0.7 cm and 2 cm) was shown to provide a good compromise between the advantages and disadvantages discussed above.

Figure 20:
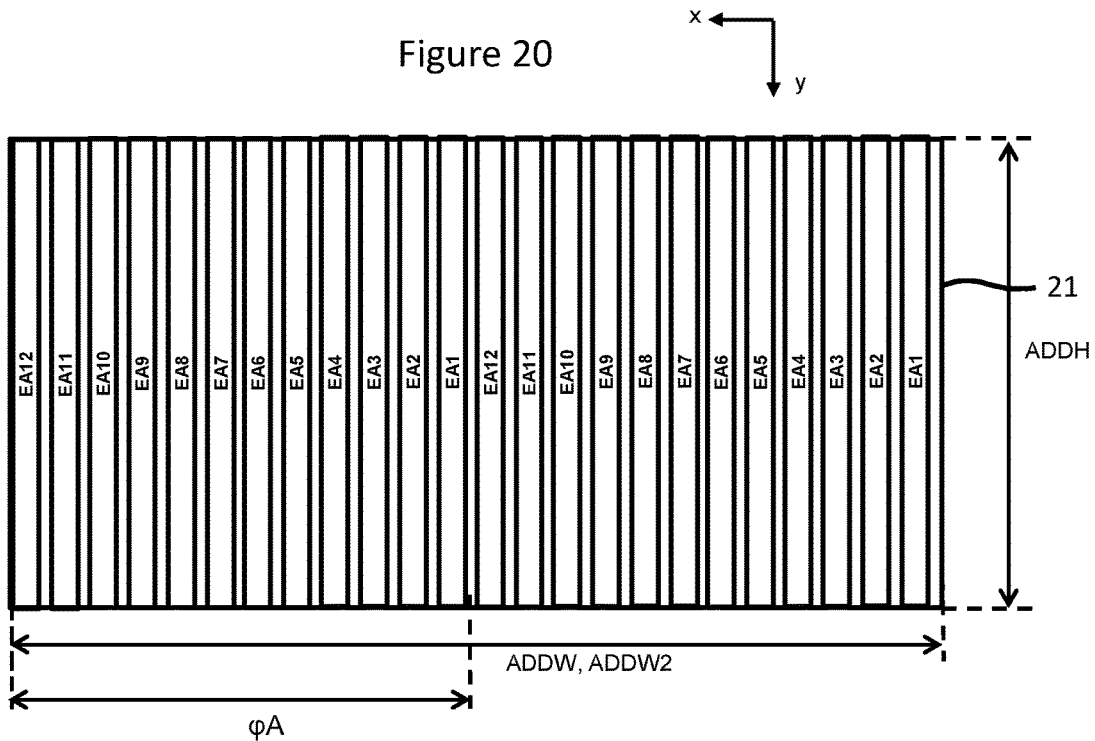
FIG. 20: Electrode arrangement on the first substrate.
Figure 21:
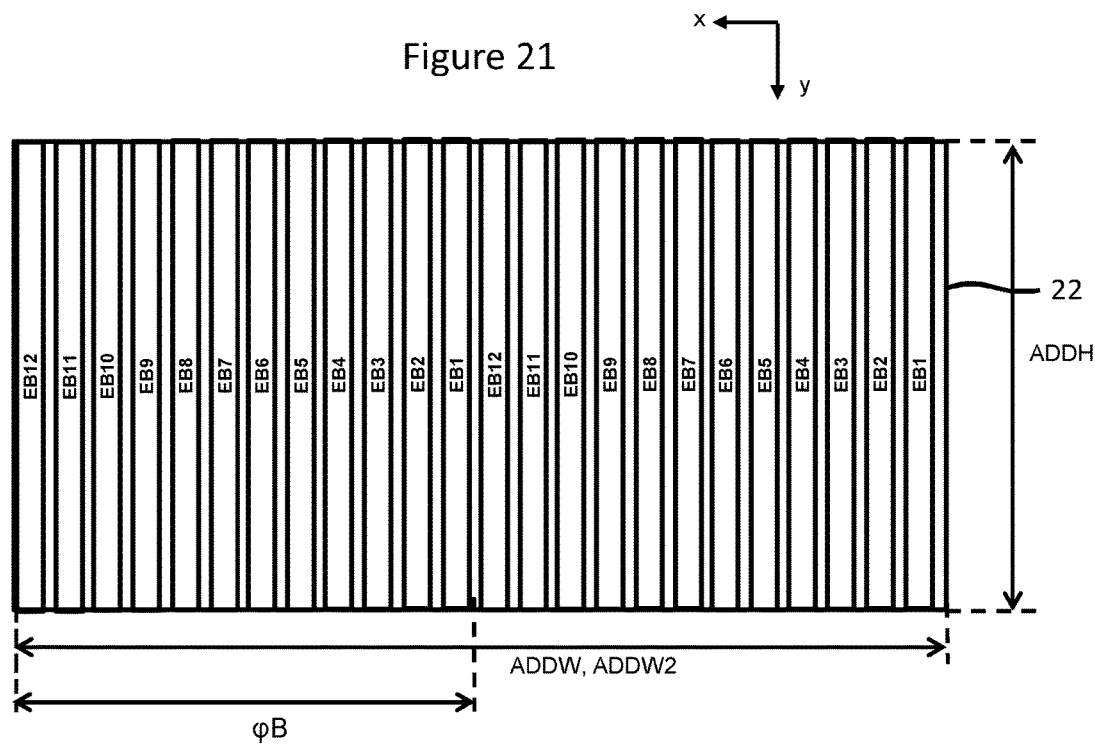
FIG. 21: Electrode arrangement on the second substrate.

With reference to FIG. 20 and FIG. 21, the height of the viewable area of the switchable dual-pitch liquid crystal parallax barrier panel 200 is shown by ADDH and the width of the switchable dual-pitch liquid crystal parallax barrier panel 200 is shown by ADDW, ADDW2. With reference to FIG. 20 and FIG. 21 the area defined by ADDW×ADDH is the viewable area of the autostereoscopic display device 1 (i.e. the plane of the viewable area of the autostereoscopic display device 1 is coincident with the plane of the page).

The dual-pitch liquid crystal parallax barrier panel 200 is a novel type of liquid crystal parallax barrier panel 20. With reference to FIG. 1, FIG. 2 and FIG. 3, the positioning of the dual-pitch liquid crystal parallax barrier panel 200 relative to the image display 10 may be the same as the positioning of the liquid crystal parallax barrier panel 20. Unless stated otherwise, all subsequent embodiments are written in relation to FIG. 1 where the dual-pitch liquid crystal parallax barrier panel 20, 200 is disposed on the viewing side 90 of the autostereoscopic display device 1 but it will be appreciated that the image display panel 10 may be disposed on the viewing side 90 of the autostereoscopic display device.

A conventional liquid crystal parallax barrier panel has a single set of independently addressable electrodes (for example, E1 to E12 as shown in FIG. 4). The single group of independently addressable electrodes are repeated in order to extend across the whole width of the display area ADDW. A dual-pitch liquid crystal parallax barrier panel 20, 200 has a first set of independently addressable electrodes and a second set of independently addressable electrodes.

The total number of independently addressable electrodes in a dual-pitch liquid crystal parallax barrier panel 20, 200 is the sum of the independently addressable electrodes in each set of electrodes. With reference to FIG. 8, FIG. 9, FIG. 10, FIG. 11, FIG. 12, FIG. 13 and FIG. 25, if the number of independently addressable electrodes is the same in each set and equals 12, then the total number of independently addressable electrodes is equal to 12×2=24.

The independently addressable electrodes of the first set of electrodes pertaining to the first substrate are repeated in order to extend across the whole width of the display area ADDW. The independently addressable electrodes of the second set of electrodes pertaining to the second substrate are repeated in order to extend across the whole width of the display area ADDW.

More generally, if the number of independently addressable electrodes is the same in each set of electrodes, each set of electrodes contains n independently addressable electrodes and each set of electrodes is repeated $m_i$ times to extend across the whole width of the display area ADDW, where m is an integer and i is an integer equal to 1 or 2 referring to the first or second set of electrodes respectively. Since the pitch of the first set of electrodes may be different from the pitch of the second set of electrodes, $m_i$ may be different to $m_2$.

With reference to FIG. 8,

FIG. 9, FIG. 10, FIG. 11, FIG. 12, FIG. 13 and FIG. 25 the number of independently addressable electrodes in the first set of electrodes may be the same as, or different from, the number of independently addressable electrodes in the second set of electrodes. Unless stated otherwise, for all subsequent embodiments it will be assumed that the number of independently addressable electrodes in each set of electrodes is the same, and for example is equal to 12.

With reference to FIG. 20, an example of the cyclic electrode layout on the first substrate 21 is shown. The electrodes (labelled EA1, EA2, EA3, EA4, EA5, EA6, EA7, EA8, EA9, EA10, EA11 and EA12) extend across the entire height ADDH of the display area. The first set pitch, φA, is also shown. FIG. 20 illustrates the first set pitch φA repeated 2 times in order to fill the whole width of the display area ADDW. In practice, the first set pitch may be repeated $m_i$ times in order to fill the whole width of the display area ADDW, where $m_i$ is an integer. The electrodes pertaining to the first substrate are connected to drive electronics (not shown) via electrical connections (not shown) that are placed outside of the display viewing area. In other words, FIG. 20 illustrates a plurality of first electrodes, the first electrodes being independently addressable from one another and comprising two or more electrode portions extending along a first direction (y-direction), and laterally spaced from one another along a second direction (x-direction) different from the first direction, the electrode portions of the first electrodes being arranged in a cyclic arrangement. That is the electrode portions labelled EA12 in FIG. 20 are portions of the same electrode (the 12th electrode of the first set), and are electrically connected together by a conductive wiring portion that is not shown in FIG. 20. Similarly, the electrode portions labelled EA11 in FIG. 20 are portions of the 11th electrode of the first set and are electrically connected together, and so on.

With reference to FIG. 21, an example of the cyclic electrode layout on the second substrate 22 is shown. The electrodes (labelled EB1, EB2, EB3, EB4, EB5, EB6, EB7, EB8, EB9, EB10, EB11 and EB12) extend across the entire height ADDH of the display area. The second set pitch, φB, is also shown. FIG. 21 illustrates the second set pitch φB repeated 2 times in order to fill the whole width of the display area ADDW. In practice, the second set pitch may be repeated $m_2$ times in order to fill the whole width of the display area ADDW, where $m_2$ is an integer. The electrodes pertaining to the second substrate are connected to drive electronics (not shown) via electrical connections (not shown) that are placed outside of the display viewing area. In other words, FIG. 20 illustrates a plurality of second electrodes, the second electrodes being independently addressable from one another and comprising two or more electrode portions extending along a first direction (y-direction), and laterally spaced from one another along a second direction (x-direction) different from the first direction, the electrode portions of the second electrodes being arranged in a cyclic arrangement That is the electrode portions labelled EB12 in FIG. 21 are portions of the same electrode (the 12th electrode of the second set), and are electrically connected together by a conductive wiring portion that is not shown in FIG. 21. Similarly, the electrode portions labelled EB11 in FIG. 21 are portions of the 11th electrode of the second set and are electrically connected together, and so on.

With reference to FIG. 3, FIG. 14, FIG. 15 and FIG. 19, the dual-pitch liquid crystal parallax barrier 20, 200 may be driven by selecting Slit Position Numbers 1A through 12A in order to laterally move the first 3D viewing zone 70A in order to enable viewing of high quality 3D images if the viewer's eyes, 90R and 90L, are located in the first effective 3D viewing zone 71A. The dual-pitch liquid crystal parallax barrier 20, 200 may be driven by selecting Slit Position Numbers 1B through 12B in order to laterally move the second 3D viewing zone 70B in order to enable viewing of high quality 3D images if the viewer's eyes, 90R and 90L, are located in the second effective 3D viewing zone 71B.

The dual-pitch liquid crystal parallax barrier 20, 200 may be driven by selecting, either Slit Position Numbers 1A through 12A or Slit Position Numbers 1B through 12B, in order to, either laterally move the first 3D viewing zone 70A or laterally move the second 3D viewing zone 70B respectively, in order to enable viewing of high quality 3D images if the viewer's eyes, 90R and 90L, are located in the viewing distance ranges intersection VdRI. As described previously, the slit position number for a conventional single region switchable liquid crystal parallax barrier panel 20 only changes as a function of lateral head position. In contrast the slit position number for a dual-pitch switchable liquid crystal parallax barrier panel 200 of the invention may change as a function of lateral head position and/or longitudinal head position in order to provide high quality 3D images across then whole display area of the autostereoscopic display device 1.

Figure 35:
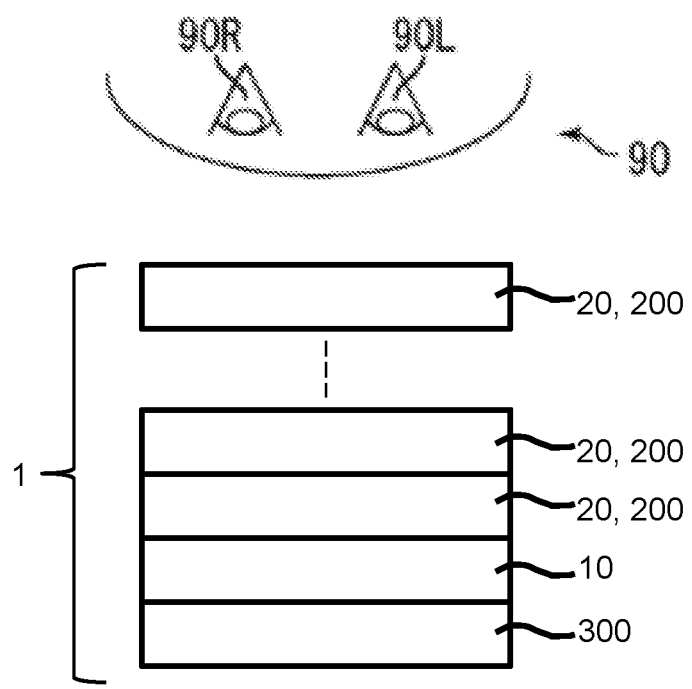
FIG. 35: Front barrier autostereoscopic display device

It should follow naturally for those skilled in the art that n (where n is an integer greater than 1) dual-pitch liquid crystal parallax barrier 20, 200 may be stacked together (as shown in FIG. 35); each of the stacked dual-pitch liquid crystal parallax barrier 20, 200 having a first set pitch φA and a second set pitch φB that may be different from all the first set pitches φA and second set pitches φA of the remaining n–1 stacked reconfigurable parallax barrier panels. These stacked dual-pitch liquid crystal parallax barriers 20, 200 provide n*2 different selectable barrier pitches, that may be used to enable n*2 longitudinal viewing distance ranges VdR. These stacked dual-pitch liquid crystal parallax barriers 20, 200 may be designed in such a way that the n*2 longitudinal viewing distance ranges VdR together enable a bigger longitudinal user head freedom than if a single dual-pitch liquid crystal parallax barrier 20, 200 were used. In other words, each parallax barrier panel enables a different range of viewing distances.

Figure 32:
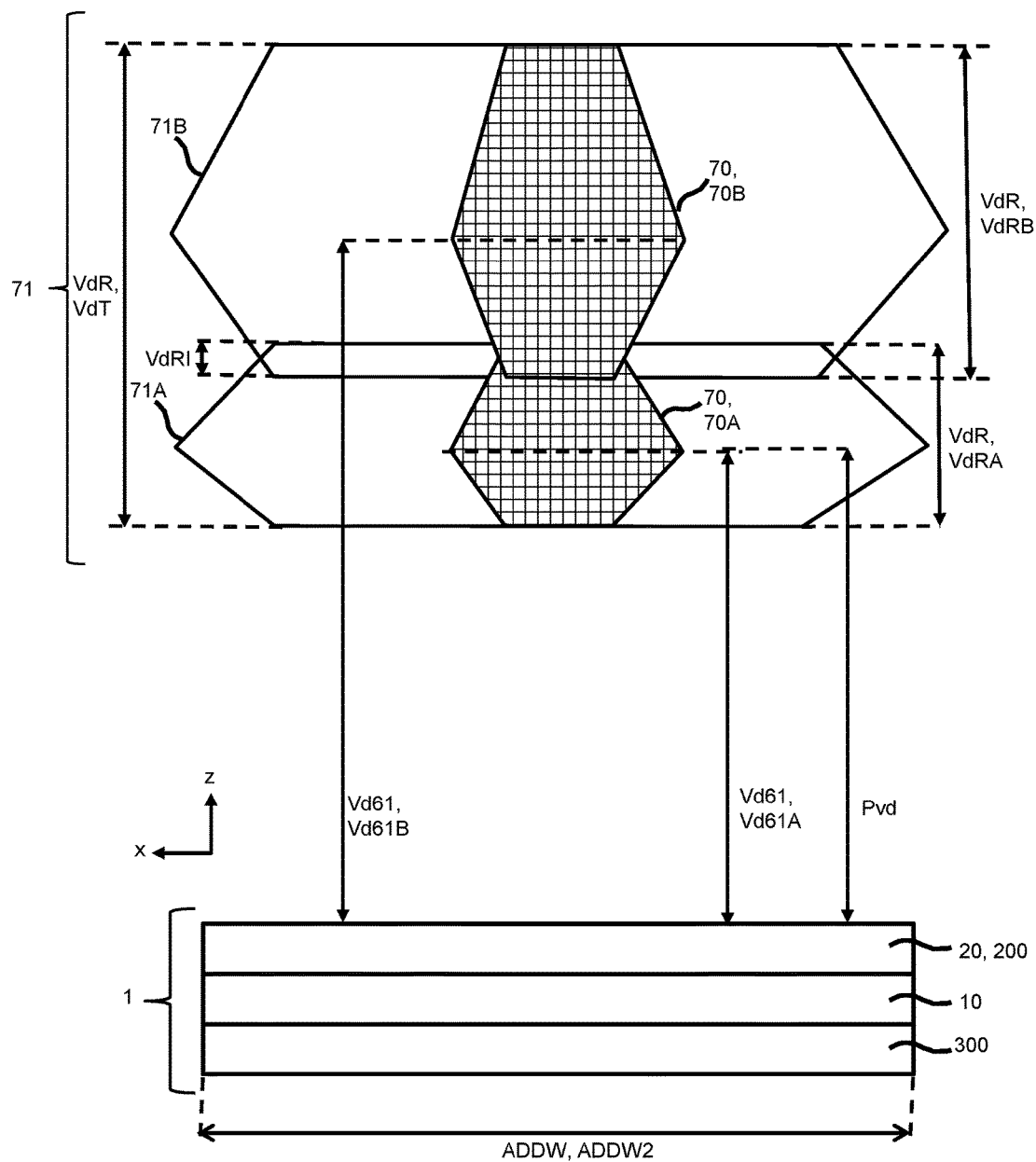
FIG. 32: Illustration of two effective 3D viewing zones
Figure 33:
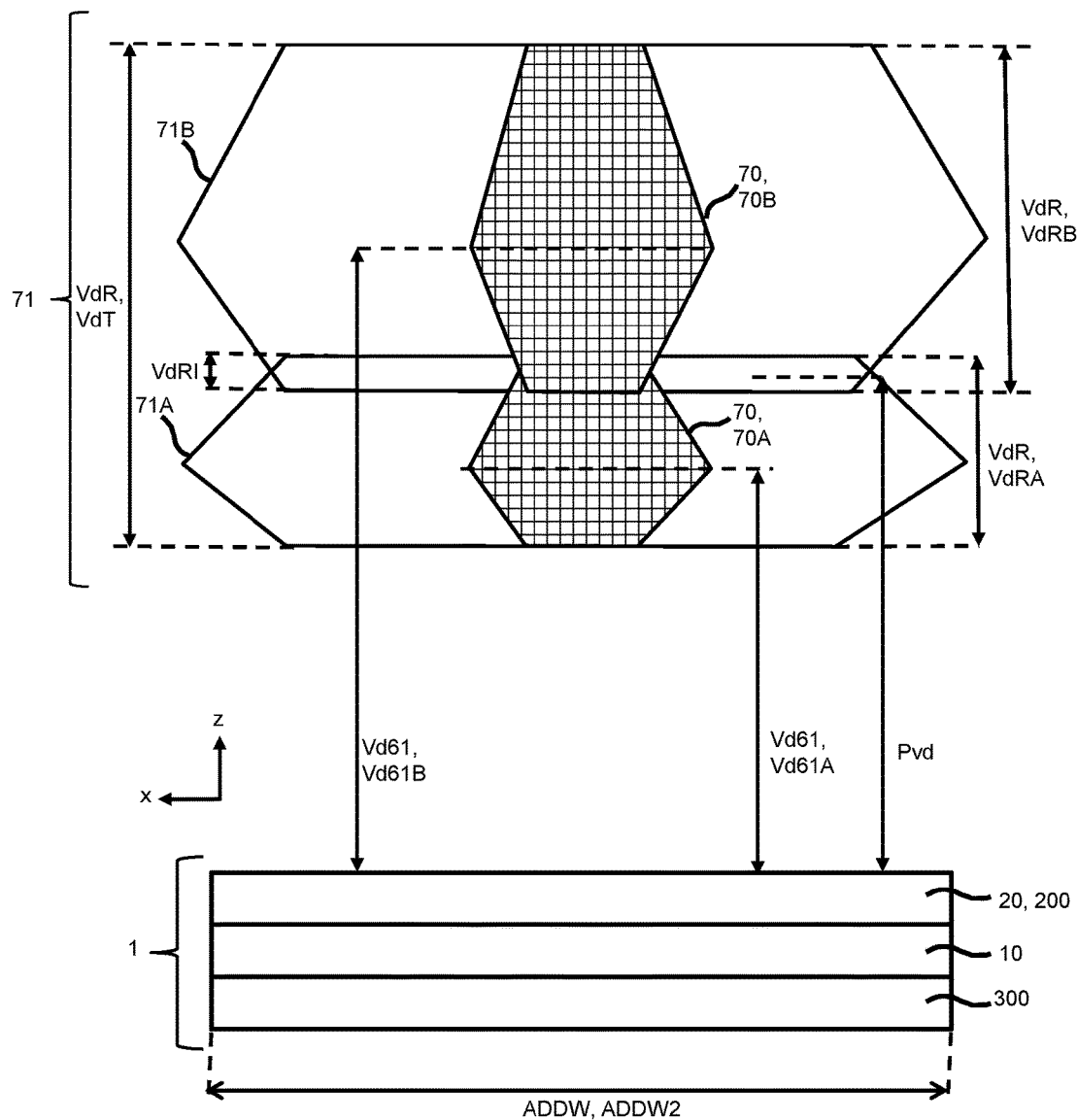
FIG. 33: Illustration of other two effective 3D viewing zones
Figure 34:
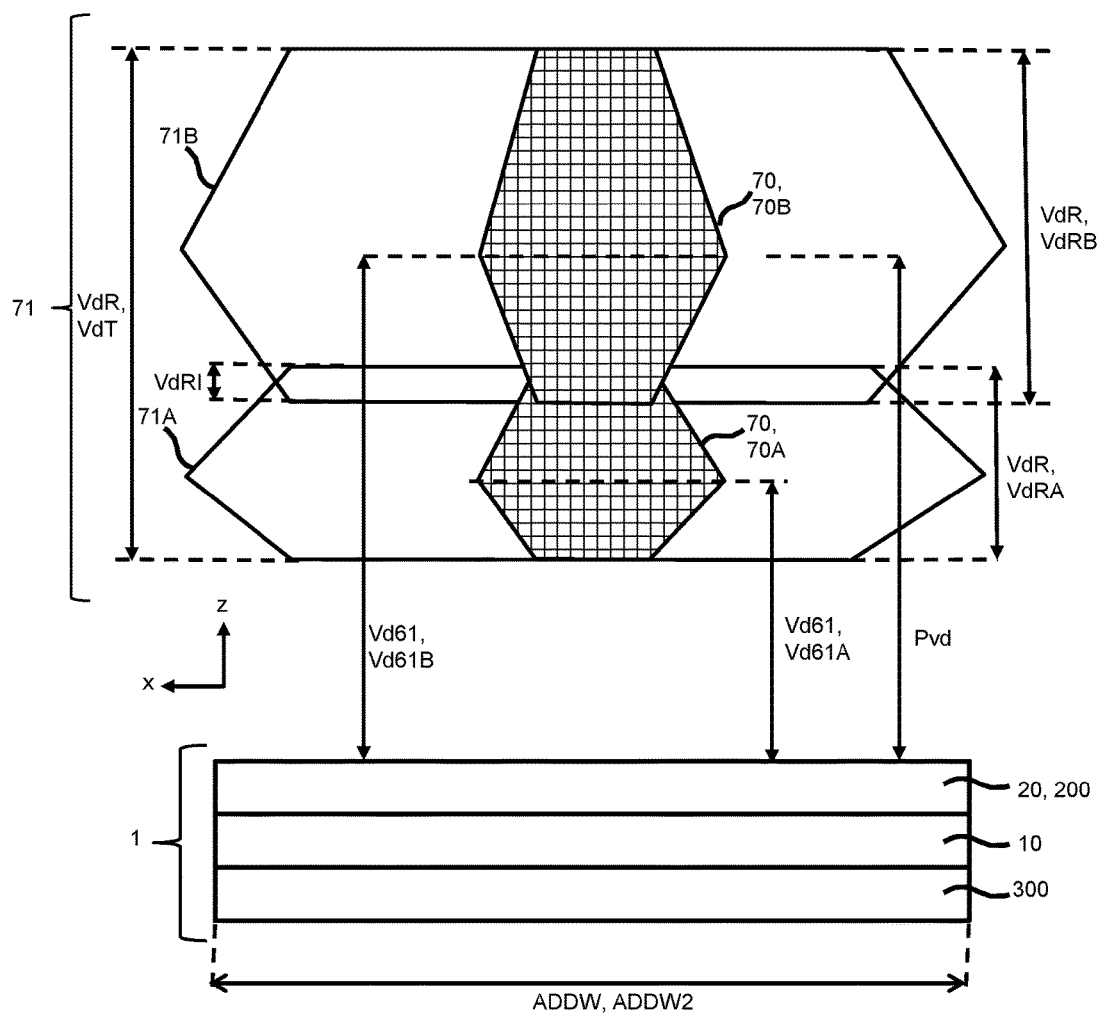
FIG. 34: Illustration of yet other two effective 3D viewing zones

With reference to FIG. 32, FIG. 33 and FIG. 34, the preferred viewing distance Pvd is the distance from the autostereoscopic display device 1 at which the viewer's eyes (90R and 90L) are expected to be more often when observing high quality 3D images.

With reference to FIG. 32, a dual-pitch liquid crystal parallax barrier 20, 200 to be used in an autostereoscopic display device 1 may be designed such that the first optimum viewing distance Vd61A approximately coincides with the preferred viewing distance Pvd.

With reference to FIG. 33, a dual-pitch liquid crystal parallax barrier 20, 200 to be used in an autostereoscopic display device 1 may be designed such that the preferred viewing distance Pvd is contained by, or is approximately close to, the viewing distance ranges intersection VdRI.

With reference to FIG. 34, a dual-pitch liquid crystal parallax barrier 20, 200 to be used in an autostereoscopic display device 1 may be designed such that the second optimum viewing distance Vd61B approximately coincides with the preferred viewing distance Pvd.

According to optical simulation software (ray tracing), a first example of an autostereoscopic display device 1 with a front barrier (see FIG. 1) designed with the first optimum viewing distance Vd61A approximately coincident with the preferred viewing distance Pvd may have the following characteristics: preferred viewing distance Pvd=660 mm, pixel pitch PP of image display panel 10 in x-direction=50.7 μm, width of image panel ADDW, ADDW2=5760*50.7 μm=292.032 mm, pixel aperture in the x-direction 25.5 μm (i.e. the pixel pitch PP comprises a transmissive aperture part and a non-transmissive part), first set pitch φA=101.31 μm, second set pitch φB=101.32 μm, distance between the image display panel LC layer 13 to dual-pitch liquid crystal parallax barrier panel 20, 200 LC layer 23=907.37 μm, first set of electrodes containing 12 independently addressable electrodes and second set of electrodes containing 12 independently addressable electrodes. What leads to: first minimum viewing distance Vd60A=632 mm, first maximum viewing distance Vd62A=710 mm, first optimum viewing distance Vd61A=672 mm, second minimum viewing distance Vd60B=697 mm, second maximum viewing distance Vd62B=790 mm, second optimum viewing distance Vd61B=756 mm, viewing distance ranges intersection VdRI=13 mm and total longitudinal viewing distance range VdT=158 mm. From these results it is possible to see that the use of a dual-pitch liquid crystal parallax barrier panel 20, 200 enabled a user head freedom in the longitudinal direction to 158 mm. If a conventional liquid crystal parallax barrier 20 were used the user head freedom in the longitudinal direction would only approximately be 80 mm.

According to optical simulation software (ray tracing), a second example of an autostereoscopic display device 1 with a front barrier (see FIG. 1) designed with the preferred viewing distance Pvd being contained by, or being approximately close to, the viewing distance ranges intersection VdRI may have the following characteristics: preferred viewing distance Pvd=660 mm, pixel pitch PP of image display panel 10 in x-direction=50.7 μm, width of image panel ADDW, ADDW2=5760*50.7 μm=292.032 mm, pixel aperture in the x-direction 25.5 μm (i.e. the pixel pitch PP comprises a transmissive aperture part and a non-transmissive part), first set pitch φA=101.305 μm, second set pitch φB=101.3125 um, distance between the image display panel LC layer 13 to dual-pitch liquid crystal parallax barrier panel 20, 200 LC layer 23=907.37 μm, first set of electrodes containing 12 independently addressable electrodes and second set of electrodes containing 12 independently addressable electrodes. What leads to: first minimum viewing distance Vd60A=604 mm, first maximum viewing distance Vd62A=662 mm, first optimum viewing distance Vd61A=637 mm, second minimum viewing distance Vd60B=647 mm, second maximum viewing distance Vd62B=728 mm, second optimum viewing distance Vd61B=691 mm, viewing distance ranges intersection VdRI=15 mm and total longitudinal viewing distance range VdT=124 mm. From these results it is possible to see that the use of a dual-pitch liquid crystal parallax barrier panel 20, 200 enabled a user head freedom in the longitudinal direction to 124 mm. If a conventional liquid crystal parallax barrier 20 were used the user head freedom in the longitudinal direction would only approximately be 80 mm.

FIG. 22 and FIG. 23 are block diagrams showing a functional configuration of an autostereoscopic display device 1. FIG. 23 is a flowchart of a process performed by the autostereoscopic display device 1. The autostereoscopic display device 1 further includes a control circuit 40 and a position sensor(s) 41 used for head tracking of a user head position. Control circuit 40 includes an operation unit 42, a dual-pitch liquid crystal parallax barrier panel drive unit 43, and an image display panel driver 44. FIG. 23 further includes a slit position look-up table (LUT) 45. A slit position look-up table may store the parallax barrier slit positions for all head positions in the 3D viewing zone 70. A slit position look-up table may store, for each parallax barrier slit position number, the electrode states for each independently addressable electrode of the dual-pitch liquid crystal parallax barrier panel 200 required to obtain that parallax barrier slit position number. Image display panel drive unit 44 drives the image display panel 10 based on input video signals and displays an image on the image display panel 10.

Position sensor(s) 41 obtains the positional information of the observer 90 (FIG. 24, step S1). Position sensor(s) 41 is, for example, a camera and/or an infrared sensor. Alternatively, position sensor(s) 41 are, for example, a pair of cameras and/or a pair of infrared sensors. The advantage of using a pair of cameras and/or a pair of infrared sensors separated in the lateral direction (x direction) is that the disparity between the information provided by a pair of sensors enables both lateral (x) and longitudinal (z) head position information to be obtained. The advantage of a large lateral separation between a pair of sensors is that the information gathered from the sensors may enable a more accurate calculation of the longitudinal position to be determined. The advantage of a smaller lateral separation between a pair of sensors is that the sensors may have a smaller field of view. A separation between a pair of sensors in the range from 4 cm to 25 cm has been found suitable for a single user autostereoscopic display device 1. Position sensor(s) 41 supplies the acquired position information to the operation unit 42 of the controller 40.

Operation unit 42 analyses the position information of the observer 90 supplied from the position sensor(s) 41, and the position coordinates of the observer 90 (x, y, z) are calculated (FIG. 24, step S2). Calculation of the position coordinates, for example, may be carried out by an eye-tracking system or face tracking system or head tracking system for detecting the eye position of the observer 90 by an image processing method. Calculation of the position coordinates, for example, may be performed by a head tracking system for detecting a position of the head of the observer 90 by infrared.

After determining the position information of the observer 90, the operation unit 42 determines the required slit position number for the dual-pitch liquid crystal parallax barrier panel 20, 200 (FIG. 24, step S3). The slit position number may be calculated from the position coordinates of the observer 90 (x, y, z) using a predetermined mathematical formula or algorithm. Alternatively, all slit position numbers for the effective 3D viewing zone 71 may be stored in a memory such as for example a slit position look-up table (LUT) 45. If a slit position LUT 45 is used, the operation unit 42 retrieves the designated slit position for a given set of position coordinates of the observer 90 (x, y, z) from the slit position LUT 45.

The operation unit 42 may supply the switchable dual-pitch liquid crystal parallax barrier panel drive unit 43 with the slit position number associated with the position coordinates of the observer 90 (x, y, z). The relationship between a given slit position number and the voltage that is to be addressed to each of the individually addressable electrodes pertaining to the dual-pitch liquid crystal parallax barrier panel 20, 200 may also be stored on the slit position LUT. The operation unit 42 may supply the switchable dual-pitch liquid crystal parallax barrier panel drive unit 43 with information regarding the voltage that is to be addressed to each of the individually addressable electrode pertaining to the dual-pitch liquid crystal parallax barrier panel 20, 200. In general, the dual-pitch liquid crystal parallax barrier panel drive unit 43, based on information supplied from the calculating unit 42, drives the switchable liquid crystal parallax barrier panel 20 (step S4) to enable viewing of high quality 3D images for the desired range of head positions.

Figure 26:
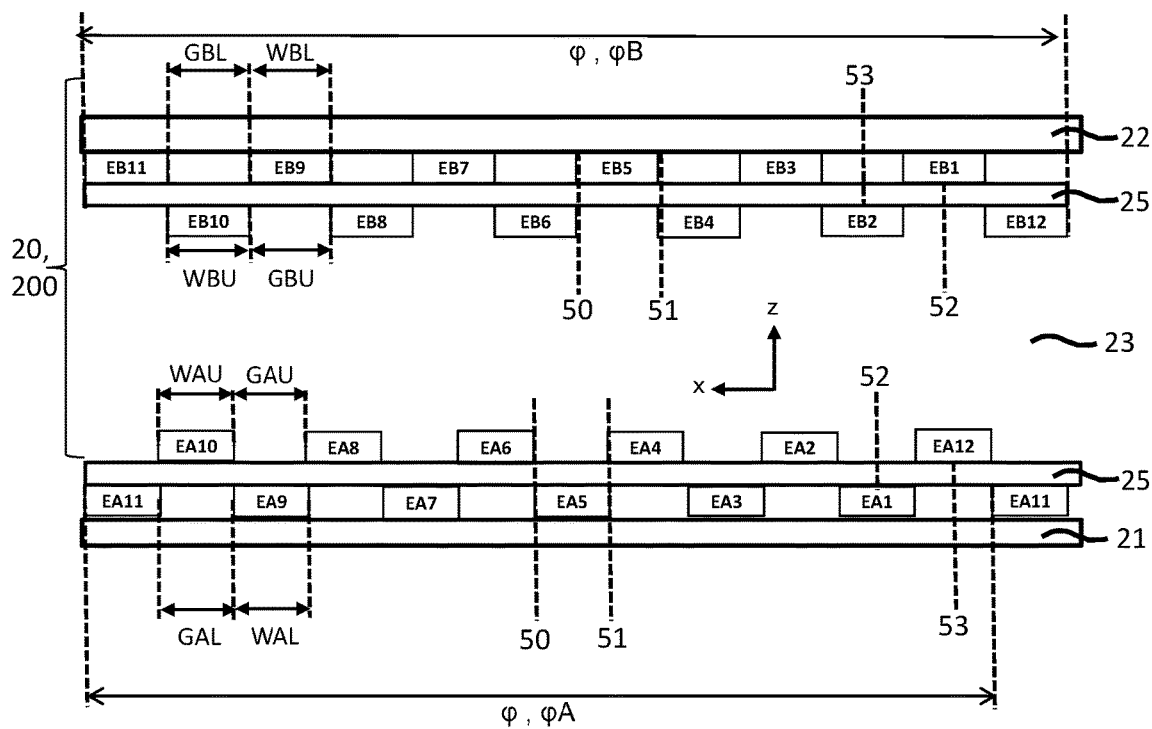
FIG. 26: Sectional view of another dual layer electrode structure

Alternative to FIG. 25, a further example of dual layer electrodes is shown in FIG. 26. With reference to FIG. 26, independently addressable electrodes each formed of electrode portions EA1 to EA12 may be deposited in a cyclic arrangement in a dual electrode layer structure on the first substrate 21 (not all electrode portions are shown). Independently addressable electrodes each formed of electrode portions EB1 to EB12 may be deposited in a cyclic arrangement in a dual electrode layer structure on the second substrate 22 (not all electrode portions are shown). In this example, the first electrode set pitch, φA, relates to the electrode portions EA1 to EA12 (not all electrode portions are shown) and the second electrode set pitch, φB, relates to the electrode portions EB1 to EB12 (not all electrode portions are shown). The first substrate 21 may be disposed on the viewing side 90 of the autostereoscopic display device 1 or the second substrate 22 may be disposed on the viewing side 90 of the autostereoscopic display device 1. A parallax barrier may be formed in the switchable liquid crystal parallax barrier panel 20 by application of voltages to the independently addressable electrodes (EA1 to EA12 and EB1 to EB12). In the embodiment of FIG. 26, at least some of the electrodes EA1 to EA12 (specifically, the odd numbered electrodes from EA1 to EA12) are disposed in a first layer (the lower layer) upon the first substrate of the dual-pitch liquid crystal parallax barrier 20,200 to form a first subset of electrodes of the first substrate. An insulating layer 25 is disposed on top of the first subset of electrodes pertaining to the first substrate. At least some, and preferably all the remainder, of the electrodes from EA1 to EA12 (specifically, the even numbered electrodes from EA1 to EA12) are disposed in a second layer (the upper layer) on top of the insulating layer 25 to form a second subset of electrodes of the first substrate. The electrodes in the second subset of electrodes are offset in the x-direction relative to the electrodes in the first subset of electrodes. None of the electrodes in the first subset of electrodes are electrically connected to any of the electrodes in the second subset of electrodes. In the embodiment of FIG. 26, at least some of the electrodes from EB1 to EB12 (specifically, the odd numbered electrodes EB1 to EB12) are disposed in a first layer (the lower layer) upon the second substrate of the dual-pitch liquid crystal parallax barrier 20,200 to form a first subset of electrodes of the second substrate. An insulating layer 25 is disposed on top of the first subset of electrodes pertaining to the second substrate. At least some, and preferably all the remainder, of the electrodes from EB1 to EB12 (specifically, the even numbered electrodes from EB1 to EB12) are disposed in a second layer (the upper layer) on top of the insulating layer 25 to form a second subset of electrodes of the second substrate. The electrodes in the second subset of electrodes are offset in the x-direction relative to the electrodes in the first subset of electrodes. None of the electrodes in the first subset of electrodes are electrically connected to any of the electrodes in the second subset of electrodes.

With reference to FIG. 26, it will be appreciated that the electrode arrangements pertaining to the first substrate 21 are very similar to the electrode arrangements pertaining to the second substrate 22. A significant difference between the electrode arrangements pertaining to the first substrate 21 and second substrate 22 is that the first electrode set pitch, φA, is different to the second electrode set pitch, φB. With reference to FIG. 26, first set pitch, φA, is shown to extent from the left hand edge of the left most EA11 electrode to the left hand edge of the right most EA11 electrode. With reference to FIG. 26, second set pitch, φB, is shown to extent from the left hand edge of the left most EB11 electrode to the left hand edge of the right most EB11 electrode (not shown).

Note that for FIG. 26, the left hand edge all EB11 electrodes are in the same lateral position as the right hand edge of all EB12 electrodes. The relationship between set pitch φA and set pitch φB is similar to that described in previous embodiments.

It should be noted that the difference between the height over the first substrate 21 of the second subset of electrodes (EA2, EA4, EA6 etc.) and the height over the first substrate 21 of the first subset of electrodes (EA1, EA3, EA5 etc.) is a consequence of the need to provide the insulating layer 25 between the first subset of electrodes pertaining to the first substrate and the second subset of electrodes pertaining to the first substrate, while making the width of electrodes of the second subset (EA2, EA4, EA6 etc.) equal to the gap between laterally adjacent electrodes (EA1, EA3, EA5 etc.) of the first subset (EA1, EA3, EA5 etc.) so as to eliminate the gap G that inevitably exists in the single layer electrode arrangement such as in FIG. 9. In other words, there is no lateral gap (in the x-direction) between the left hand edge EAi and the right hand edge of EAi+1 where i is an integer from 1 to 12 in a cyclic arrangement. It will generally be desirable to minimise this height difference, subject to providing effective insulation between the two subsets of electrodes.

It should be noted that the difference between the height over the second substrate 22 of the second subset of electrodes (EB2, EB4, EB6 etc.) and the height over the second substrate 22 of the first subset of electrodes (EB1, EB3, EB5 etc.) is a consequence of the need to provide the insulating layer 25 between the first subset of electrodes of the second substrate and the second subset of electrodes pertaining to the second substrate, while making the width of electrodes of the second subset (EB2, EB4, EB6 etc.) equal to the gap between laterally adjacent electrodes (EB1, EB3, EB5 etc.) of the first subset (EB1, EB3, EB5 etc.) so as to eliminate the gap G that inevitably exists in the single layer electrode arrangement such as in FIG. 9. In other words, there is no lateral gap (in the x-direction) between the left hand edge EBx and the right hand edge of EBx+1 where x is an integer from 1 to 12 in a cyclic arrangement. It will generally be desirable to minimise this height difference, subject to providing effective insulation between the two subsets of electrodes.

The insulating layer 25 may conformably coat the first substrate and electrodes of the first subset pertaining to the first substrate (i.e. the lower electrodes; the electrodes closest to the first substrate). The insulating layer 25 may conformably coat the second substrate and electrodes of the first subset pertaining to the second substrate (i.e. the lower electrodes; the electrodes closest to the second substrate). For ease of understanding, a conformal coating is not shown in any of the dual layer electrode structures illustrated by FIG. 25, FIG. 26, FIG. 27, FIG. 28, FIG. 29, FIG. 30 and FIG. 31.

With reference to FIG. 26, even numbered electrodes (EA2, EA4, EA6 etc. and EB2, EB4 and EB6) are designated the upper electrodes (the second subset of the respective first and second substrates) of the dual electrode layer structure. The electrodes pertaining to the upper layer have a width WAU for the first substrate 21 and width WBU for the second substrate 22. The gap between adjacent electrodes on the upper layer is GAU for the first substrate 21 and GBU for the second substrate 22. With reference to FIG. 26, odd numbered electrodes (EA1, EA3, EA5 etc. and EB1, EB3 and EB5 etc.) are designated the lower electrodes (the first subset of the respective first and second substrates) of the dual electrode layer structure. The electrodes pertaining to the lower layer have a width WAL for the first substrate 21 and WBL for the second substrate 22. The gap between adjacent electrodes on the lower layer is GAL for the first substrate 21 and GBL for the second substrate 22. The electrodes pertaining to the upper layer of either the first or second substrate may have the same width as electrodes pertaining to the lower layer of said substrate (i.e. WAU=WAL and/or WBU=WBL). The electrodes pertaining to the upper layer of either the first or second substrate may have a different width to electrodes pertaining to the lower layer of said substrate (i.e. WAU≠WAL and/or WBU≠WBL). Electrode gaps pertaining to the upper layer of either the first or second substrate may have the same width as electrode gaps pertaining to the lower layer of said substrate (i.e. GAU=GAL and/or GBU=GBL). The electrode gaps pertaining to the upper layer of either the first or second substrate may have a different width to electrode gaps pertaining to the lower layer of said substrate (i.e. GAU≠GAL and/or GBU≠GBL). The gap between two adjacent electrodes pertaining to the upper layer of either the first or second substrate may have the same width as electrodes pertaining to the lower layer of said substrate (i.e. GAU=WAL and/or GBU=WBL). The gap between two electrodes pertaining to the upper layer of either the first or second substrate may have a different width to the width of electrodes pertaining lower layer of said substrate (i.e. GAU≠WAL and/or GBU≠WBL). With reference to dashed line 50, the right hand edge of an electrode on the upper layer (EA6 and EB6 in these examples) is preferably aligned with the left hand edge of an electrode on the respective lower layer (EA5 and EB6 in these examples). With reference to dashed line 51, the left hand edge of an electrode on the upper layer (EA4 and EB4 in these examples) is preferably aligned with the right hand edge of an electrode on the respective lower layer (EA5 and EB6 in these examples). The dashed lines 50 and 51 show that there is no gap in the x-direction (lateral direction) between the electrodes on the upper layer of either the first or second substrate and the electrodes on the lower layer of said substrate. A gap in the x-direction between the electrodes on the upper layer and the electrodes on the lower layer (for either the first or second substrate) may increase optical crosstalk and therefore be detrimental to 3D performance. It may be beneficial that any of the parameter GAU, GBU, GAL, GBL, WAU, WBU, WAL and WBL may vary as a function of distance across the panel in the x-direction in order to facilitate the correct set pitch for both φA and φB.

The electrodes in the upper layer and lower layer may be configured to overlap in the x direction in order to account for manufacturing tolerances and therefore ensure low optical crosstalk. In other words, it is desirable to ensure there is at least no gap in the x-direction between the electrodes on the upper layer and the electrodes on the lower layer. Within manufacturing tolerances, the centre (in the x-direction) of each electrode pertaining to the lower layer preferably aligns with the centre of a specific gap pertaining to the respective upper layer and is illustrated for example by the dashed line 52 on FIG. 26 (for both first and second substrates). Within manufacturing tolerances, the centre (in the x-direction) of each electrode pertaining to the upper layer preferably aligns with the centre of a specific gap pertaining to the respective lower layer and is illustrated for example by the dashed line 53 on FIG. 26 (for both first and second substrates).

With reference to FIG. 27, FIG. 28 and FIG. 29, the electrodes pertaining to the second substrate 22 have been omitted for ease of understanding but are used in order to form the barrier BR region in a similar manner as previously described for other embodiments. With reference to FIG. 26, it will be appreciated that the electrode arrangements pertaining to the first substrate 21 are very similar to the electrode arrangements pertaining to the second substrate 22. Consequently, for subsequent descriptions of FIG. 27, FIG. 28 and FIG. 29, the electrodes EA1, EA2, EA3 etc. of the first substrate may be interchanged with electrodes EB1, EB2, EB3 etc. respectively of the second substrate. In general, for subsequent descriptions of FIG. 27, FIG. 28 and FIG. 29, all parameters of the first substrate, such as WAL etc., may be replaced by the equivalent counterpart parameter relating to the second substrate second.

With reference to FIG. 27, a parallax barrier may be formed in the switchable liquid crystal parallax barrier panel 20 by application of voltages to the independently addressable electrodes EA1 to EA12 and EB1 to EB12 (Note: EB1 to EB12 are not shown). FIG. 27 shows that a first voltage is applied to the electrodes EA2, EA3, EA4, EA5, EA6 and EA7 and a second voltage is applied to the remaining electrodes pertaining to both the first and second substrates. The voltage difference between the first voltage and the second voltage is sufficient to put the liquid crystal in a state that, in combination with the polarisers (not shown) makes a barrier BR (non-transmissive area), whereas the effect of applying a net voltage of zero puts the liquid crystal in a state that, in combination with the polarisers (not shown) makes a slit SL (transmissive area). FIG. 25 shows the barrier BR width is approximately equal to the slit SL width. Only one barrier BR is shown in FIG. 27, but the left hand edge of the next barrier region will coincide with the right hand edge of the right-handmost electrode shown in FIG. 27 (the second electrode labelled "EA1"). With reference to FIG. 27, as the barrier BR is translated in the x-direction (i.e. moved left or right) to accommodate for lateral head movements and therefore provide high quality 3D viewing, 3 electrodes on the upper layer and 3 electrodes on the lower layer are always used to control the barrier BR position. Thus, to move the parallax barrier to the right by the smallest possible amount (i.e. by a single electrode position), the first voltage is applied to the electrodes EA3, EA4, EA5, EA6, EA7 and EA8 and the second voltage is applied to the remaining electrodes pertaining to both the first and second substrates, and so on.

In FIG. 27 a barrier region BR and a slit SL have the same width, equal to the width of 6 of the electrodes EA1 to EA12, giving a parallax barrier with a barrier:slit ratio of 1:1. The width of the barrier region is given by a multiple of (WAL+WAU), in this example 3WAU+3WAL, as is the width of a slit. In this case, the width a barrier region, and the width of a slit, remain constant as the parallax barrier is moved to the left or right by one or more electrode positions.

The invention may also provide a parallax barrier in which the barrier regions BR do not have the same width as the slits SL, and an example of this is shown in FIG. 28 and FIG. 29. In this embodiment, however, careful design of the electrodes is needed to ensure that the width of the barrier regions and slits remains the same as the parallax barrier is moved to the left or right by one or more electrode positions.

FIG. 28 shows a first barrier position. FIG. 28 shows that a first voltage is applied to the electrodes EA3, EA4, EA5, EA6 and EA7 and a second voltage is applied to the remaining electrodes pertaining to both the first and second substrates. The width of the barrier BR is therefore controlled by 2 electrodes on the upper layer (EA4 and EA6) and 3 electrodes on the lower layer (EA3, EA5 and EA7). FIG. 29 shows a second barrier position that is adjacent to the first barrier position as shown in FIG. 28. With reference to FIG. 29, if the barrier BR is translated in the x-direction by the smallest increment (i.e. by a single electrode position) then the width of the barrier will now be determined by 3 electrodes on the upper layer (EA4, EA6 and EA8) and 2 electrodes on the lower layer (EA5 and EA7). If GAU=GAL and WAU=WAL, then the width (in the x-direction) of the barrier BR shown in FIG. 28 may be different from the width (in the x-direction) of the barrier shown in FIG. 29. This may occur because fringe field effects will cause the electric field applied by an electrode of the upper layer (EA4, EA6) to "bulge out", so that the width of the liquid crystal region that is switched by an electrode of the upper layer is likely to be greater than the width of the electrode. However, the fringe fields from an electrode of the lower layer will be shielded by electrodes of the upper layer—for example, fringe fields from electrode EA3 of the lower layer will be shielded by electrodes EA2 and EA4 of the upper layer—so that the width of the liquid crystal region that is switched by an electrode of the lower layer is likely to be less than the width of the liquid crystal region switched by an electrode of the upper layer. Thus, even though WAU=WAL the width of liquid crystal region that is switched by an electrode of the upper layer is likely to be greater than the width of the liquid crystal region that is switched by an electrode of the lower layer. As a result, a barrier region defined by three electrodes of the upper layer and two electrodes of the lower layer may have a different width to a barrier region defined by three electrodes of the lower layer and two electrodes of the upper layer, causing the barrier width (and the barrier:slit ratio) to change as the parallax barrier is moved to the right by one electrode position from FIG. 28 to FIG. 29. This difference in barrier width between FIG. 28 and FIG. 29 is not shown because the difference is relatively small. However, any difference in barrier width between FIG. 28 and FIG. 29 may have a significant impact on the quality of the 3D images. Optical simulations and experiments have confirmed that the width of the barrier in FIG. 28 may be less than the width of the barrier shown in FIG. 29.

As noted, it may be advantageous that the width of the barrier in FIG. 28 and the barrier in FIG. 29 are substantially the same (i.e. <~5 μm difference in width). LC optical simulation and experimental evidence suggest that the width of the barriers shown in FIG. 28 and FIG. 29 can be made to be substantially the same as one another by having a first electrode width for all electrodes pertaining to the upper layer and a second electrode width for all electrodes pertaining to the lower layer whereby the first and second widths are different (i.e. WAU≠WAL). More preferably, electrodes pertaining to the upper layer may have a smaller width than electrodes pertaining to the lower layer (i.e. WAU<WAL) and the gap width of the upper layer may be larger than the electrode width pertaining to the upper layer (i.e. GAU>WAU). In summary, WAU<WAL and GAU>WAU for the first substrate, and, by similar argument, WBU<WBL and GBU>WBU for the second substrate.

Figure 30:
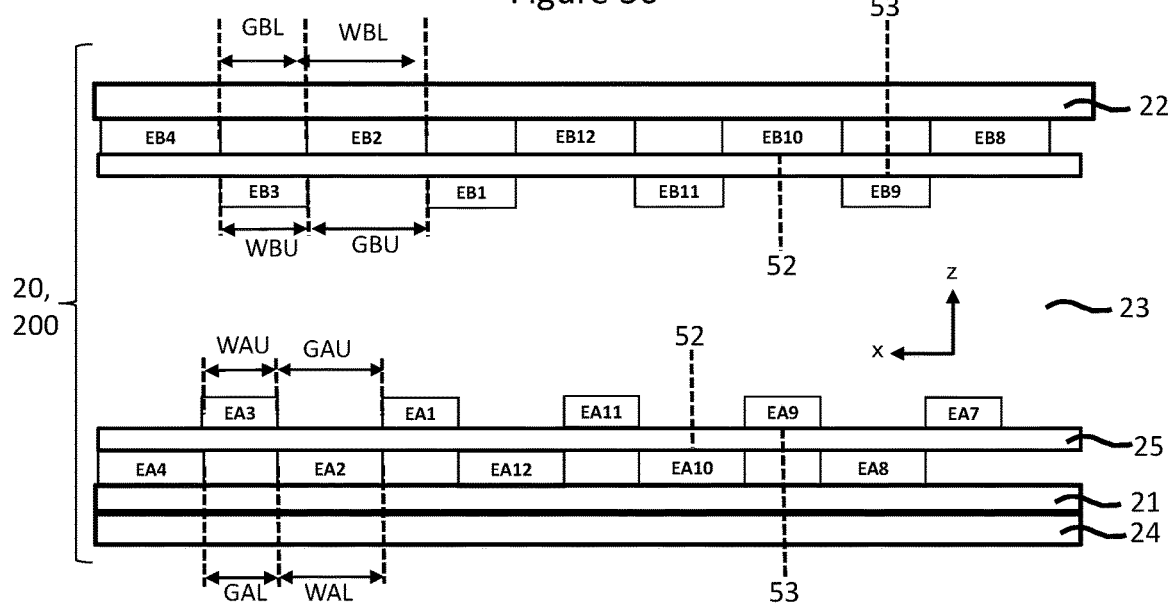
FIG. 30: Sectional view of yet another dual layer electrode structure
Figure 31:
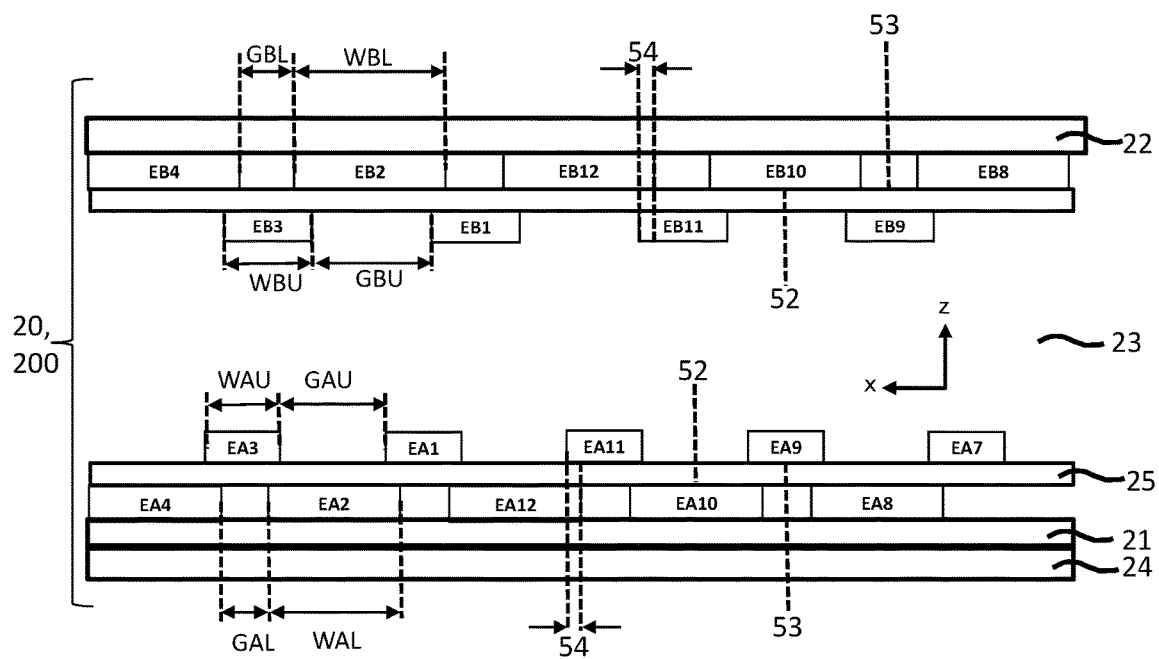
FIG. 31: Sectional view of yet another dual layer electrode structure

FIG. 30 illustrates the situation where WAU<WAL (and similarly, WBU<WBL) and there is no overlap in the x-direction between electrodes of the lower layer and electrodes of the upper layer for both first and second substrates. FIG. 31 illustrates the situation where WAU<WAL (and similarly, WBU<WBL) and the electrodes on the lower layer overlap the upper electrodes on the upper layer in the x-direction for both the first and second substrates. It should be understood that the electrode overlap in FIG. 31 is to allow for manufacturing tolerances. In principle there is no need for electrode overlap. If it were possible to manufacture the electrode arrangement shown in FIG. 30 such that the left hand edge of electrode EAi and EBi was exactly coincident with the right hand edge of electrode EA(i+1) and EB(i+1) respectively, for all electrodes (where i is an integer from 1 to 12 in a cyclic arrangement) the embodiment of FIG. 30 would give identical results to the embodiment of FIG. 31.

With reference to FIG. 30 and FIG. 31, the first substrate 21 may be disposed on the viewing side 90 of the autostereoscopic display device 1 or the second substrate 22 may be disposed on the viewing side 90 of the autostereoscopic display device 1.

The overlap is illustrated by distance 54 in FIG. 31. FIG. 30 and FIG. 31 show that, within manufacturing tolerances, the centre (in the x-direction) of each electrode pertaining to the lower layer preferably aligns with the centre of a specific gap pertaining to the upper layer and is illustrated for example by the dashed line 52. FIG. 30 and FIG. 31 also show that within manufacturing tolerances, the centre (in the x-direction) of each electrode pertaining to the upper layer preferably aligns with the centre of a specific gap pertaining to the lower layer and is illustrated for example by the dashed line 53. By appropriate choice of the electrode dimensions, it is possible to effectively eliminate the effect of the different fringe fields for electrodes in the upper and lower layers, so that a barrier region defined by 3 electrodes of the upper layer and 2 electrodes of the lower layer has the same width as a barrier region defined by 2 electrodes of the upper layer and 3 electrodes of the lower layer.

As noted, in the embodiments of FIG. 30 and FIG. 31, WAU<WAL, WBU<WBL, GAU>WAU and GBU>WBU. In the embodiment of FIG. 31 WAL>GAU and WBL>GBU. It is possible that GAU, GBU, GAL, GBL, WAU, WBU, WAL and WBL may vary as a function of distance across the panel in the x-direction, and if so these inequalities will be satisfied locally.

LC optical simulation suggests that to achieve the same barrier width for the conditions shown in FIG. 26 and FIG. 27, the optimum difference between the first electrode width for all upper layer electrodes and the second electrode width for all lower layer electrodes is a function of several parameters which may include:
  i) The voltage applied to the upper electrodes and lower electrodes.
  ii) LC alignment direction relative to the electrodes.
  iii) LC material properties (elastic constants etc.).
  iv) The thickness of the LC layer (in z-direction).
  v) The properties of the insulator layer 25 (thickness in z-direction, dielectric constants etc.).
  vi) Thickness of electrodes (in z-direction).

The optimum width of the lower electrode may also be a function of the width of the upper electrode and vice versa.

As an example and with reference to FIG. 28, FIG. 29 and FIG. 30, simulation suggests that to achieve equal barrier widths for adjacent parallax barrier positions, the upper electrodes width WAU is in the range 3-9 μm (and in one preferred embodiment WAU~6.5 μm), the lower electrodes width WAL is in the range 6-18 μm (and in one preferred embodiment WAL~10.5 μm), applied voltage to barrier electrodes=5V, LC adjacent to the upper electrodes is aligned in the x-direction, LC layer thickness=4.6 μm, SiNx dielectric spacer layer 25 thickness of 200 nm, thickness of ITO electrodes=50 nm). Note for this specific simulation, WAU<WAL, GAU>WAU and GAU=WAL and WAU−WAL=4.0 μm. Since the optimum width of the lower electrode may also be a function of the width of the upper electrode and vice versa, then the ranges quoted above may be larger or smaller for different widths of the upper and lower electrodes. Similar qualities and inequalities may be applied to parameters (WBU, WBL etc.) pertaining to the second substrate.

As a further example and with reference to FIG. 28, FIG. 29 and FIG. 30, simulation suggests that to achieve equal barrier widths for adjacent parallax barrier positions, the upper electrodes width WAU is in the range 3-9 μm (and in one preferred embodiment WAU~5.5 μm), the lower electrodes width WAL is in the range 6-18 μm (and in one preferred embodiment WAU~11.5 μm), applied voltage to barrier electrodes=5V, LC adjacent to the upper electrodes is aligned in the y-direction, LC layer thickness=4.6 μm, SiNx dielectric spacer layer 25 thickness of 200 nm, thickness of ITO electrodes=50 nm). Note for this specific simulation, WAU<WAL, GAU>WAU and GAU=WAL and WAU−WAL=6.0 μm. Since the optimum width of the lower electrode may also be a function of the width of the upper electrode and vice versa, then the ranges quoted above may be larger or smaller for different widths of the upper and lower electrodes. Similar qualities and inequalities may be applied to parameters (WBU, WBL etc.) pertaining to the second substrate.

With reference to FIG. 28, FIG. 29 and FIG. 30, experimental results suggest that the difference between upper electrode width and lower electrode width may be in the range 0.25 μm to 5 μm (i.e. WAU<WAL), and in one preferred embodiment may be in the range between 0.5 μm and 2 μm. As discussed above, simulation results suggest that the difference between upper electrode width and lower electrode width may be in the range 2 μm to 11 μm (i.e. WAU<WAL), and in one preferred embodiment may be in the range between 4 μm to 6 μm. Although experimental results differ slightly from simulation results, the general principle of WAU<WAL and GAU>WAU was found to be true for both simulation and experiment when optimising electrode design with reference to FIG. 26, FIG. 27, and FIG. 28. Similar qualities and inequalities may be applied to parameters (WBU, WBL etc.) pertaining to the second substrate.

Figure 36:
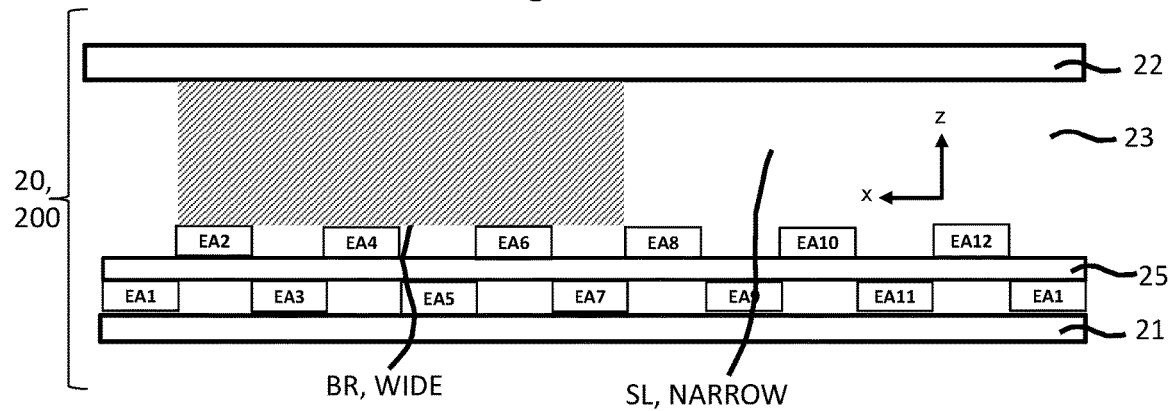
FIG. 36: Sectional view of a dual layer electrode structure
Figure 37:
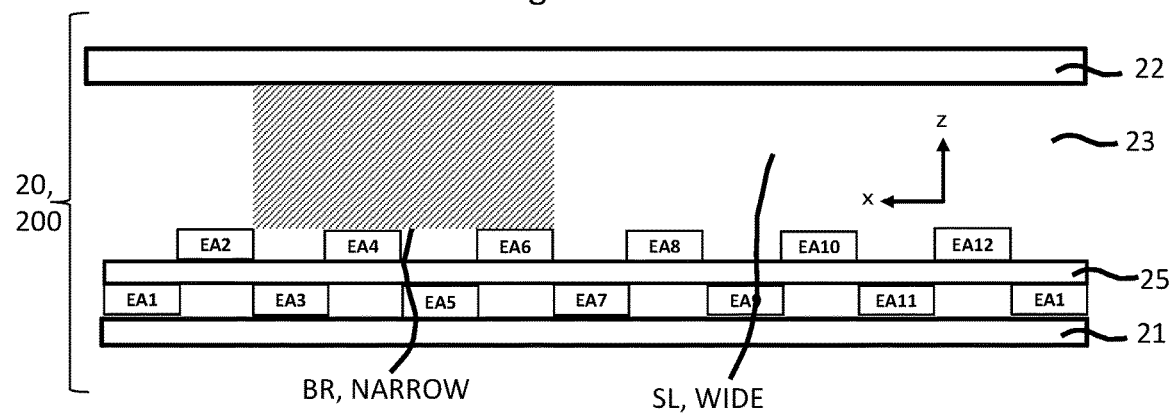
FIG. 37: Sectional view of another dual layer electrode structure
Figure 38:
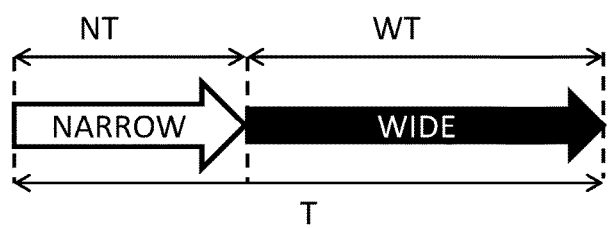
FIG. 38: Timing Diagram

In general, a third voltage, different from the first voltage and the second voltage and with a potential between the first voltage and the second voltage, may be applied to one or more than one electrodes. Said third voltage may be achieved by using Time-Multiplexing, TMUX, technique. The use of a third voltage (or the use of TMUX technique) may be used to minimise, or eliminate luminance flash effect and enable formation of uniform liquid crystal domains that may improve 3D performance. FIG. 36, FIG. 37 and FIG. 38 are used to describe TMUX technique applied to a specific electrodes arrangement It should be understood that equivalent TMUX technique may be applied to any of the electrodes arrangements described before.

With reference to FIG. 36 and FIG. 37, the electrodes pertaining to the second substrate 22 have been omitted for ease of understanding but are used in order to form the barrier BR region in a similar manner as previously described for other embodiments. With reference to FIG. 36, it will be appreciated that the electrode arrangements pertaining to the first substrate 21 are very similar to the electrode arrangements pertaining to the second substrate 22. Consequently, for subsequent descriptions of FIG. 36 and FIG. 37, the electrodes EA1, EA2, EA3 etc. of the first substrate may be interchanged with electrodes EB1, EB2, EB3 etc. respectively of the second substrate. In general, for subsequent descriptions of FIG. 36 and FIG. 37, all parameters of the first substrate, such as WAL etc., may be replaced by the equivalent counterpart parameter relating to the second substrate second.

With reference to FIG. 36, a parallax barrier may be formed in the switchable liquid crystal parallax barrier panel 20 by application of voltages to the independently addressable electrodes EA1 to EA12 and EB1 to EB12 (Note: EB1 to EB12 are not shown). FIG. 36 shows that a first voltage is applied to the electrodes EA2, EA3, EA4, EA5, EA6 and EA7 and a second voltage is applied to the remaining electrodes pertaining to both the first and second substrates. In general, a first voltage is applied to a first set of electrodes and a second voltage is applied to the remaining electrodes. The voltage difference between the first voltage and the second voltage is sufficient to put the liquid crystal in a state that, in combination with the polarisers (not shown) makes a wide barrier BR, WIDE (non-transmissive area), whereas the effect of applying a net voltage of zero puts the liquid crystal in a state that, in combination with the polarisers (not shown) makes a narrow slit SL, NARROW (transmissive area). With reference to FIG. 36, the barrier BR may be translated in the x-direction (i.e. moved left or right) to accommodate for lateral head movements and therefore provide high quality 3D viewing. To move the parallax barrier to the right by the smallest possible amount (i.e. by a single electrode position), the first voltage is applied to the electrodes EA3, EA4, EA5, EA6, EA7 and EA8 and the second voltage is applied to the remaining electrodes pertaining to both the first and second substrates, and so on.

With reference to FIG. 37, a parallax barrier may be formed in the switchable liquid crystal parallax barrier panel 20 by application of voltages to the independently addressable electrodes EA1 to EA12 and EB1 to EB12 (Note: EB1 to EB12 are not shown). FIG. 37 shows that a first voltage is applied to the electrodes EA3, EA4, EA5 and EA6 and a second voltage is applied to the remaining electrodes pertaining to both the first and second substrates. In general, a first voltage is applied to a second set of electrodes that is different from the first set and a second voltage is applied to the remaining electrodes. The voltage difference between the first voltage and the second voltage is sufficient to put the liquid crystal in a state that, in combination with the polarisers (not shown) makes a narrow barrier BR, NARROW (non-transmissive area), whereas the effect of applying a net voltage of zero puts the liquid crystal in a state that, in combination with the polarisers (not shown) makes a wide slit SL, WIDE (transmissive area). With reference to FIG. 37, the barrier BR may be translated in the x-direction (i.e. moved left or right) to accommodate for lateral head movements and therefore provide high quality 3D viewing. To move the parallax barrier to the right by the smallest possible amount (i.e. by a single electrode position), the first voltage is applied to the electrodes EA4, EA5, EA6 and EA7 and the second voltage is applied to the remaining electrodes pertaining to both the first and second substrates, and so on.

With reference to FIG. 36 and FIG. 37, the wide barrier BR, WIDE width is larger than the narrow barrier BR, NARROW width by one upper electrode width WAU plus one lower electrode width WAL, approximately. In general, the wide barrier BR, WIDE width may be larger than the narrow barrier BR, NARROW width by at least one upper electrode width WAU or at least one lower electrode width WAL. All the electrodes used to enable the narrow barrier BR, NARROW are also part of the electrodes used to enable wide barrier BR, WIDE. In general, at least one of the electrodes used to enable the narrow barrier BR, NARROW may also be part of the electrodes used to enable the wide barrier BR, WIDE.

With reference to FIG. 36, FIG. 37 and FIG. 38, the TMUX technique includes enabling a wide barrier BR, WIDE for a wide time interval, WT, and enabling a narrow barrier BR, NARROW for a narrow time interval, NT, in a consecutively and cyclic manner.

With reference to FIG. 38, the period T is the sum of the wide time interval, WT, and the narrow time interval, NT. The period T may be chosen to minimise, or eliminate luminance flash effect and/or enable formation of uniform liquid crystal domains that may improve 3D performance. If the period T is too large (T>100 ms), then the viewer may observe a strong luminance flash effect. A period in the range 0.1 ms to 100 ms has been found suitable for minimising, or eliminating, luminance flash effect and/or enabling formation of uniform liquid crystal domains that may improve 3D performance. A period in the range 1 ms to 10 ms has been found suitable for minimising, or eliminating, luminance flash effect and enabling formation of uniform liquid crystal domains that may improve 3D performance. The optimum ratio of wide of time interval, WT, and the narrow time interval, NT may be a function of viewing distance and/or may be a function of the voltage(s) applied to the electrodes. The ratio of time intervals NT:WT may be in the range 99.9:0.1 to 30:70. The ratio of time intervals NT:WT may be in the range 95:5 to 50:50. The ratio of time intervals NT:WT may be approximately 60:40.

With reference to FIG. 36, FIG. 37 and FIG. 38, the barrier width (WIDE and NARROW) and slit width SL (NARROW and WIDE) and associated TMUX driving may be controlled by the Control circuit 40 as shown in FIG. 22 and FIG. 23in a similar manner to that previously described. The slit pattern LUT 45 in FIG. 23 may store barrier width (WIDE and NARROW) and slit width SL (NARROW and WIDE) positions for all head positions in the 3D viewing zone 70 in a similar manner to that previously described. The TMUX operation as shown by FIG. 38 may be controlled by the operation unit 42 and/or the Dual-pitch liquid crystal parallax barrier panel drive unit 44.

An aspect of the invention, therefore, is a reconfigurable parallax barrier panel. In exemplary embodiments, the reconfigurable parallax barrier panel may include a first substrate, a second substrate, and an electro-optic material positioned between the first and second substrates. The first substrate has a plurality of first electrodes, the first electrodes being independently addressable from one another and comprising a plurality of electrode portions extending along a first direction and laterally spaced from one another along a second direction different from the first direction, the electrode portions of the first electrodes being arranged in a cyclic arrangement having a first pitch. The second substrate has a plurality of second electrodes, the second electrodes being independently addressable from one another and comprising a plurality of electrode portions extending along a first direction and laterally spaced from one another along a second direction different from the first direction, the electrode portions of the second electrodes being arranged in a cyclic arrangement having a second pitch that is different to the first pitch. The parallax barrier panel is configured to address the first and second electrodes based on at least one received drive signal such that: for a first range of viewing distances, the first electrodes define a first parallax barrier array selected from a plurality of predetermined parallax barrier arrays, and for a second range of viewing distances different from the first range of viewing distances, the second electrodes define a second parallax barrier array selected from a plurality of predetermined parallax barrier arrays. The reconfigurable parallax barrier panel may include one or more of the following features, either individually or in combination.

In an exemplary embodiment of the reconfigurable parallax barrier panel, for the first range of viewing distances, a pitch of the parallax barrier array is defined by the first pitch, and for the second range of viewing distances, the pitch of the parallax barrier array is defined by the second pitch.

In an exemplary embodiment of the reconfigurable parallax barrier panel, the first and second parallax barrier arrays have transmissive slit areas and non-transmissive barrier areas that are formed by addressing the independently addressable first electrodes and second electrodes in a predetermined fashion.

In an exemplary embodiment of the reconfigurable parallax barrier panel, the first and second parallax barrier arrays can be translated laterally by addressing the independently addressable electrodes of both the first and second substrates in a predetermined fashion.

In an exemplary embodiment of the reconfigurable parallax barrier panel, the first substrate has a single layer of independently addressable first electrodes, and the second substrate has a single layer of independently addressable second electrodes.

In an exemplary embodiment of the reconfigurable parallax barrier panel, the first substrate has a dual layer of independently addressable first electrodes, and/or the second substrate has a dual layer of independently addressable second electrodes.

In an exemplary embodiment of the reconfigurable parallax barrier panel, each dual layer of electrodes comprises a first subset of electrodes and a second subset of electrodes on opposite sides of an insulating layer, and a width of electrodes and a gap between electrodes is the same for the first subset of electrodes and the second subset of electrodes.

In an exemplary embodiment of the reconfigurable parallax barrier panel, electrodes of the first subset of electrodes and the second subset of electrodes overlap in a direction perpendicular to the first and second substrates.

In an exemplary embodiment of the reconfigurable parallax barrier panel, each dual layer of electrodes comprises a first subset of electrodes and a second subset of electrodes on opposite sides of an insulating layer, and a width of electrodes and a gap between electrodes is different for the first subset of electrodes as compared to the second subset of electrodes.

In an exemplary embodiment of the reconfigurable parallax barrier panel, edges of electrodes of the first subset of electrodes and the second subset of electrodes are laterally aligned such that the electrodes in the first subset of electrodes and second subset of electrodes do not overlap in a direction perpendicular to the first and second substrates.

In an exemplary embodiment of the reconfigurable parallax barrier panel, electrodes of the first subset of electrodes and the second subset of electrodes overlap in a direction perpendicular to the first and second substrates.

In an exemplary embodiment of the reconfigurable parallax barrier panel, the width of electrodes in the first subset of electrodes is less than the width of electrodes in the second subset of electrodes.

In an exemplary embodiment of the reconfigurable parallax barrier panel, the first and second electrodes each have 12 independently addressable electrode portions.

Another aspect of the invention is a display system including an image display panel for generating an image, a head tracking system comprising at least one position sensor that tracks a user position including a left eye position and a right eye position, and a parallax barrier panel according to any of the embodiments. The display system further includes control unit configured to switch operation of the display system between a two-dimensional (2D) mode in which a same image is directed to the left eye position and the right eye position, and a three-dimensional (3D) mode in which a left eye image is directed to the left eye position and a right eye image is directed to the right eye position, by reconfiguring the parallax barrier panel. The display system may include one or more of the following features, either individually or in combination.

In an exemplary embodiment of the display system, the control unit includes a slit position look-up table that stores parallax barrier slit positions corresponding to user positions in a 3D viewing zone, and the control unit reconfigures the parallax barrier panel based on a detected user position in accordance with the look-up table.

In an exemplary embodiment of the display system, the parallax barrier panel is on a viewing side relative to the image display panel.

In an exemplary embodiment of the display system, the image display panel is on a viewing side relative to the parallax barrier panel.

In an exemplary embodiment of the display system, the display system includes a plurality of parallax barrier panels according to any of claims 1-13, the plurality of parallax barrier panels being positioned in a stacked arrangement.

In an exemplary embodiment of the display system, a first range of viewing distances generated in accordance with the first pitch of the first plurality of electrodes, and a second range of viewing distances generated in accordance with the second pitch of the second plurality of electrodes, overlap In an exemplary embodiment of the display system, the first substrate has a dual layer of 12 first electrodes with each layer including a plurality of first electrodes, the first electrodes being independently addressable from one another and comprising a plurality of electrode portions extending along a first direction and laterally spaced from one another along a second direction different from the first direction, the electrode portions of the first electrodes being arranged in a cyclic arrangement having a first pitch; and the second substrate has a dual layer of 12 second electrodes with each layer including a plurality of second electrodes, the second electrodes being independently addressable from one another and comprising a plurality of electrode portions extending along a first direction and laterally spaced from one another along a second direction different from the first direction, the electrode portions of the second electrodes being arranged in a cyclic arrangement having a second pitch that is different to the first pitch.

Another aspect of the invention is a method of operating a display system of any of the above embodiments, the method including the steps of: obtaining user position data with the head tracking system; calculating position coordinates with the control unit based on the user position data; determining a slit position number with the control unit for slit positions based on the user position data; and driving the parallax barrier panel with the control unit to generate a parallax barrier array including slits arranged in according with the determined slit numbers. The method of operating a display system may include one or more of the following features, either individually or in combination.

In an exemplary embodiment of the method of operating a display system, the control unit applies a first voltage to a first set of electrodes and a second voltage to the remaining electrodes for a first time interval to form a parallax barrier array and applies a first voltage to a second set of electrodes, different from the first set of electrodes, and a second voltage to the remaining electrodes for a second time interval to form a parallax barrier array.

In an exemplary embodiment of the display system, a period T comprises the sum of the first time interval and the second time interval and the period T is in a range of 0.1 ms to 100 ms to create a parallax barrier array and to translate the parallax barrier array in accordance with the user position data.

In an exemplary embodiment of the display system, the ratio of the first time interval and the second time interval within the period T is within a range of 99:1 to 1:99.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The present invention pertains to autostereoscopic (no glasses) display devices that enable viewing of high quality 3D images for a large range of user positions.

What is claimed is:

1. A reconfigurable parallax barrier panel comprising:
a first substrate;
a second substrate; and
an electro-optic material positioned between the first and second substrates;
wherein:
the first substrate has a plurality of first electrodes, the first electrodes being independently addressable from one another and each of the plurality of first electrodes comprising a plurality of electrode portions extending along a first direction and laterally spaced from one another along a second direction different from the first direction, the electrode portions of the first electrodes being arranged in a cyclic arrangement having a first pitch;
the second substrate has a plurality of second electrodes, the second electrodes being independently addressable from one another and each of the plurality of second electrodes comprising a plurality of electrode portions extending along a first direction and laterally spaced from one another along a second direction different from the first direction, the electrode portions of the second electrodes being arranged in a cyclic arrangement having a second pitch that is different to the first pitch, and
the parallax barrier panel is configured to address the first and second electrodes based on at least one received drive signal such that:
an electric potential across the electro-optic material determines opaque barrier areas and transmissive slit areas along the electro-optic material, and positions of the barrier and slit areas along the electro-optic material are electrically reconfigurable by changing the addressing of the first electrodes and/or the second electrodes;
for a first range of viewing distances, the first electrodes define a first parallax barrier array corresponding to a first pattern of barrier and slit areas, and
for a second range of viewing distances different from the first range of viewing distances, the second electrodes define a second parallax barrier array corresponding to a second pattern of barrier and slit areas.

2. The reconfigurable parallax barrier panel of claim 1, wherein for the first range of viewing distances, a pitch of the parallax barrier array is defined by the first pitch, and for the second range of viewing distances, the pitch of the parallax barrier array is defined by the second pitch.

3. The reconfigurable parallax barrier panel of claim 2, wherein the first and second parallax barrier arrays have transmissive slit areas and non-transmissive barrier areas that are formed by addressing the independently addressable first electrodes and second electrodes in a predetermined fashion.

4. The reconfigurable parallax barrier panel of claim 3, wherein the first and second parallax barrier arrays can be translated laterally by addressing the independently addressable electrodes of both the first and second substrates in a predetermined fashion.

5. The reconfigurable parallax barrier panel of claim 1, wherein the first substrate has a single layer of independently addressable first electrodes, and the second substrate has a single layer of independently addressable second electrodes.

6. The reconfigurable parallax barrier panel of claim 1, wherein the first substrate has a dual layer of independently addressable first electrodes, and/or the second substrate has a dual layer of independently addressable second electrodes.

7. The reconfigurable parallax barrier panel of claim 6, wherein each dual layer of electrodes comprises a first subset of electrodes and a second subset of electrodes on opposite sides of an insulating layer, and a width of electrodes and a gap between electrodes is the same for the first subset of electrodes and the second subset of electrodes.

8. The reconfigurable parallax barrier panel of claim 7, wherein electrodes of the first subset of electrodes and the second subset of electrodes overlap in a direction perpendicular to the first and second substrates.

9. The reconfigurable parallax barrier panel of claim 7, wherein each dual layer of electrodes comprises a first subset of electrodes and a second subset of electrodes on opposite sides of an insulating layer, and a width of electrodes and a gap between electrodes is different for the first subset of electrodes as compared to the second subset of electrodes.

10. The reconfigurable parallax barrier panel of claim 9, wherein edges of electrodes of the first subset of electrodes and the second subset of electrodes are laterally aligned such that the electrodes in the first subset of electrodes and second subset of electrodes do not overlap in a direction perpendicular to the first and second substrates.

11. The reconfigurable parallax barrier panel of claim 10, wherein the width of electrodes in the first subset of electrodes is less than the width of electrodes in the second subset of electrodes.

12. The reconfigurable parallax barrier panel of claim 9, wherein electrodes of the first subset of electrodes and the second subset of electrodes overlap in a direction perpendicular to the first and second substrates.

13. The reconfigurable parallax barrier panel of claim 1, wherein the first and second electrodes each have 12 independently addressable electrode portions.

14. A display system comprising:
an image display panel for generating an image;
a head tracking system comprising at least one position sensor that tracks a user position including a left eye position and a right eye position;
a parallax barrier panel according to claim 1; and
a control unit configured to switch operation of the display system between a two-dimensional (2D) mode in which a same image is directed to the left eye position and the right eye position, and a three-dimensional (3D) mode in which a left eye image is directed to the left eye position and a right eye image is directed to the right eye position, by reconfiguring the parallax barrier panel.

15. The display system of claim 14, wherein the control unit includes a slit position look-up table that stores parallax barrier slit positions corresponding to user positions in a 3D viewing zone, and the control unit reconfigures the parallax barrier panel based on a detected user position in accordance with the look-up table.

16. The display system of claim 14, wherein the parallax barrier panel is on a viewing side relative to the image display panel.

17. The display system of claim 14, wherein the image display panel is on a viewing side relative to the parallax barrier panel.

18. The display system of claim 14, wherein the display system includes a plurality of parallax barrier panels according to claim 1, the plurality of parallax barrier panels being positioned in a stacked arrangement.

19. The display system of claim 14, wherein a first range of viewing distances generated in accordance with the first pitch of the first plurality of electrodes, and a second range of viewing distances generated in accordance with the second pitch of the second plurality of electrodes, overlap.

20. A display system comprising:
an image display panel for generating an image;
a head tracking system comprising at least one position sensor that tracks a user position including a left eye position and a right eye position;
a parallax barrier panel; and
a control unit configured to switch operation of the display system between a two-dimensional (2D) mode in which a same image is directed to the left eye position and the right eye position, and a three-dimensional (3D) mode in which a left eye image is directed to the left eye position and a right eye image is directed to the right eye position, by reconfiguring the parallax barrier element;
wherein the parallax barrier panel comprises:
a first substrate;
a second substrate; and
an electro-optic material positioned between the first and second substrates;
wherein:
the first substrate has a dual layer of 12 first electrodes with each layer including a plurality of first electrodes, the first electrodes being independently addressable from one another and each of the 12 first electrodes comprising a plurality of electrode portions extending along a first direction and laterally spaced from one another along a second direction different from the first direction, the electrode portions of the first electrodes being arranged in a cyclic arrangement having a first pitch;
the second substrate has a dual layer of 12 second electrodes with each layer including a plurality of second electrodes, the second electrodes being independently addressable from one another and each of the 12 second electrodes comprising a plurality of electrode portions extending along a first direction and laterally spaced from one another along a second direction different from the first direction, the electrode portions of the second electrodes being arranged in a cyclic arrangement having a second pitch that is different to the first pitch; and;
an electric potential across the electro-optic material determines opaque barrier areas and transmissive slit areas along the electro-optic material, and positions of the barrier and slit areas along the electro-optic material are electrically reconfigurable by changing the addressing of the first electrodes and/or the second electrodes.

21. A method of operating a display system,
wherein the display system comprises:
an image display panel for generating an image;
a head tracking system comprising at least one position sensor that tracks a user position including a left eye position and a right eye position;
a parallax barrier panel; and
a control unit configured to switch operation of the display system between a two-dimensional (2D) mode in which a same image is directed to the left eye position and the right eye position, and a three-dimensional (3D) mode in which a left eye image is directed to the left eye position and a right eye image is directed to the right eye position, by reconfiguring the parallax barrier element;
wherein the parallax barrier panel comprises:
a first substrate;
a second substrate; and
an electro-optic material positioned between the first and second substrates;
wherein:
the first substrate has a plurality of first electrodes, the first electrodes being independently addressable from one another and each of the plurality of first electrodes comprising a plurality of electrode portions extending along a first direction and laterally spaced from one another along a second direction different from the first direction, the electrode portions of the first electrodes being arranged in a cyclic arrangement having a first pitch;
the second substrate has a plurality of second electrodes, the second electrodes being independently addressable from one another and each of the plurality of second electrodes comprising a plurality of electrode portions extending along a first direction and laterally spaced from one another along a second direction different from the first direction, the electrode portions of the second electrodes being arranged in a cyclic arrangement having a second pitch that is different to the first pitch; and an electric potential across the electro-optic material determines opaque barrier areas and transmissive slit areas along the electro-optic material, and positions of the barrier and slit areas along the electro-optic material are electrically reconfiqurable by changing the addressing of the first electrodes and/or the second electrodes;

the method of operating the display system in the 3D mode comprising the steps of:

obtaining user position data with the head tracking system;

calculating position coordinates with the control unit based on the user position data;

determining a slit position number with the control unit for slit positions based on the user position data; and driving the parallax barrier panel with the control unit to generate a parallax barrier array including slit areas arranged in according with the determined slit numbers.

22. The method of operating a display system of claim 21, wherein the control unit:

applies a first voltage to a first set of electrodes and a second voltage to the remaining electrodes for a first time interval to form a parallax barrier array; and applies a first voltage to a second set of electrodes, different from the first set of electrodes, and a second voltage to the remaining electrodes for a second time interval to form a parallax barrier array.

23. The method of operating a display system of claim 22, wherein a period T comprises the sum of the first time interval and the second time interval and the period T is in a range of 0.1 ms to 100 ms to create a parallax barrier array and to translate the parallax barrier array in accordance with the user position data.

24. The method of operating a display system of claim 23, wherein the ratio of the first time interval and the second time interval within the period T is within a range of 99:1 to 1:99.

* * * * *